US005696987A

United States Patent [19]

DeLisle et al.

[11] Patent Number: 5,696,987
[45] Date of Patent: Dec. 9, 1997

[54] HARDWARE BASED INTERFACE FOR EMULATION OF A STANDARD SYSTEM CONTROL PROCESSOR

[75] Inventors: David J. DeLisle, Spring; Saifuddin Fakhruddin, Tonball; Lloyd Gauthier, Austin, all of Tex.; Robert A. Kohtz, St. Joseph, Mich.

[73] Assignee: Packard Bell NEC Inc., Sacramento, Calif.

[21] Appl. No.: 622,924

[22] Filed: Mar. 27, 1996

Related U.S. Application Data

[60] Continuation of Ser. No. 336,570, Nov. 9, 1994, abandoned, which is a division of Ser. No. 139,946, Dec. 8, 1993, abandoned, which is a continuation of Ser. No. 31,029, Mar. 11, 1993, Pat. No. 5,283,889, which is a continuation of Ser. No. 735,619, Jul. 25, 1991, abandoned, which is a continuation-in-part of Ser. No. 459,055, Dec. 29, 1989, abandoned.

[51] Int. Cl.[6] ................................................ G06F 9/00
[52] U.S. Cl. .......................... 395/800; 395/500; 395/821; 364/DIG. 1; 364/232.3
[58] Field of Search ...................................... 395/800, 500, 395/860, 821

[56] References Cited

U.S. PATENT DOCUMENTS

| 4,503,491 | 3/1985 | Luschtak et al. | 395/400 |
|---|---|---|---|
| 4,727,480 | 2/1988 | Albright et al. | 395/500 |
| 4,779,187 | 10/1988 | Letwin | 395/725 |
| 4,888,680 | 12/1989 | Sander et al. | 395/500 |
| 4,926,322 | 5/1990 | Stimac et al. | 395/500 |
| 4,942,606 | 7/1990 | Kaiser et al. | 380/4 |
| 4,943,911 | 7/1990 | Kopp et al. | 395/375 |
| 4,945,473 | 7/1990 | Holtey et al. | 395/500 |
| 5,031,119 | 7/1991 | Dulaney et al. | 340/706 |
| 5,214,785 | 5/1993 | Fairweather | 395/800 |
| 5,226,122 | 7/1993 | Thayer et al. | 395/275 |
| 5,283,889 | 2/1994 | DeLisle et al. | 395/500 |

*Primary Examiner*—Mehmet B. Geckil
*Attorney, Agent, or Firm*—Fitch, Even, Tabin & Flannery

[57] ABSTRACT

A relatively fast system control processor, such as an Intel 8051, is substituted for an Intel 8042 microprocessor in a PC/AT type compatible personal computer. In one embodiment of the invention, a System Control Processor Interface (SCPI) is provided between the central processing unit (CPU) and the system control processor (SCP) to maintain compatibility with the PC/AT bus. The combination of the faster SCP and the SCPI interface improves the overall system performance. Control circuitry is also provided for setting the A20 signal relatively quickly to allow memory access above one megabyte. In an alternate embodiment of the invention, a Mouse Keyboard Interface (MKI) is provided. The MKI provides even quicker switching of the Gate A20 signal by eliminating the need to interrupt the SCP. The MKI also provides support for a type PS/2 mouse.

7 Claims, 34 Drawing Sheets

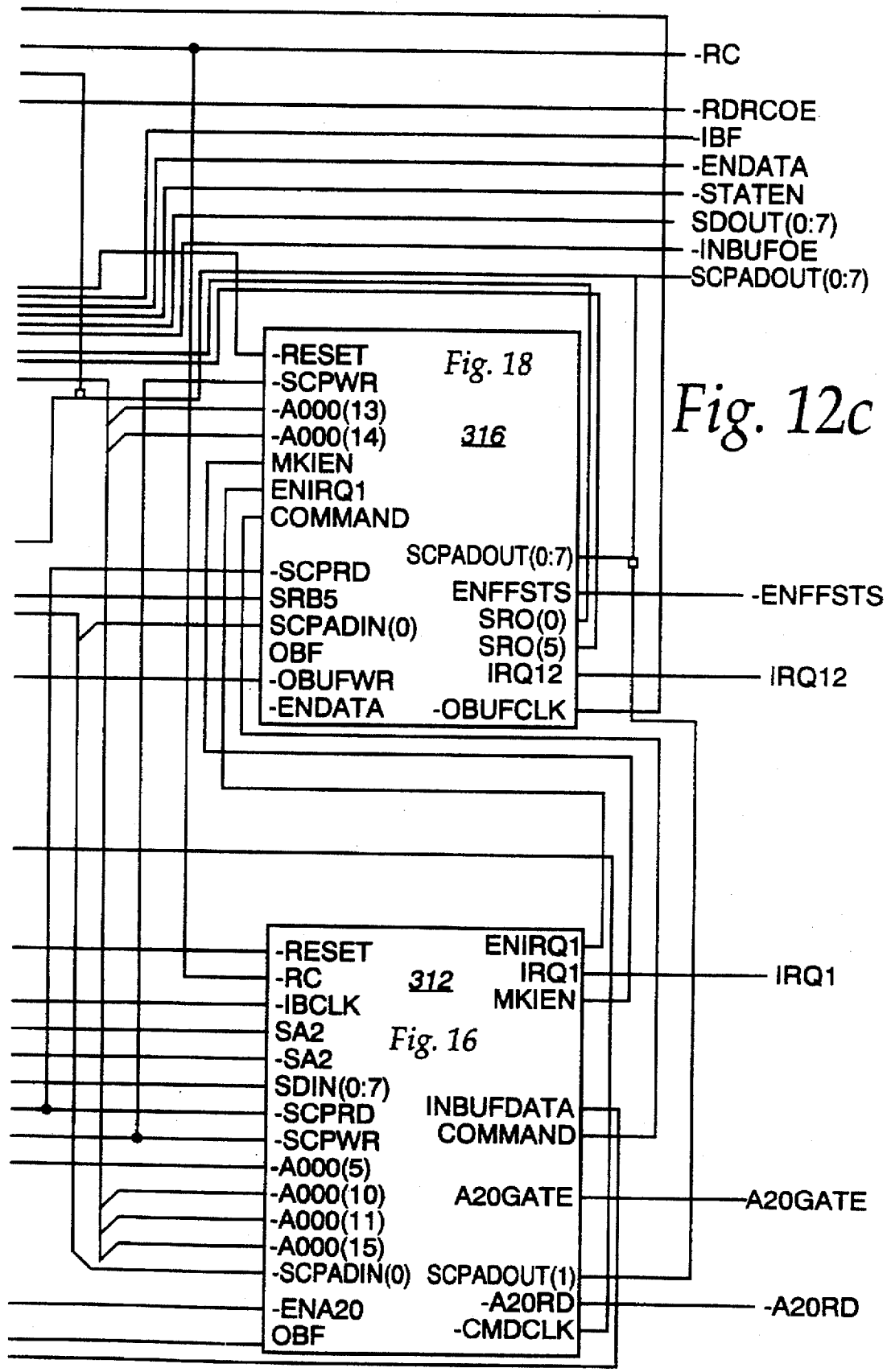

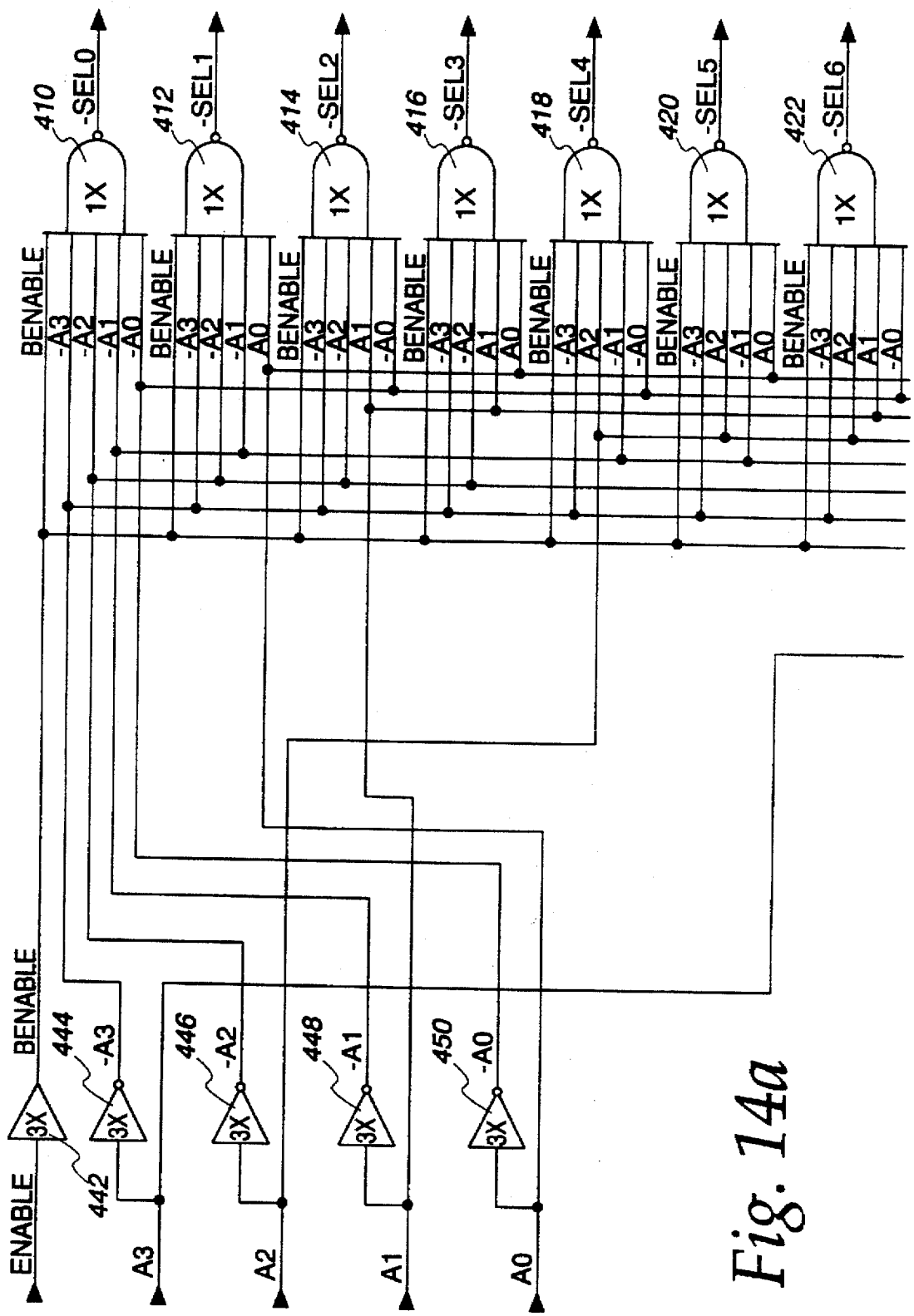

Fig. 19

```
         SCPS SA2 IRQ1 P6WR IRQ12 VCC SCPAD7 SCPAD6 SD7 SD6 RESET
          39  38  37   36   35   34   33     32    31  30   29
  40 — IOR                                                      ISOLATE — 28
  41 — IOM                                                         SD5  — 27
  42 — RAMACS                                                      SD4  — 26
  43 — RAMALE                  300                               SCPAD5 — 25
  44 — RAMOE              MKI                                    SCPAD4 — 24
   1 — VCC           MOUSE KEYBOARD                                GND  — 23
   2 — SCPAD0          INTERFACE                                 A20GATE— 22
   3 — SCPAD1           644-189                                    P5RD — 21
   4 — SD0                                                         P5WR — 20
   5 — SD1                                                         IBF  — 19
   6 — SCPRD                                                     SCPA15 — 18
          7   8   9   10   11   12   13    14    15   16   17
        SCPWR SD2 SD3 SCPAD2 SCPAD3 GND P4RD P4WR RC SCPALE PSEN
```

Fig. 19

HARDWARE BASED INTERFACE FOR EMULATION OF A STANDARD SYSTEM CONTROL PROCESSOR

CROSS REFERENCE TO RELATED APPLICATIONS

This application is a continuation of U.S. patent application Ser. No. 08/336,570, filed Nov. 9, 1994, now abandoned, entitled FAST SWITCHING MEMORY MODE SYSTEM, which is a divisional of U.S. patent application Ser. No. 08/139,946, now abandoned, filed Dec. 8, 1993, entitled FAST SWITCHING MEMORY MODE SYSTEM, which is a continuation of Ser. No. 08/031,029, now U.S. Pat. No. 5,283,889 reissued as U.S. Pat. No. RE35480, entitled HARDWARE BASED INTERFACE FOR MODE SWITCHING TO ACCESS MEMORY ABOVE ONE MEGABYTE which is a continuation of U.S. patent application Ser. No. 07/735,619, filed Jul. 25, 1991, now abandoned, entitled FAST SWITCHING MEMORY MODE SYSTEM, which is a continuation-in-part of U.S. patent application Ser. No. 07/459,055, filed Dec. 29, 1989, now abandoned, entitled FAST SWITCHING MEMORY MODE SYSTEM.

This application is also related to the following application filed Dec. 29, 1989: PERSONAL COMPUTERS HAVING DEDICATED PROCESSORS FOR PERIPHERAL DEVICES INTERCONNECTED TO THE CPU BY WAY OF A SYSTEM CONTROL PROCESSOR, Ser. No. 07/459,042, now abandoned in favor of continuation U.S. patent application Ser. No. 08/019,997, filed on Jan. 18, 1994, now U.S. Pat. No. 5,280,621.

BACKGROUND OF THE INVENTION

1. Field of the Invention

This invention relates to a system control processor interface for an IBM PC/AT type compatible personal computer which emulates an Intel type 8042 system control processor and a control circuit for minimizing the time required to access memory above one megabyte.

2. Description of the Prior Art

Newer PC/AT compatible personal computers utilizing either of Intel's microprocessors 80286, 80386 or 80486 as a central processing units (CPU) are designed to be software compatible with a PC/XT type compatible personal computer. The PC/XT machines utilize an Intel type 8088 microprocessor as a CPU which has only 20 address lines, A0–A19. Consequently, such microprocessors can only access memory up to one megabyte.

Intel 80286, 80386 or 80486 microprocessors have 24 address lines, A0–A23, which allow them to access memory up to sixteen megabytes. In order to be compatible with a type PC/XT software and also access memory above one megabyte, these microprocessors have two operating modes; a real mode and a protected mode.

In the real mode, the object code of these microprocessors is compatible with a PC/XT machine based software. In the protected mode, all addresses are relative and the microprocessor can access memory above the one megabyte boundary. Consequently, while in the protected mode, their object code is no longer compatible with a PC/XT machine.

Switching between modes is controlled by an A20 signal from a keyboard controller also known as a system control processor (SCP). However, since todays computers run much faster than their predecessors, there can be a problem with some programs that set the A20 signal. More specifically, known programs can write a command and data to set the A20 signal. After a predetermined time-out, the system continues exececuting under the assumption the A20 signal is correctly set. Because newer computers run much faster than some programs allow the time-out can expire before the A20 signal is actually set. This will cause the computer to run code out of the wrong memory space resulting in a hung system.

Another problem in many known PC/AT compatible personal computers is that the switching of the A20 signal is generally controlled by the SCP, generally an Intel-type 8042 microprocessor. The type 8042 microprocessor is slow relative to other microprocessors, such as an Intel 8051 microprocessor. For example, an Intel 8042 microprocessor has a 2.5 microsecond instruction time as opposed to a 1 microsecond instruction time for an Intel 8051. However, in order to be compatible with a PC/AT-bus any substitution of the SCP requires emulation of an Intel 8042.

SUMMARY OF THE INVENTION

It is object of the present invention to provide a personal computer which solves the problems associated with the prior art.

It is another object of the present invention to provide means for switching the A20 signal relatively faster than prior art machines.

It is yet another object of the invention to remove the sole responsibility for switching the A20 signal from the SCP.

It is a further object of the present invention to provide a circuit which switches the A20 signal relatively quickly to allow for access to memory space above one megabyte.

It is yet a further object of the present invention to provide a SCP that is relatively faster than a Intel-8042 microprocessor.

It is yet another object of the present invention to provide an interface which emulates an Intel-8042 microprocessor.

DESCRIPTION OF THE DRAWING

These and other objects and advantages of the present invention will become readily apparent upon consideration of the following detailed description of the attached drawing wherein:

FIGS. 12A–12C are block diagrams of the MKI illustrated in FIG. 11;

FIGS. 14A–14B are schematic diagrams of an address decode circuit in accordance with the present invention;

FIG. 19 is a pin diagram for the MKI in accordance with the present invention.

DETAILED DESCRIPTION

Two embodiments of the invention are disclosed. The first embodiment relates to a System Control Processor Interface (SCPI), illustrated in FIGS. 2–9. The second embodiment relates to a Mouse Keyboard Interface (MKI), illustrated in FIGS. 10–19. Both embodiments emulate an Intel 8042 bus as well as provide relatively faster control of the Gate A20 signal. As will be discussed below, the MKI provides relatively faster control of the Gate A20 signal than the SCPI by eliminating the need for service from the SCP in order to set the Gate A 20 signal. Additionally, the MKI provides hardware support for a type PS/2 mouse.

Figure 1:
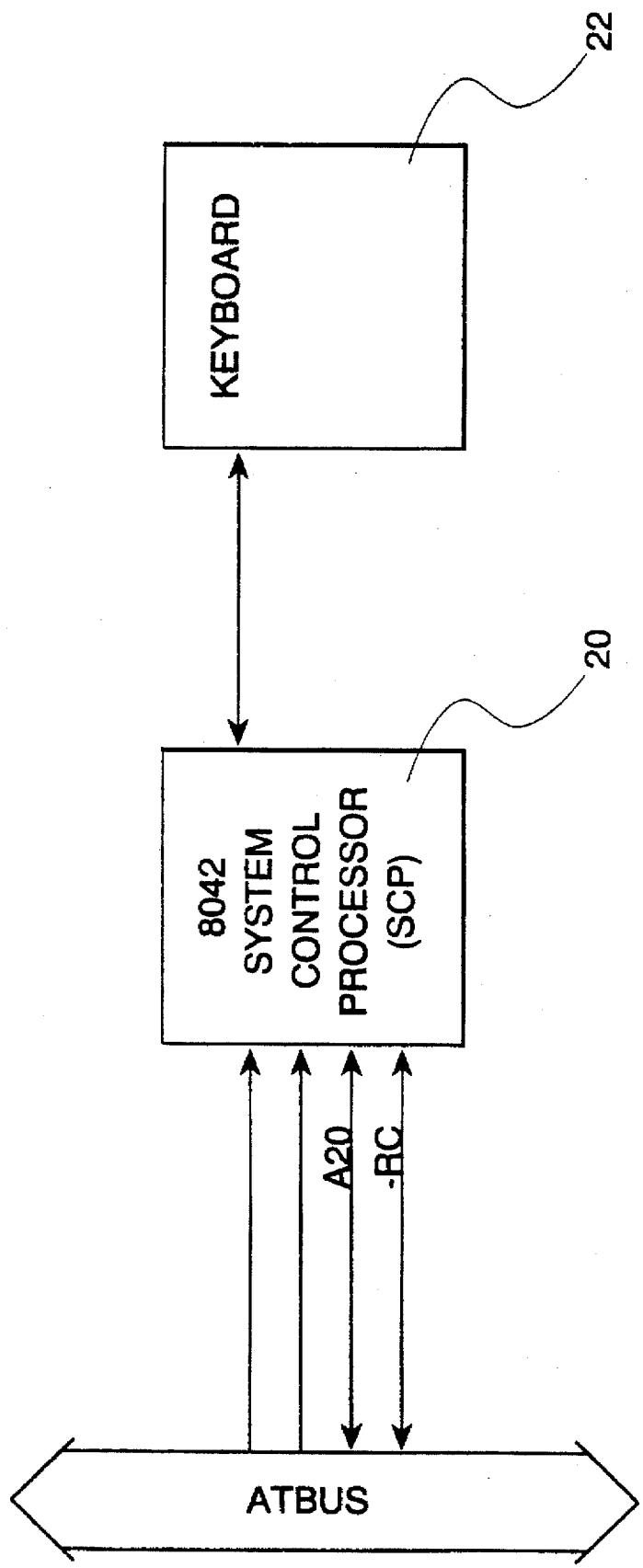
FIG. 1 is a simplified block diagram of a portion of a prior art type PC/AT compatible personal computer illustrating an Intel 8042 microprocessor as an SCP.
Figure 2:
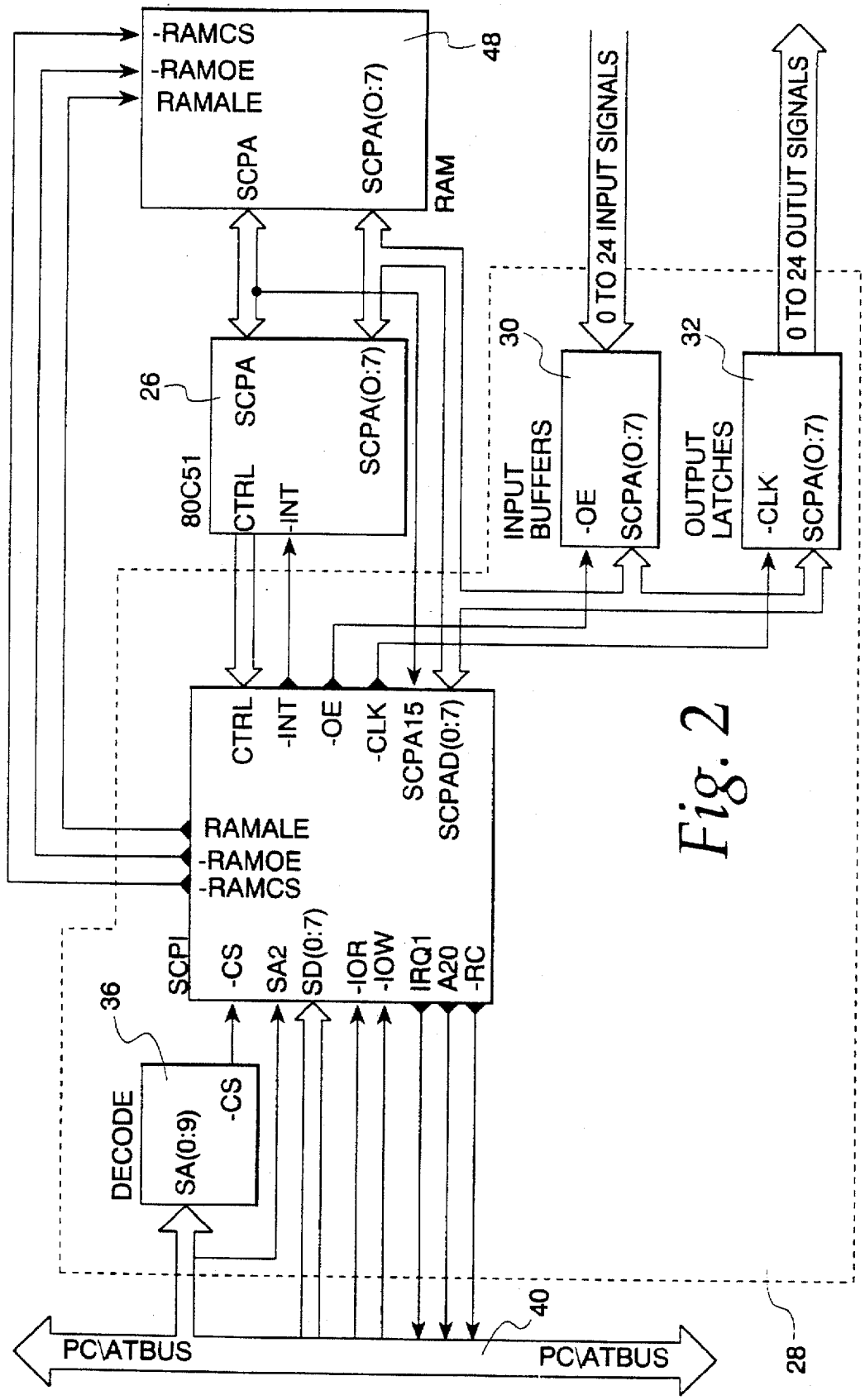
FIG. 2 is a block diagram of the system in accordance with the present invention which utilizes a system control processor interface (SCPI) for emulating an Intel 8042 bus.

Referring to the drawing and in particular FIG. 1, a portion of a known PC/AT compatible personal computer is illustrated. An SCP 20 acts as an interface between a CPU (not shown) and various peripherals, such as a keyboard 22. In such an application, the SCP 20 monitors the keyboard 22 and communicates with the CPU.

In known newer type PC/AT machines, an Intel 8042 is used as the SCP 20 while either an Intel 80286, 80386 or an 80486 is used as a CPU. An Intel 8042 is relatively slow and can decrease the overall system performance. However, in order to remain IBM PC/AT-compatible, any change in the SCP requires emulation of the Intel 8042.

SCPI

The SCPI allows the SCP 20 (FIG. 1) to be replaced with a relatively faster SCP 26, such as an Intel 8051 or any microprocessor that emulates an Intel 8042. The SCPI, generally identified with the reference numeral 28, is connected between a PC/AT system bus 40 and the SCP 26. The SCP 26 and the SCPI 28 emulate the Intel 8042 to maintain system compatibility.

Figure 3A:
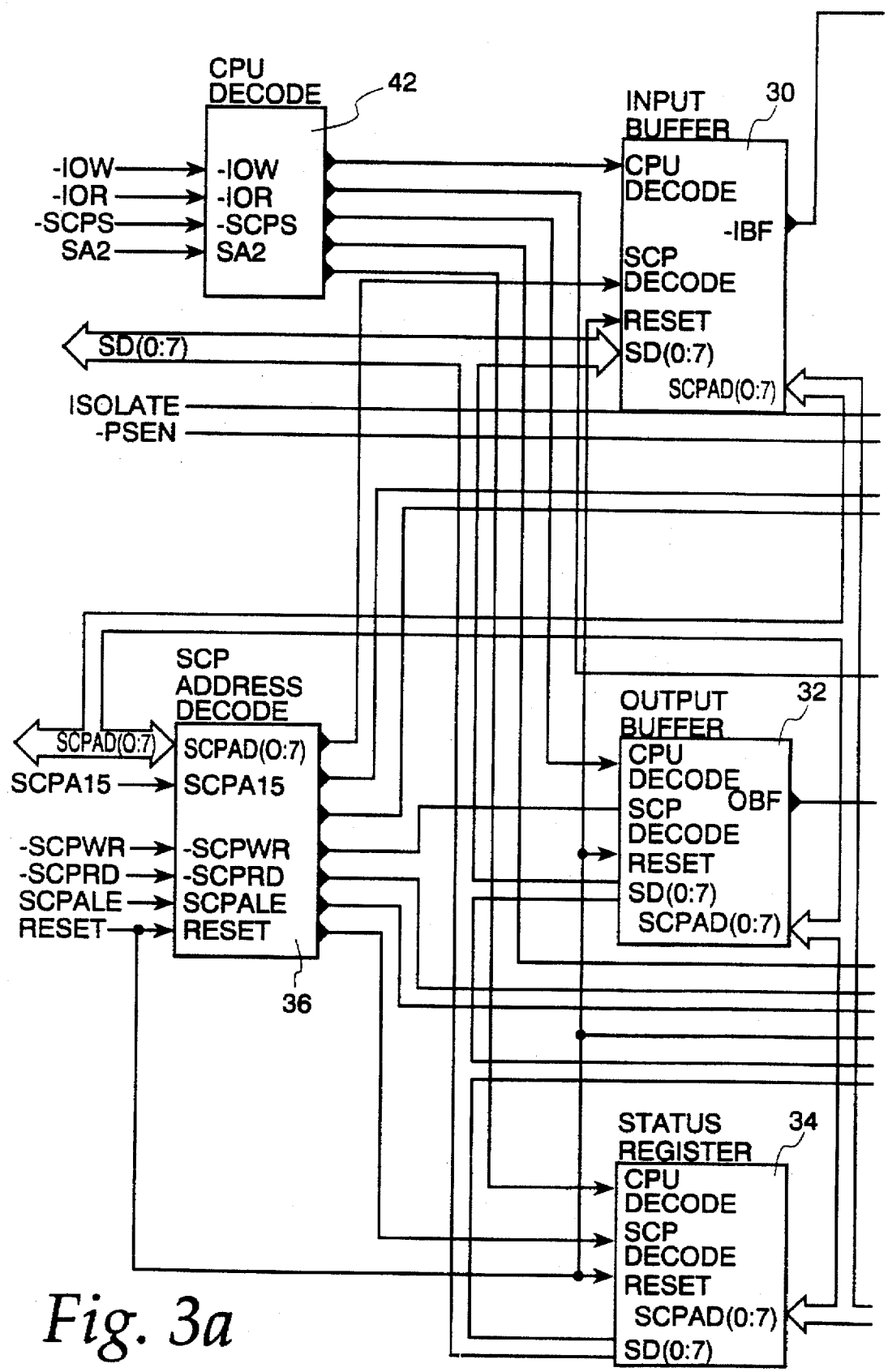
FIGS. 3A–3B are block diagrams of the SCPI in accordance with the present invention.
Figure 3B:
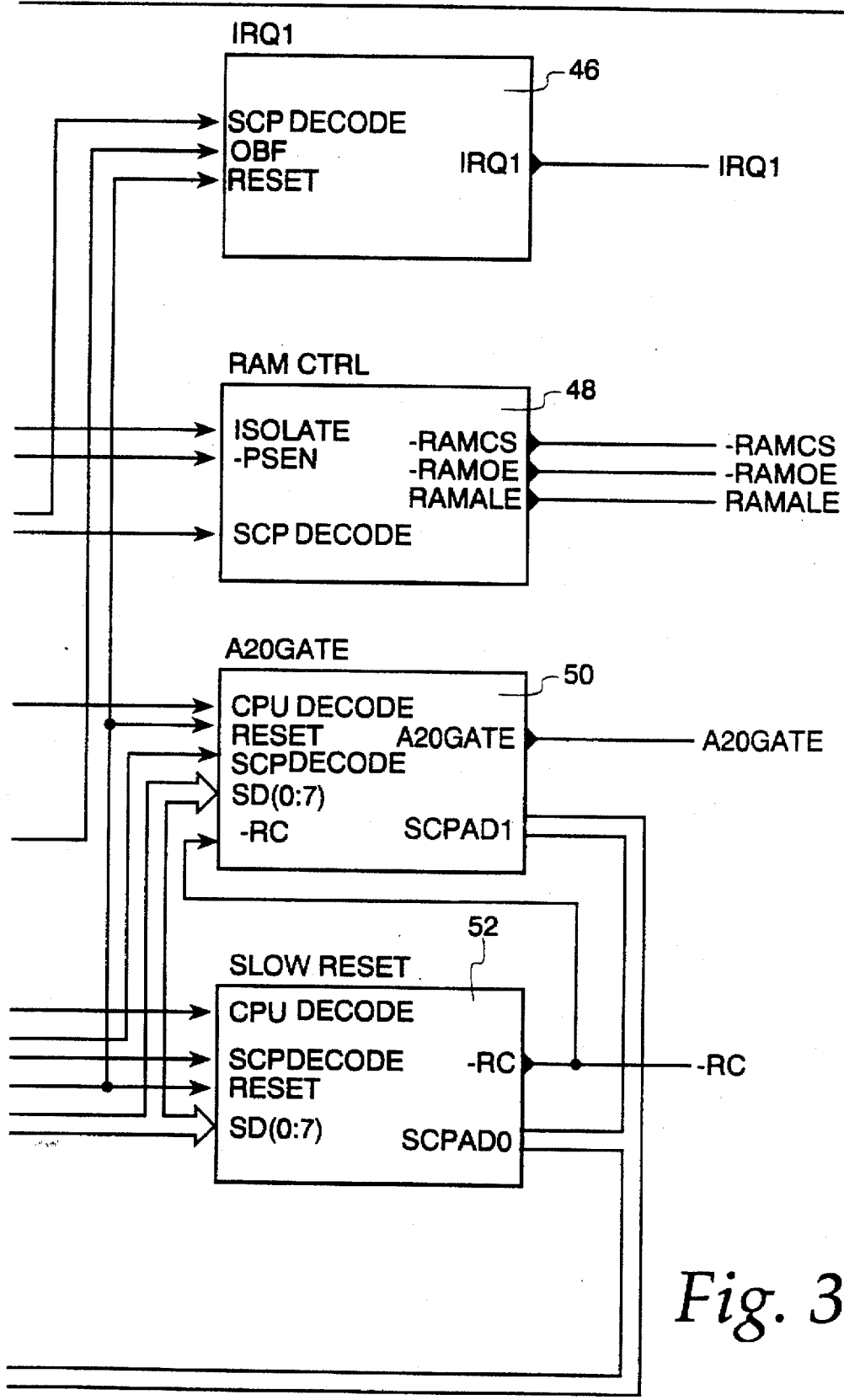

An internal block diagram of the SCPI 28 is provided in FIG. 3. As will be discussed in detail below, the SCPI 28 allows communication between the SCP 26 and the CPU as well as communication between the CPU and the SCP 26 by way of three registers (FIG. 3); an input buffer 30, an output buffer 32 a status register 34. The SCPI 28 further includes SCP 26 address decoding logic 36, CPU decoding logic 42, slow reset logic 44, external random access memory (RAM) control logic 48, interrupt logic 46 and A20 signal logic 50.

Another important aspect of the SCPI relates to control of the A20 signal which allows memory access above the one megabyte boundary. This signal is set virtually immediately after the command/data sequence and data are received. In known systems, a command to control A20 signal is written by the CPU to an input buffer. In order to allow time for the SCP to read the data and set the Gate A20, a delay is incorporated to allow the SCP to read the data and set the A20 signal. Since some of the new microprocessors run much faster than the application software program allows, a time-out can occur long before the A20 signal is set resulting in the computer running code out of the wrong memory space. The system in accordance with the present invention solves this problem.

SCPI PIN DESCRIPTION

Figure 10:
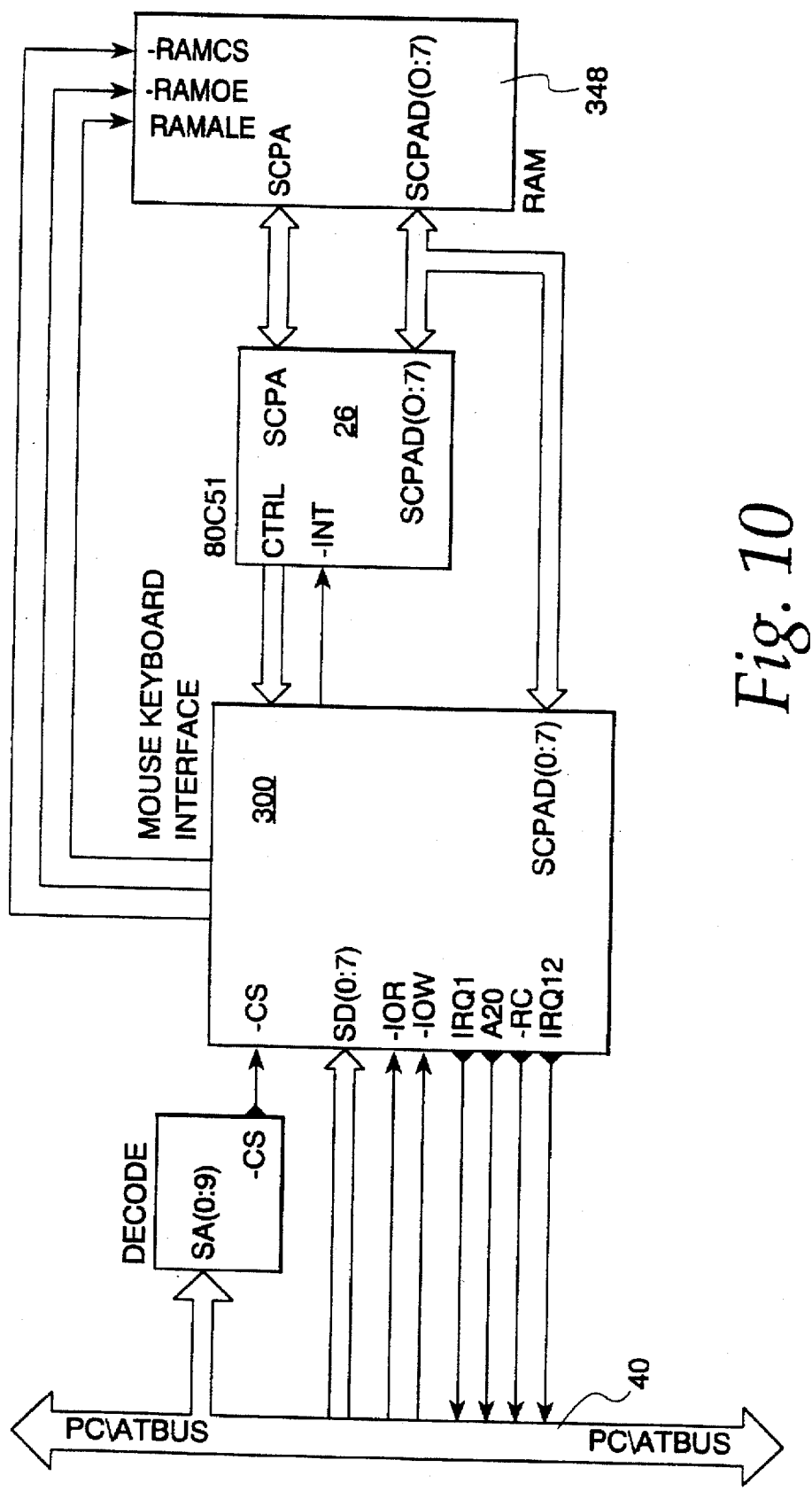
FIG. 10 is a block diagram of a system in accordance with an alternate embodiment of the present invention which utilizes a mouse keyboard interface (MKI) for emulating an Intel 8042 bus.

The SCPI 28 is a 44 pin integrated circuit as illustrated in FIG. 10, which may be formed as a gate array, such as by VLSI Technologies, Inc. Pin descriptions are provided in TABLE I.

TABLE I

SCPI PIN DESCRIPTION

| PIN NO. | TYPE | NAME | PIN DESCRIPTION |
|---|---|---|---|
| | | CPU Interface | |
| 29 | I | RESET | Hardware Reset of SCPI |
| 41 | I | –IOW | CPU I/O Write Strobe |
| 40 | I | –IOR | CPU I/O Read Strobe |
| 39 | I | –SCPCS | Decode of SA 9:0. Provide an active signal when an access to 062H–06EH (even) happens |
| 38 | I | SA2 | System Address Bus Bit 2 |
| 4, 5, 8, 9, 26, 27, 30, 31 | B | SD0:7 | System Data Bus Bits 0–7 |
| 37 | O | IRQ1 | Keyboard Interrupt |
| 22 | O | A20GATE | Enable access to the memory above 1 megabyte |
| 15 | O | –SLOWRST | System Processor reset |
| | | SCP Interface | |
| 18 | I | SCPA15 | A15 from the SCP Processor |
| 2, 3, 10, 11, 24, 25, 32, 33 | B | SCPAD0:7 | Multiplexed address data bus from SCP |
| 16 | I | SCPALE | Address Latch Enable for SCPAD0:7 |
| 6 | I | –SCPRD | Memory Read Strobe |
| 7 | I | –SCPWR | Memory Write Strobe |
| 17 | I | –PSEN | Program Store Enable. Read strobe to external Program Memory |
| 19 | O | –IBF | Input Buffer Full. Interrupt to SCP when the CPU has written to the Input Buffer |
| | | External RAM Control | |
| 42 | O | –RAMCS | RAM Chip Select |
| 44 | O | –RAMOE | RAM Output Enable |
| 43 | O | RAMALE | RAM Address Latch Enable |
| | | External Port Control | |
| 14 | O | –P4WR | Port 4 Write. Used to clock SCPAD0:7 |

TABLE I-continued

SCPI PIN DESCRIPTION

| PIN NO. | TYPE | NAME | PIN DESCRIPTION |
|---|---|---|---|
| | | | into 8 external Flip-Flops. Provides 8 extra outputs for the SCP |
| 13 | O | -P4RD | Port 4 Read. Output enable a buffer to SCPAD 0:7 to provide 8 inputs |
| 20 | O | -P5WR | Port 5 write. Used to clock SCPAD0:7 into 8 external Flip-Flops. Provides 8 extra outputs for the SCP |
| 21 | O | -P5RD | Port 5 Read. Output enable a buffer to SCPAD 0:7 to provide 8 inputs |
| 36 | O | -P6WR | Port 6 Write. Used to clock SCPAD0:7 into 8 external Flip-Flops. Provides 8 extra outputs for the SCP |
| 35 | O | -P6RD | Port 6 Read. Output enable a buffer to SCPAD 0:7 to provide 8 inputs |
| Power and Ground | | | |
| 28 | I | -ISOLATE | In the event the SCP is operating while the rest of the unit is not powered, this signal will isolate the rest of the signals |
| 1, 34 | | VCC | Power Supply |
| 12, 23 | | GND | Ground |

The required output current driving capability of the pins is listed in TABLE II.

TABLE II

CURRENT DRIVING ABILITY OF OUTPUTS

The output pins of the SCPI should have the following current driving abilities:

| | |
|---|---|
| SCPAD 0:7 | 12 mA |
| SD 0:7 | 16 mA |
| IRQ1 | 4 mA |
| -SLOWRST | 4 mA |
| A20GATE | 12 mA |
| -IBF | 2 mA |
| -RAMCS | 2 mA |
| -RAMOE | 2 mA |
| RAMALE | 8 mA |
| -P4WR | 8 mA |
| -P5WR | 8 mA |
| -P5RD | 8 mA |
| -P6WR | 8 mA |
| -P6RD | 8 mA |

SCP INTERFACE

It is to be understood that as used herein, an "H" at the end of a number indicates that the number is a hexidecimal number. It is also to be understood that a minus sign (-) in front of a signal name, such as -IOW, indicates the logical complement of the signal and is identical to the format $\overline{IOW}$.

The SCP 26 can address the SCPI 28 as well as external RAM that is local only to the SCP 26. A signal SCPA15 determines if it is a RAM access or a SCPI access. If external RAM 48 is not used, the signal SCPA15 can be tied low, thus allowing all external memory accesses to be to the SCPI 28.

Figure 4A:
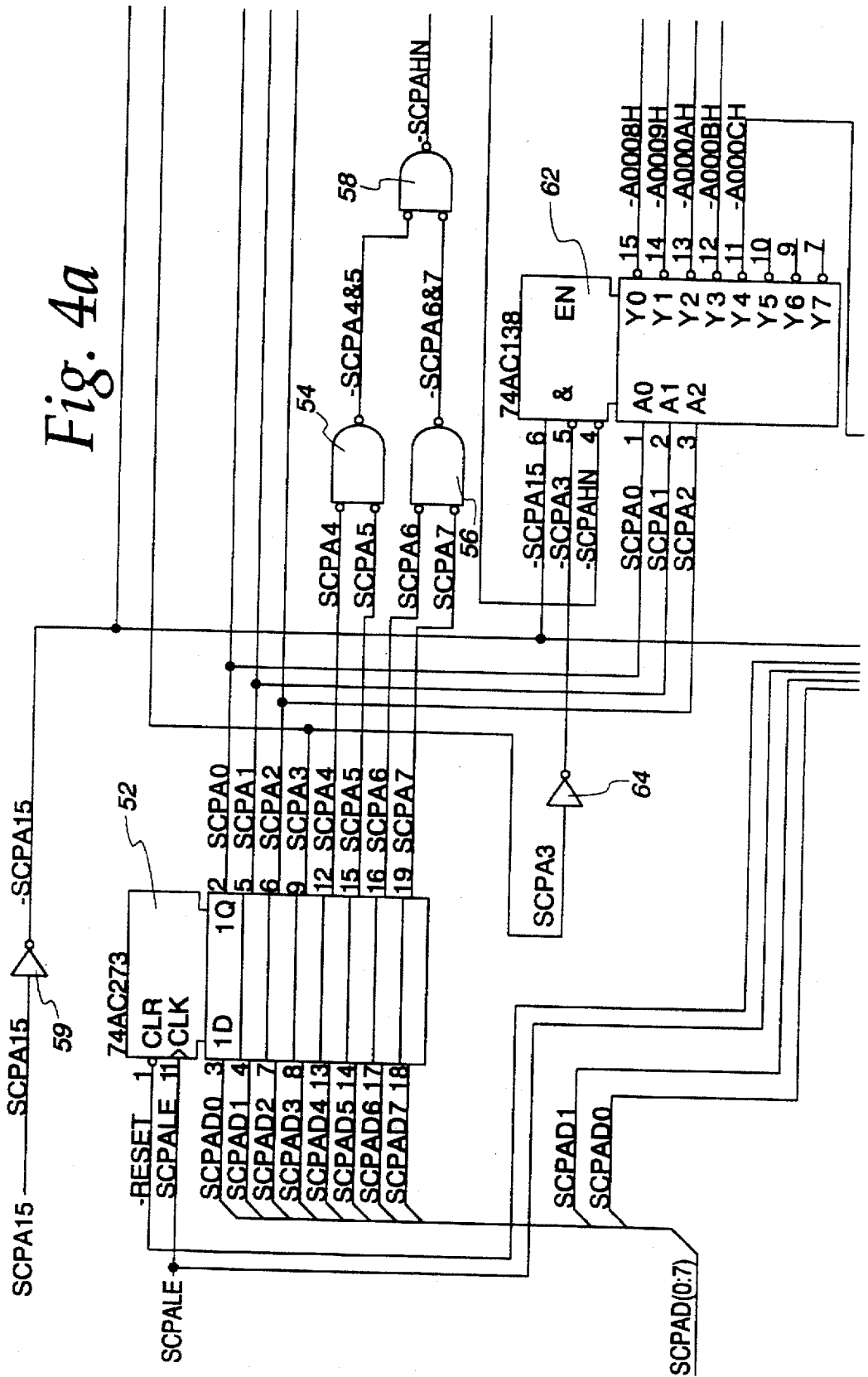
FIGS. 4A–4C are schematic diagrams of the address decoding circuitry in the SCPI in accordance with the present invention.
Figure 4B:
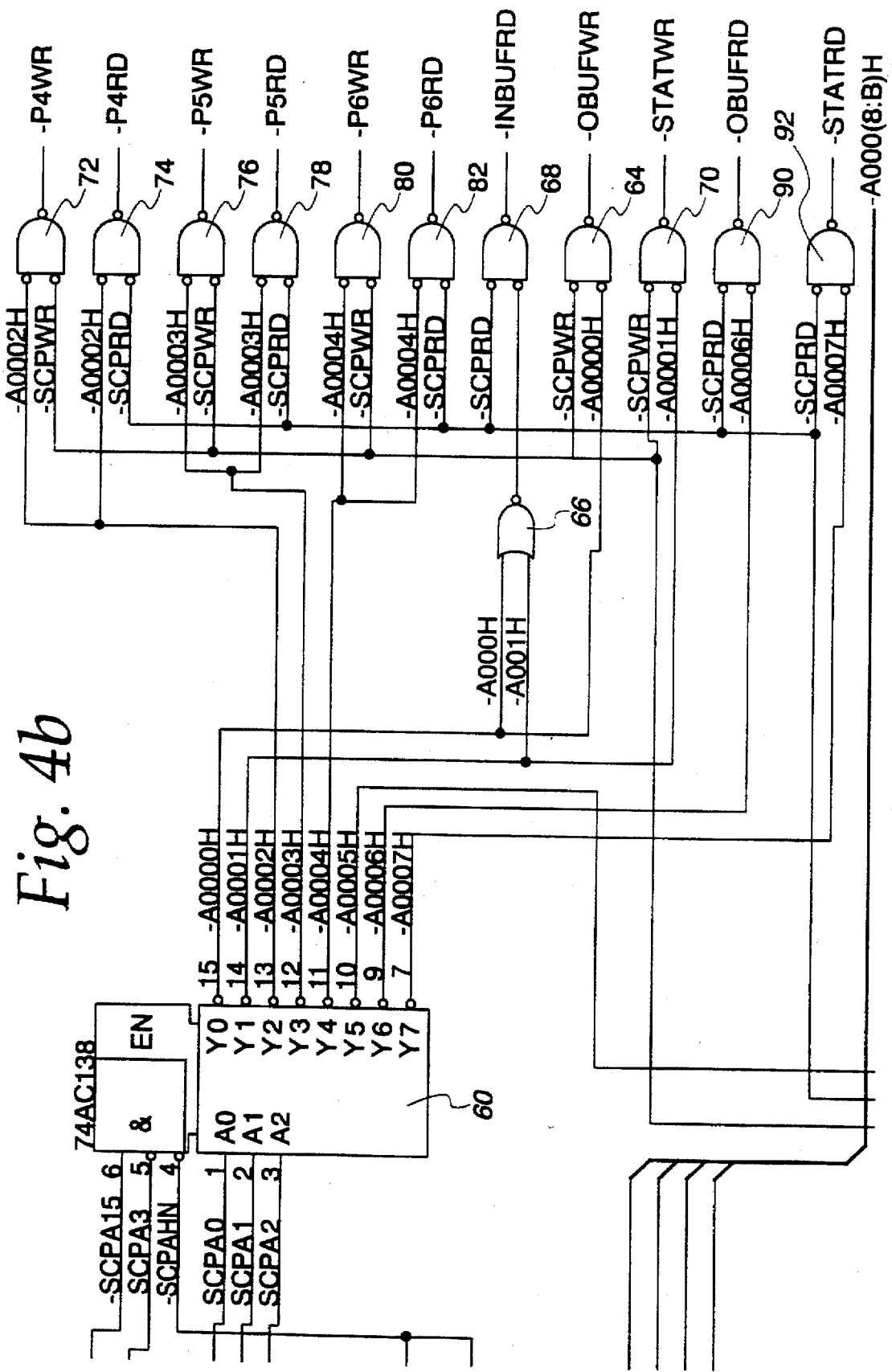
Figure 4C:
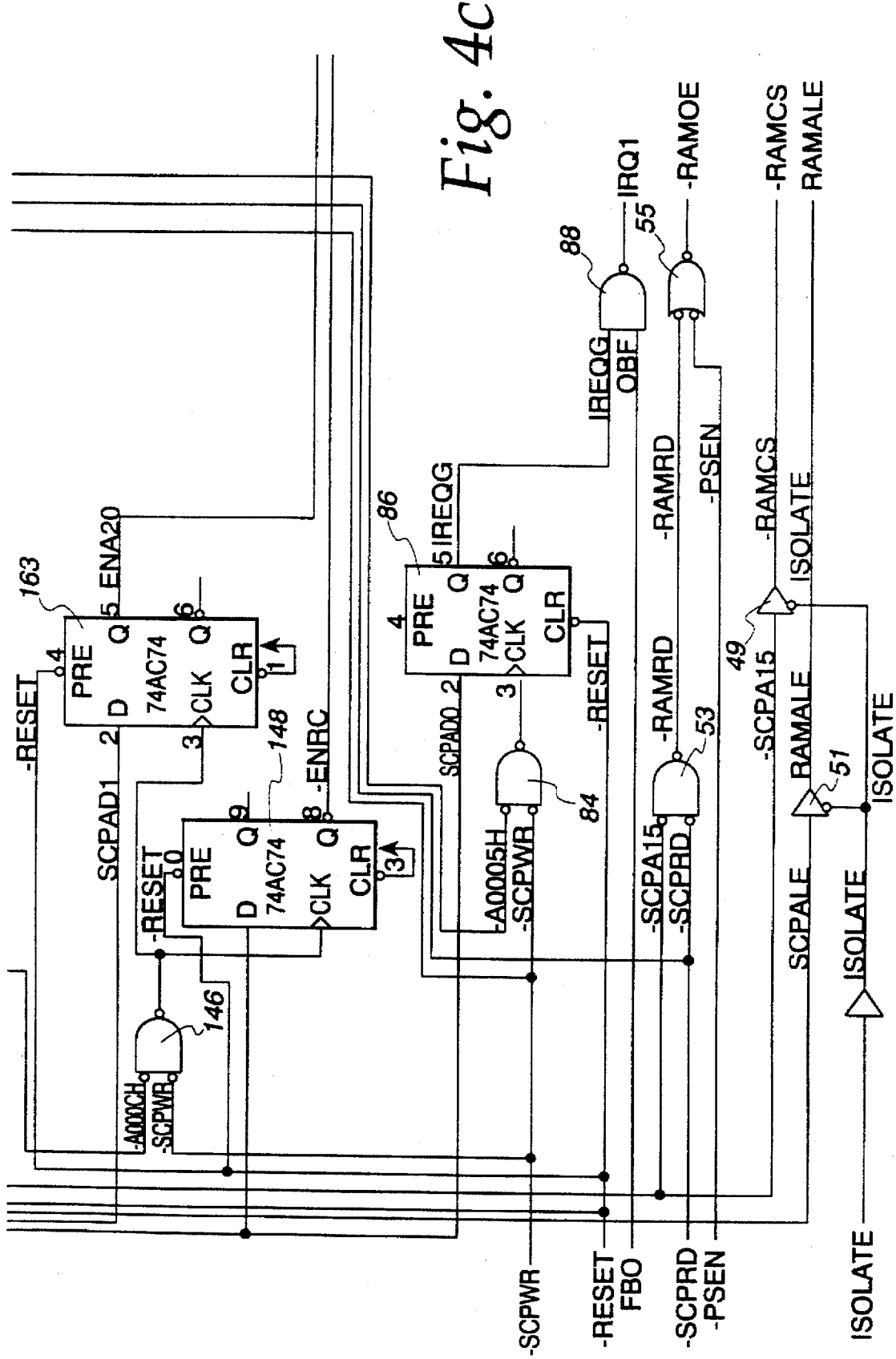
Figure 5A:
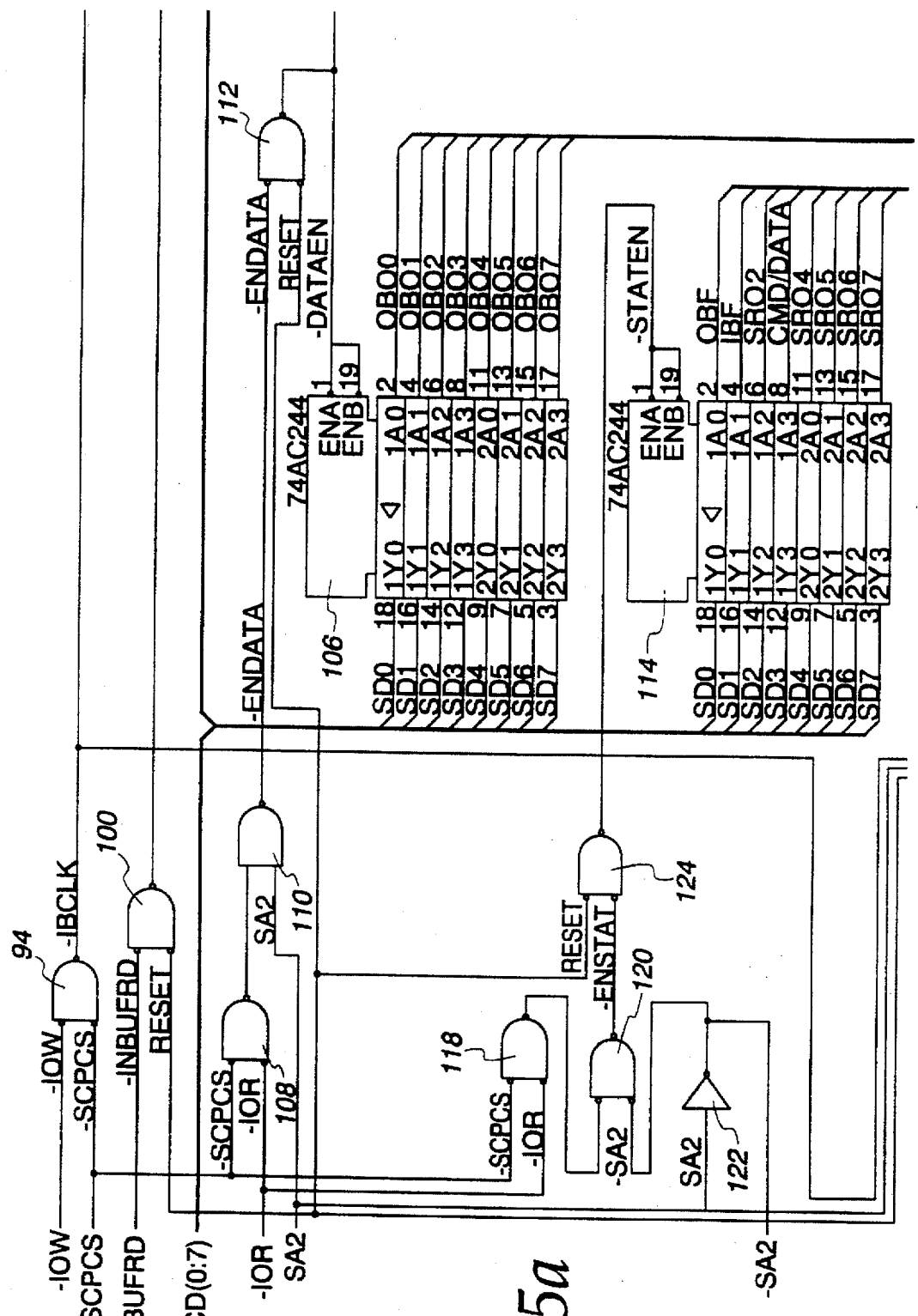
FIGS. 5A–5C are schematic diagrams of SCP/CPU interface logic circuitry in accordance with the present invention.
Figure 5B:
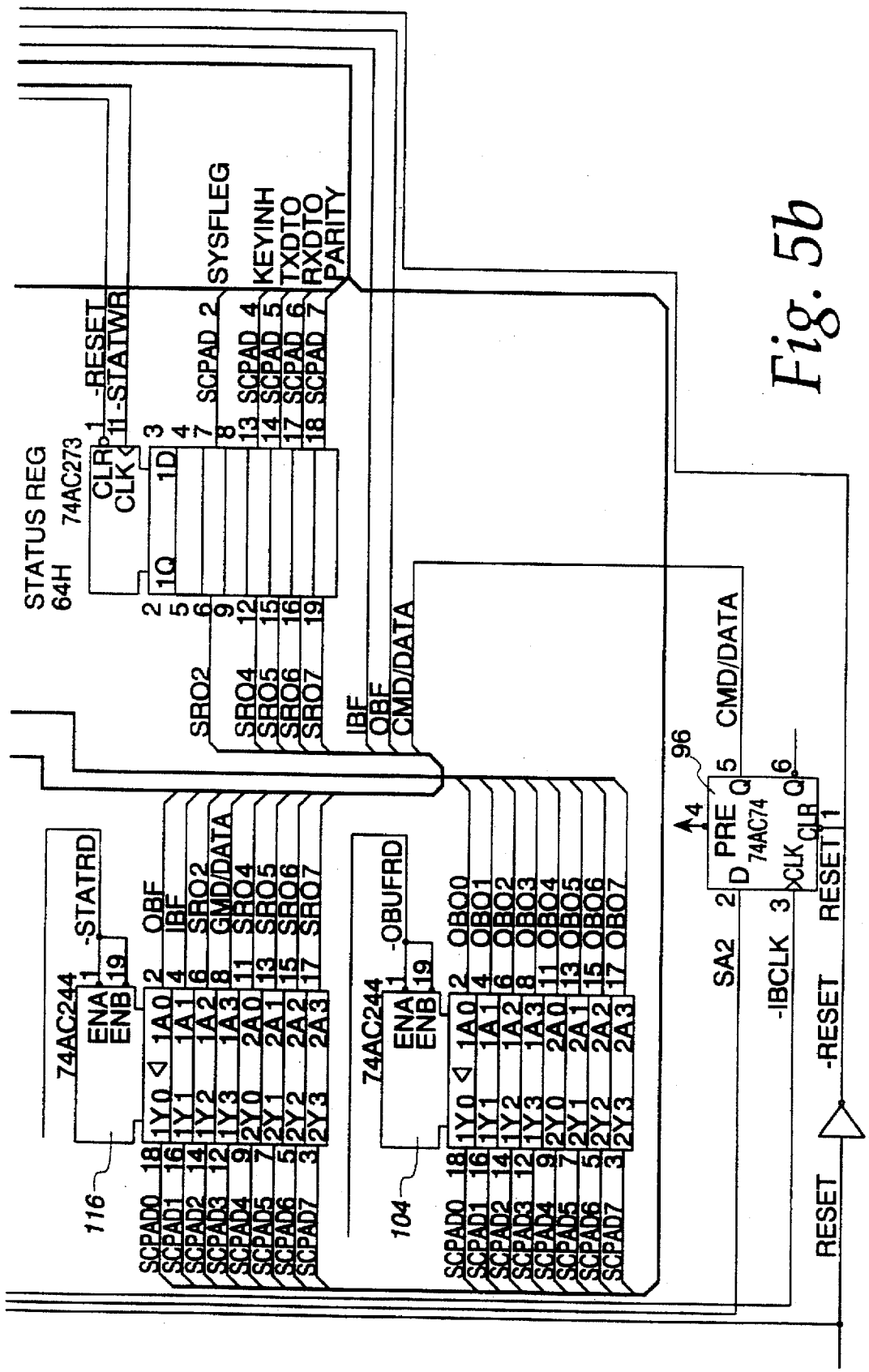
Figure 5C:
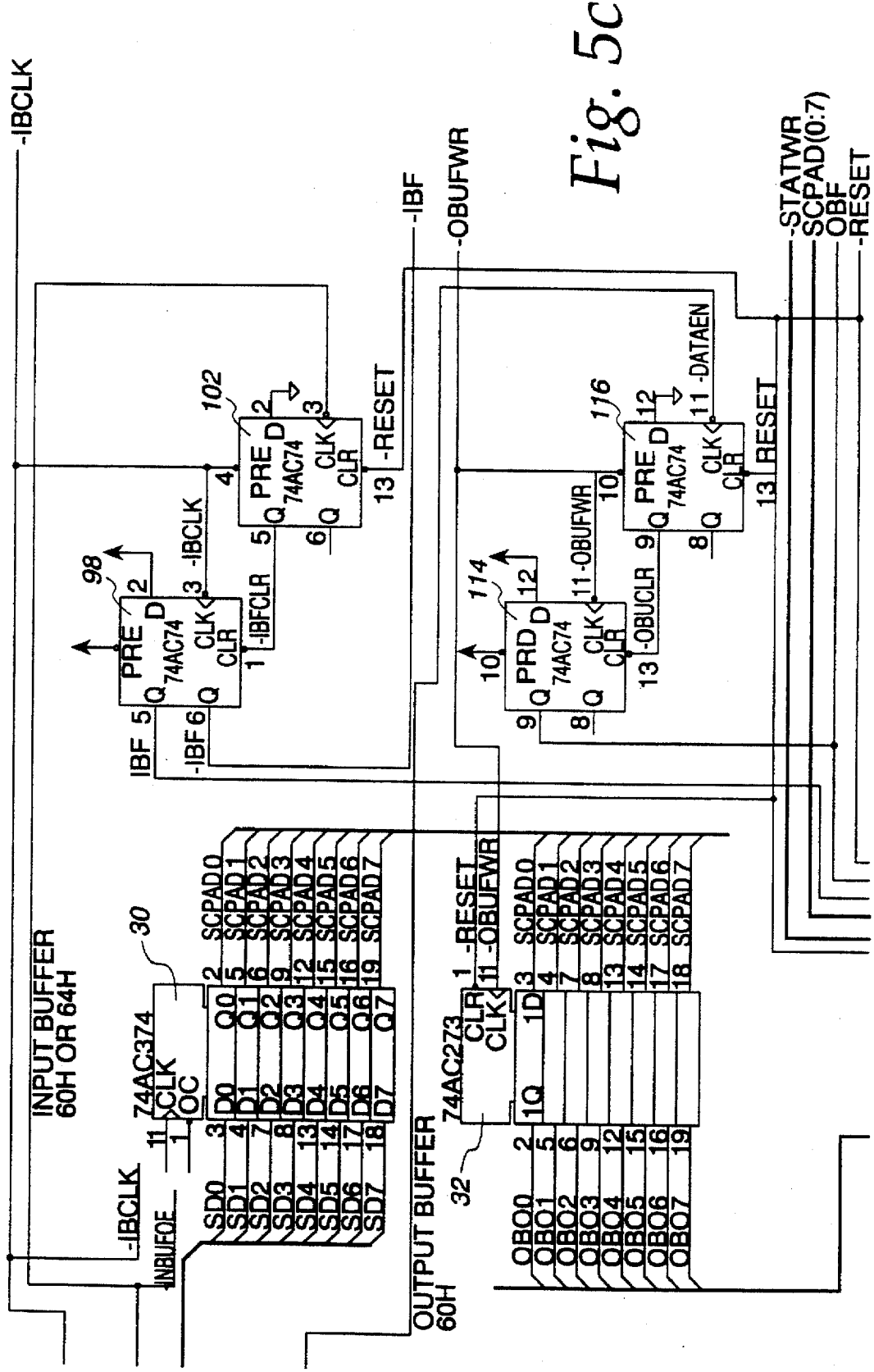

The RAM control circuitry 48 is illustrated in detail in FIG. 4. Thirty-two kilobytes of external RAM 48 can be addressed by the SCP 26 at addresses 8000H to FFFFH for program storage. More particularly, the SCPI 28 generates a RAM chip select signal (-RAMCS), a RAM output enable signal (-RAMOE) and a RAM address latch enable signal (RAMALE) for external RAM control.

The RAM chip select signal (-RAMCS) is available at the output of a tristate device 49. The signal (-SCPA15) is applied to the input of the tristate device 49 indicating a RAM access. The tristate device 49 is controlled by an ISOLATE signal (discussed below) which enables the tristate device 49, except under certain conditions, such as when the SCP 26 is operating with no power available to the other components.

The RAM address latch enable signal (RAMALE) is available from another tristate device 51, also controlled by the ISOLATE signal. The input to the tristate device 51 is a signal (SCPALE), an address latch enable for the SCP external address data bus (SCPAD0-SCPAD7).

The RAM output enable signal (-RAMOE) is generated by a NAND gate 53 and a NOR gate 55. The output of the NOR gate 55 represents the signal (-PSEN), program memory enable, is applied to an inverting input of the NOR gate 55. A RAM read signal (-RAMRD) is applied to another inverting input of the NOR gate 55. The signal (-RAMRD) is available at the output of a NAND gate 53. The NAND gate 53 receives two inputs. One input is a SCP read signal (-SCPRD). The other signal is (-SCPA15) which represents a RAM access.

The SCP interface to the SCPI is accomplished through a memory mapping scheme, identified by the logic block 36 and illustrated in detail in FIG. 4. The scheme utilizes Intel 8051 external memory address data lines (SCPAD0-SCPAD7), connected as inputs to an eight bit register 52, which may be a Motorola type 74AC373. During a memory access, a lower address byte is latched into the register 52 using an SCP latch enable signal (SCPALE), applied to the clock input (CLK) of the register 52.

The addresses from the SCP external address data lines (SPCAD0-SCPAD1) are available at the output of the register 52 forming an eight bit internal address bus (SCPA0-SCPA7). The upper four bits of the internal address bus (SCPA4-SCPA7) are decoded by three NAND gates 54, 56 and 58. More specifically, bits SCPA4 and SCPA5 are applied to inverting inputs of the NAND gate 54. Bits SCPA6 and SCPA7 are applied to inverting inputs of the NAND gate 56. The outputs of the two NAND gates 54 and 56 are applied to inverting inputs of the NAND gate 58. The NAND gate 58 generates a signal (-SCPAHN) which indicates that the upper address bits (SCPA4-SCPA7) are low. This signal (-SPAHN) is applied to an inverting enable input of a decoder/demultiplexer 60 and to an inverting input enable of a decoder/demultiplexer 62. The decoder/demultiplexers 60 and 62 may be Motorola Model No. 74AC138.

The lower four bits (SCPA0-SCPA3) of the internal address bus (SCPA0-SCPA7) are also applied to the input (A0-A2) of the decoder/demultiplexers 60 and 62. Since the bit SCPA3 is low for addresses A0000H through A0007H and high for addresses A00008H through A0000CH it is applied to an inverting enable input of the decoder/ demultiplexer 60 to generate address signals A0000H through A00007H. The signal (−SCPA15), indicating an SCPI access, available at the output of an inverter 59, is applied to a noninverting enable input of the decoder/ demultiplexer 60. Thus, address signals A0000H through A00007H are generated at the output of the decoder 60 in response to the address bus bits SCPA0 through SCPA2.

The signals (−SCPAHN) and (−SCPA15) are also applied to non-inverting and inverting enabling inputs of the decoder/demultiplexer 62, respectively. The bit SCPA3 is applied to an inverter 64 to produce an (−SCPA3) signal which is low for addresses above A0007H. The signal (−SCPA3) is applied to an inverting enable input of the decoder/demultiplexer 62. Since the signal (−SCPA3) is low for addresses A00008H through A000CH, the decoder/ demultiplexer 62 can also decode these addresses from the address lines SCPA0–SCPA2.

Address signals (−A0000H through −A000CH) are generated at the output terminals (Y0–Y7) of the decoder/ demultiplexers 60 and 62. These address signals are further combined with other signals to generate memory mapped control signals. More specifically, the address signal −A0000H is applied to an inverting input of a NAND gate 64 along with a system control processor write signal (−SCPWR) to generate an output buffer write signal (−OBUFWR). The output buffer write signal (−OBUFWR) allows the SCP 26 to write a byte to the output buffer 32 at the address A0000H.

The address signals −A0000H and −A0001H are also applied to a NOR gate 66. The output of the NOR gate 66 is applied to an inverting input of a NAND gate 68. A system control processor read signal (−SCPRD) is applied to NAND gate 68 along with the output of the NOR gate 66 to produce an input buffer read signal (−INBUFRD). The input buffer read signal (−INBUFRD) allows the SCP 26 to read the contents of the input buffer 30 at address A0000H or A0001H.

The address signal −A0001H is also applied to a NAND gate 70 along with an SCP write signal (−SCPWR) to generate a status register write signal (−STATWR). The status register write signal (−STATWR) allows the SCP 26 to write to the status register 34 at address A0001H.

The address signals −A0002H through −A0004H allow the SCP 26 to access external ports P4–P6. These address signals are applied to inverting inputs of six NAND gates 72, 74, 76, 78, 80 and 82 along with system control processor write (−SCPWR) or system control processor read (−SCPRD) signals as shown in FIG. 4 to enable the SCP 26 to read and write to the external ports P4–P6 at addresses A0002H, A0003H and A0004H. Each external port can provide 8 additional input pins and 8 additional output pins for the SCP 26.

The address signal −A0005H is used as an SCP/CPU interface to generate a keyboard interrupt (IRQ1) logic 46. More specifically, the address signal −A0005H is applied to an inverting input of a NAND gate 84. An SCP write signal (−SCPWR) is applied to another inverting input of the NAND gate 84. The output of the NAND gate 84 is applied to the clock input (CLK) of a D-type flip-flop 86. One bit SCPAD0 of the external SCP address bus is applied to the D input of the flip-flop 86. The output from the NAND gate 84 is used to strobe the bit SCPAD0 into the flip-flop 86 to generate an IREQG signal. This signal (IREQG) is applied to the input of a NAND gate 88 along with an output buffer flag full signal (OBF). When bit SCPAD0 is high, the keyboard interrupt signal (IRQ1) is enabled when the SCP 26 writes to address A0005H. During such a condition when bit SCPAD0 is low, the keyboard interrupt signal (IRQ1) is disabled. During such a condition the NAND gate 88 allows an interrupt signal (IRQ1) to be generated by the SCPI 28 when the output buffer 32 is full.

The address signal (−A0006H) is applied to an inverting input of a NAND gate 90 along with an SCP read signal (−SCPRD). The output of the NAND gate 90 is an output buffer read signal (−OBUFRD) which allows the SCP 26 to read the output buffer 32 at address A0006H.

The address A0007H is applied to an inverting input of a NAND gate 92 along with an SCP read signal (−SCPRD). The output of the NAND gate 92 is a status register read signal (−STATRD) which allows the SCP 26 to read the status register 34 at address A0007H.

The address signals A008H, A0009H, and A000CH relate to the slow reset system. The address signals A000AH and A000BH are used to generate the A20 signal. These address signals will be discussed in detail below.

CPU TO SCP INTERFACE

Communication between the CPU and the SCP 26 is by way of an input buffer 30, an output buffer 32 and a status register 34. The input buffer 30 is an eight bit register with tristate outputs (Q1–Q7), such as a Motorola type 74AC374. In such a device, a clock input (CLK) and output enable input (OC) are common to all eight bits. The output buffer 32 and the status register 34 are also eight bit registers. These registers 32 and 34 may be octal D-type flip-flops having separate D-type inputs (D0–D7) and separate tristate outputs (Q0–Q7), such as a Motorola type 74AC273. Such devices contain a clock input (CLK) and a clear (CLR) input, common to all eight flip-flops.

The input buffer 30 may be written to only by the CPU and read only by the SCP 26. The CPU writes to the input buffer 30 at addresses 60H or 64H by writing to the system data bus (SD0–SD7). The system data bus (SD0–SD7) is applied to the data inputs (D0–07) of the input buffer 30. The address is decoded by a CPU logic circuit 42 which does not form part of the present invention. A signal (−SCPCS) is generated by the CPU decode logic circuit 42 if the address is either 60H or 64H. The signal (−SCPCS) is applied to an inverting input of a NAND gate 94. A CPU input/output write signal (−IOW) is applied to another inverting input of the NAND gate 94 to produce a signal (−IBCLK), which indicates that the CPU is writing to the input buffer 30 at either address 60H or 64H. The signal (−IBCLK) is applied to the clock input (CLK) of the input buffer 30. Thus, any time the CPU writes to address 60H or 64H, data on the system data bus 40 (SD0–SD7) is strobed into the input buffer 30.

The CPU can either write data or a command to the input buffer register 30. Any time the CPU writes to the input buffer 30, a command data flag (CMD/DATA) is set in the status register 34 (bit 3). This lets the SCP 26 know that a byte containing either a command or data is in the input buffer 30. A write to 64H represents a command (command data flag high) while a write to 60H represents data (command data flag low).

The command data flag (CMD/DATA) is set by way of a flip-flop 96. More particularly, bit SA2 of the system address bus is applied to a D input of a flip-flop 96. Bit SA2 depending on whether it is high or low, determines whether CPU addressed 60H or 64H. The signal (−IBCLK) is applied to the clock input (CLK) of the flip-flop 96. The output signal (CMD/DATA) from the flip-flop 96 depending on whether it is high or low enables the SCP 26 to determine whether the last byte written to the input register 30 by the CPU was command or data.

Each time the CPU writes to the input buffer 30, an input buffer full flag (IBF), bit 1 of the status register 34, is set as well as the CMD/DATA flag, as discussed above. The input buffer full flag (IBF) acts as an interrupt to the SCP 26 to let it know there is a byte in the input register 30 from the CPU which has not yet been read. The command/data flag tells the SCP 26 whether the last byte written by the CPU was a command (written to address 64H) or data (written to address 60H).

A D type flip-flop 98 having its D input tied high is used for the input buffer full flag (IBF). A signal (–IBCLK) is applied to the clock input (CLK) of the flip-flop 98. Thus, the input buffer flag (IBF) will be set each time the CPU writes to input buffer 30.

Once the SCP 26 determines whether the byte in the input buffer 30 is command or data, it reads the byte in the input buffer 30 and the input buffer flag IBF is cleared by the SCPI 28. More particularly, the SCP 26 reads the byte out of the input buffer 80 by reading addresses A000H or A001H. More specifically, an input buffer read signal (–INBUFRD) is applied to a NAND gate 100 along with a reset signal. The (–INBUFRD) signal is a decode of addresses A0000H and A0001H and is active any time the SCP 26 is attempting to read these addresses. The output of the NAND gate 100 is an input buffer output enable signal (–INBUFOE) which is applied to the enable input (OC) of the input buffer 30 which allows the byte to appear on the multiplexed system control processor address data bus SCPAD0–SCPAD7 to be read by the SCP 26. Prior to this state, the input buffer output 26 is in a high impedance state.

After the SCP 26 reads the input buffer 30, the input buffer full flag (IBF) is cleared automatically by a flip-flop 102. More particularly, the input buffer enable signal (–INBUFOE) is applied to the clock input (CLK) of the flip-flop 102. The D input of this flip-flop is tied to system ground. Thus, once the byte in the input buffer 30 is placed on the system control processor address data lines (SCPAD0–SCPA07) and read, an input buffer clear signal (–IBFCLR) is generated by the flip-flop 102 and applied to the clear input (CLR) of a flip-flop 98. This clears the input buffer full flag (IBF). In order to avoid writing over a byte in the input buffer 30, the CPU should check the input buffer full flag (IBF) in the status register 34 prior to writing to the input buffer 30.

The system control processor SCP communicates back to the CPU through the output buffer 32 and the status register 34. The output buffer 32 is read only by the CPU at address 60H and read and written to by the SCP 26. During normal operation, the SCP 26 can only write to the output buffer 32. In order to avoid overwriting a byte in the output buffer 32 that has not yet been read by the CPU, the SCP 26 should read the status register 34 before writing to the output buffer 32.

The status register 34 is an 8 bit register consisting of 8 D-type flip-flops with a common clock and an asynchronous reset, such as a Motorola type 74AC223. The status register 34 may be written to and read by the SCP 26. The read capability enables the SCP 26 to read the output buffer full flag (OBF) and the command data flag (CMD/DATA). The status register 34 may be read any time by the CPU. Bit definitions for the status register 34 are provided in TABLE III.

The SCP 26 can write to the output buffer 32 by writing to address A0000H. As previously discussed, this generates an output buffer write signal (–OBUFWR) which is applied to the clock input (CLK) of the output buffer 32. The external SCP address data lines (SCPAD0–SCPAD7) are applied to the inputs of the output buffer 32. The output bits of the output buffer (OB00–OB07) are applied to inputs of registers 104 and 106, which may be octal buffer and line drivers having tristate outputs, such as a Motorola type 74AC244.

The output lines of the register 106 are tied to the system data bus SD0–SD7 to allow the CPU to read the output buffer 32. More specifically, the CPU reads the register 106 at address 60H. This is accomplished with three NAND gates 108, 110 and 112. A signal (–SCPCS), indicative of an address 60H or 64H, and a signal (–IOR), indicative of a read operation by the CPU, are applied to inverting inputs of the NAND gate 108. The output of the NAND gate 108 is applied to an inverting input of the NAND gate 110. The output of the NAND gate 108 is a signal representing that the CPU is reading address 60H or 64H. A signal SA2, indicating whether the address is 60H or 64H, is applied to another inverting input of the NAND gate 110. If the address is 60H, an enable data signal (–ENDATA) is generated at the output of the NAND gate 110. This signal (–ENDATA) is applied to an inverting input of the NAND gate 112 to produce a data enable signal (–DATEN). The signal (–DATEN) is then applied to the enable inputs ENA/ENB of the register 106. This allows the CPU to read the register 106 which is representative of the byte contained in the output buffer 32.

Each time the SCP 26 writes to the output buffer 32, the output buffer full flag (OBF) is set automatically. The output buffer full flag (OBF) is available at the output of a flip-flop 114. This flag is set by applying an output buffer write signal (–OBUFWR) to the clock input (CLK) of the flip-flop 114. The (–OBUFWR) signal is generated any time the SCP 26 writes to the output buffer 32. More specifically, a D input of the flip-flop 114 is tied high. Thus, an output buffer full flag (OBF) will be generated any time the SCP writes to the output buffer 32.

Once the CPU reads the output buffer 32, the output buffer full flag (OBF) is cleared by a flip-flop 116. More particularly, the data enable signal (–DATEN) from the NAND gate 112 is applied to the clock input (CLK) of the flip-flop 116. The (–DATEN) signal represents that CPU is reading the output buffer 32 at address 60H. By applying this signal to the flip-flop 116, an output buffer full flag clear signal (–OBFCLR) is generated at the output of the flip-flop 116 each time the CPU reads the register 106. This signal (–OBFCLR) is applied to the clear CLR input of the flip-flop 114 to clear the output buffer full flag (OBF) each time the CPU reads the output buffer 32.

A register 104 allows the SCP 26 to read the byte in the output buffer 32. More specifically, the output of the register 104 is connected to the SCP address data lines (SCPAD0–SCPAD7). The SCP 26 reads the register 104 at address A0006H by producing an output buffer read signal (–OBUFRD). This signal (–OBUFRD) is applied to enable inputs ENA/ENB of the register 104 to place the byte in this register on the SCP address data lines (SCPA00–SCPA07) to be read by the SCP 26.

The SCP 26 can write to the status register 34 at address A0001H which generates a signal (–STATWR). This signal (–STATWR) is applied to the clock input CLK of the status register 34 to enable the SCP 26 to write to the status register 34 by way of the internal SCP address data lines (SCPAD0–SCPAD7). This data is then available on the status register output bus SR00–SR07 which is applied to registers 114 and 116. The registers 114 and 116 may be of the same type as registers 104 and 106.

The register 116 allows the SCP 26 to read the status register 34. More specifically, the status register 34 may be read by the SCP 26 at the output of the register 116 on the SCP address data bus SCPAD0–SCPAD7 any time the SCP 26 reads address A0007H. During this condition, a status read signal (–STATRD) is generated and applied to the enable inputs ENA and ENB of register 116 which allows the SCP 26 to read this register 54.

The CPU can read the output of the status register 34 at register 114. More specifically, the output of the register 56 is connected to the system data bus SD0–SD7. The CPU reads the output of the register 56 at address 64H by applying a status enable signal (–STATEN) to the enable inputs ENA and ENB of the register 114. The signal (–STATEN) is generated by three gates 118, 120 and 122 and an inverter 124. More particularly, an SCP chip select signal (–SCPCS) is applied to an inverting input of the NAND gate 118. This signal represents that the CPU is addressing either A60H or A64H. An I/O write signal (–IOR) is applied to another inverting input of the NAND 118. The output of the first NAND gate 118 represents that the CPU is reading at an address 60H or 64H. The output of the NAND gate 118 is applied to an inverting input of the NAND gate 120. A signal SA2 is applied to the inverter 122 to generate a signal –SA2. The –SA2 signal indicates whether the address is A60H or A64H. The output of the inverter 122 is applied to another inverting input of the NAND gate 120. The output of the NAND gate 120 is applied to an inverting input of the NAND gate 124 which generates a status enable signal (–STATEN) any time the CPU is reading at an address A64H.

TABLE III

STATUS REGISTER BIT DEFINITON

The status register 34 is an eight bit register. Three bits are generated by the SCPI 28 while five bits are written by the SCP 26. Specifically, the output buffer full flag OBF, the input buffer full flag OBF, the input buffer full flag IBF and the command data flag (CMD/DATA) are generated by the SCPI 28. The remaining bits are written by the SCP 26.

Definitions for the 7 bits are as follows:

| BIT NUMBER | DEFINITION |
| --- | --- |
| Bit 7 | Parity error |
| Bit 6 | Receive time out |
| Bit 5 | Transmit time out |
| Bit 4 | Inhibit switch |
| Bit 3 | Command/Data |
| Bit 2 | System flag |
| Bit 1 | Input buffer full flag (IBF) |
| Bit 0 | Output buffer full flag (OBF) |

The command/data bit indicates whether the last byte written by the CPU was a command or data The IBF signal indicates when the CPU has written a byte to the input buffer but the system control processor SCP has not yet read the byte out of the input buffer 30. It can also be used by the CPU as a flag to indicate that the system control processor SCP is ready to receive a byte.

The OBF signal indicates when the SCP 26 has written a byte to the output buffer 32 which has not yet been read by the CPU. The OBF signal can also be used by the SCP 26 as a flag to indicate that the CPU is ready to receive a byte.

SLOW RESET

The slow reset signal (–RC) is an active low output signal to reset the CPU. It can be set by the CPU or set and cleared by the SCP 26. It is cleared when the SCPI 28 is reset by the reset pin. The SCP 26 can control the slow reset signal (–RC) by writing to addresses A0008H or A9009H. A write to address A0008H forces the slow reset signal active while a write to A0009H forces the slow reset signal (–RC) inactive. The data written to either location is ignored. All that is relevant is that a write takes place at the proper memory location.

More specifically, the address signal (A0008H) is applied to a NAND gate 126 along with a SCP write signal (–SCPWR). The output of the NAND gate 126 is a slow reset active signal (–SCPSRC). This signal (–SCPSRC) is applied to the clock input (CLK) of a flip-flop 128. The D input of a flip-flop 128 is tied to system ground. Thus, any time the address A0008H is written to by the SCP 26, a slow reset signal (SSETRC) is generated at the output of the NAND gate 128. This signal (SSETRC) along with input buffer read signal (–INBUFRD) is applied to inverting inputs of a NAND gate 130. The output of the NAND gate 130 is applied to an inverting input of a NOR gate 132. The output of the NOR gate 132 is applied to a preset input (PRE) of a flip-flop 134 to set the slow reset signal (–RC).

The slow reset signal (–RC) can be cleared by the SCP 26 by writing to the address A0009H. More specifically, the address signal (–A0009H) is applied to an inverting input of a NAND gate 136. The output of the NAND gate 136 is applied to the clear (CLR) input of the flip-flop 128.

The CPU can also set the slow reset signal (–RC) with a single write command unless it is prevented from doing so by the SCP 26 as discussed below. Specifically, the CPU can set the slow reset signal active by writing an even byte from F0H to FEH to address 64H. NAND gates 138 and 140 decode these bytes from the CPU. More specifically, system data bits SD4, SD5 and SD6 and SD7 are applied to the NAND gate 138. The output of the NAND gate 138 is applied to the NAND gate 140. System data bit SD0 is applied to an inverting input of the NAND gate 140. The output of the NAND gate 140 is a signal (–CPURC) representative of an even data byte between F0H and FEH. This signal (–CPURC) is applied to a NAND gate 142. A signal (–ENRC) is applied to another inverting input of the NAND gate 142. As will be discussed later, the signal (–ENRC) indicates whether CPU control of the slow reset signal has been disabled by the SCP 26. The output of the NAND gate 142 is applied to the D input of the slow reset flip-flop 134. A command clock signal (CMD/CLK), which represents that the CPU addressed the address 64H, is applied to the clock input (CLK) of the slow reset flip-flop 134.

The output of the flip-flop 134 is a signal representative of a slow reset signal (–RC). This signal (–RC) is applied to the input of a tristate device 144 which indicates the status of the slow reset signal (–RC) to be read by the SCP. More particularly, the output of the tristate device 144 is applied to a system control processor data line SCPAD0. The tristate device 144 is controlled by a NAND gate 146. An SCP read signal (–SCPRD) along with an address signal –A0008H is applied to inverting inputs of the NAND gate 146. The NAND gate 146 generates an enable signal (–RDRCOE) which enables the tristate device 144. Thus, whenever the SCP 26 reads address A0008H, the tristate device 144 is enabled to place the output of the slow reset flip-flop 134 on the system control address data bit SCPAD0. A logical 0 indicate that the slow reset is active while a logical 1 indicates that the slow reset signal is inactive.

The SCP 26 can also disable the CPU control of the slow reset by writing to address A000CH. More specifically, a signal representative of the address A000CH is applied to a NAND gate 146 (FIG. 4) along with the system control processor write signal (–SCPWR). The output of the NAND gate 146 is applied to a clock input (CLK) of a flip-flop 148. The SCP data bit SCPAD1 is applied to a D input of the flip-flop 148. If the data bit SCPAD1 is high the slow reset will be enabled. If the data bit SCPAD1 is low the slow reset will be disabled. The output of this flip-flop 148 is an enable reset signal (–ENRC) which is applied to the NAND gate 142 (FIG. 7) to either enable or disable the CPU from controlling the slow reset signal.

A20 SIGNAL CONTROL

The A20 signal allows memory above one megabyte to be accessed. This A20 signal can be set by the SCP 26 directly or by the SCPI 28 in response to a CPU command. The CPU controls the Gate A20 with a two byte sequence. The first byte is D1H is a command byte written to the address 64H. The second byte is a data byte written to the address 60H. The system data bit SD1 determines whether the A20 is to be set or cleared. The data bit SD1 is applied to the D input of an A20 signal flip-flop 168. The output of the flip-flop 168 is the A20 signal.

Figure 6A:
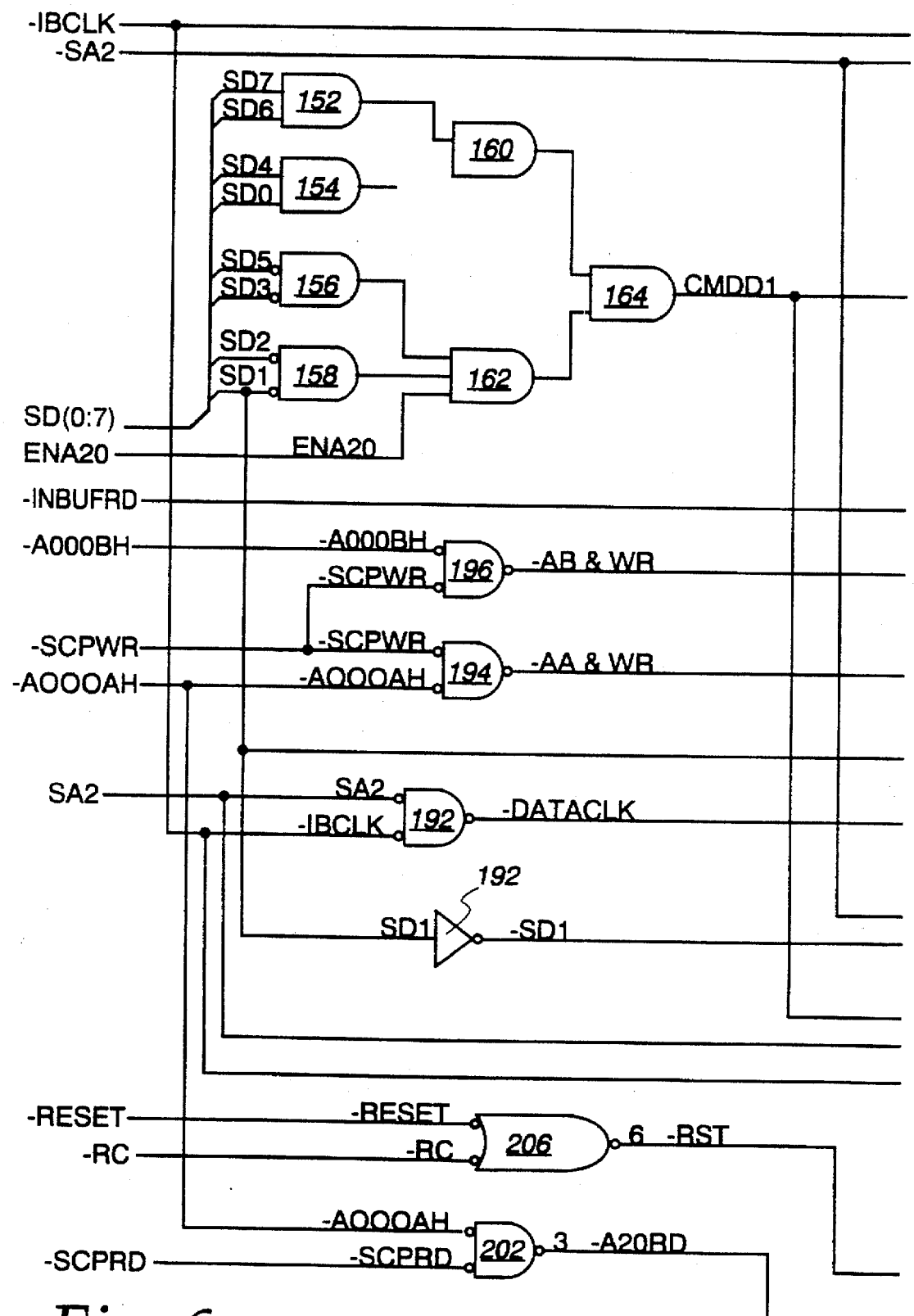
FIGS. 6A–6C are schematic diagrams of the control logic for the A20 signal control in accordance with the present invention.
Figure 6B:
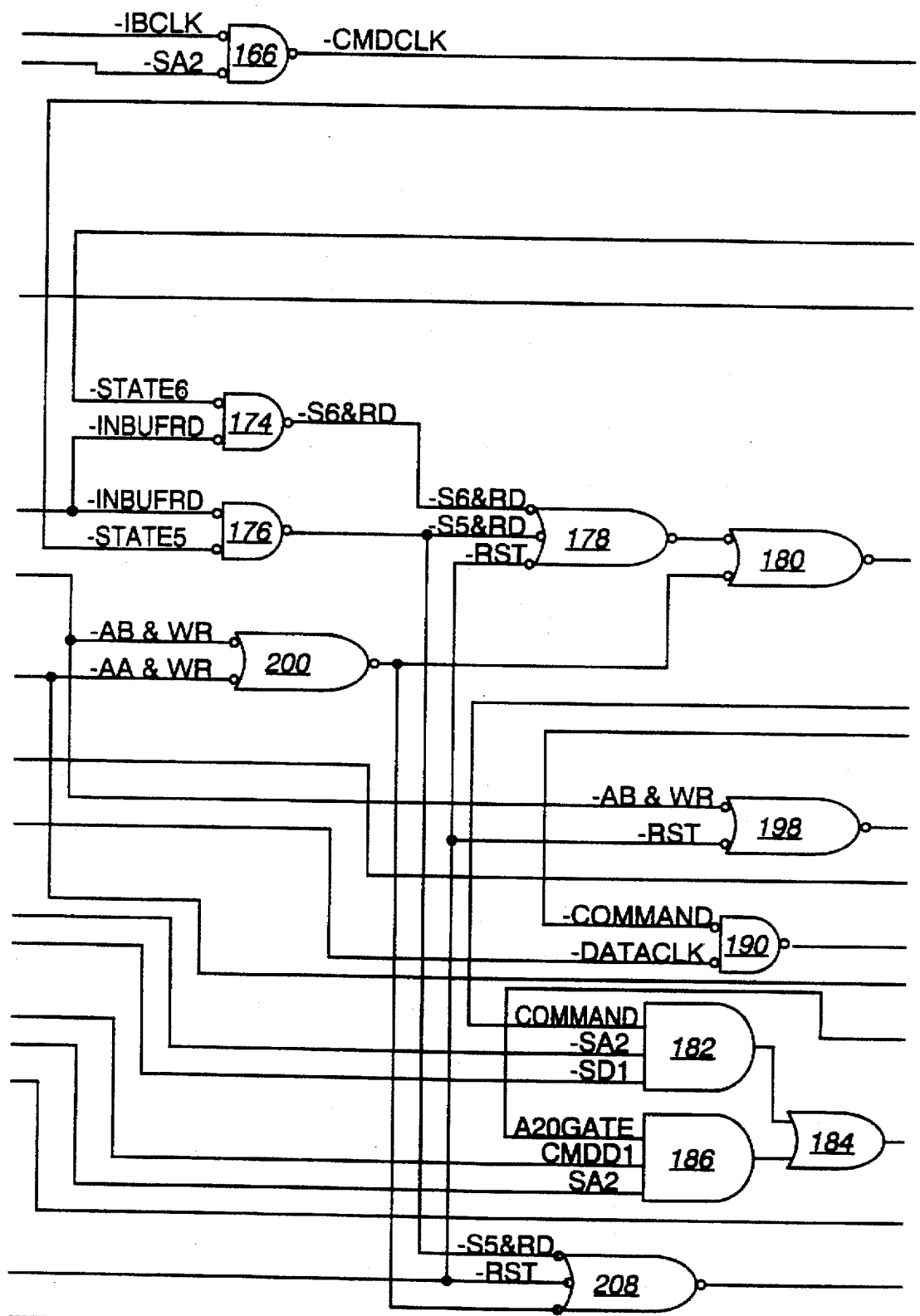
Figure 6C:
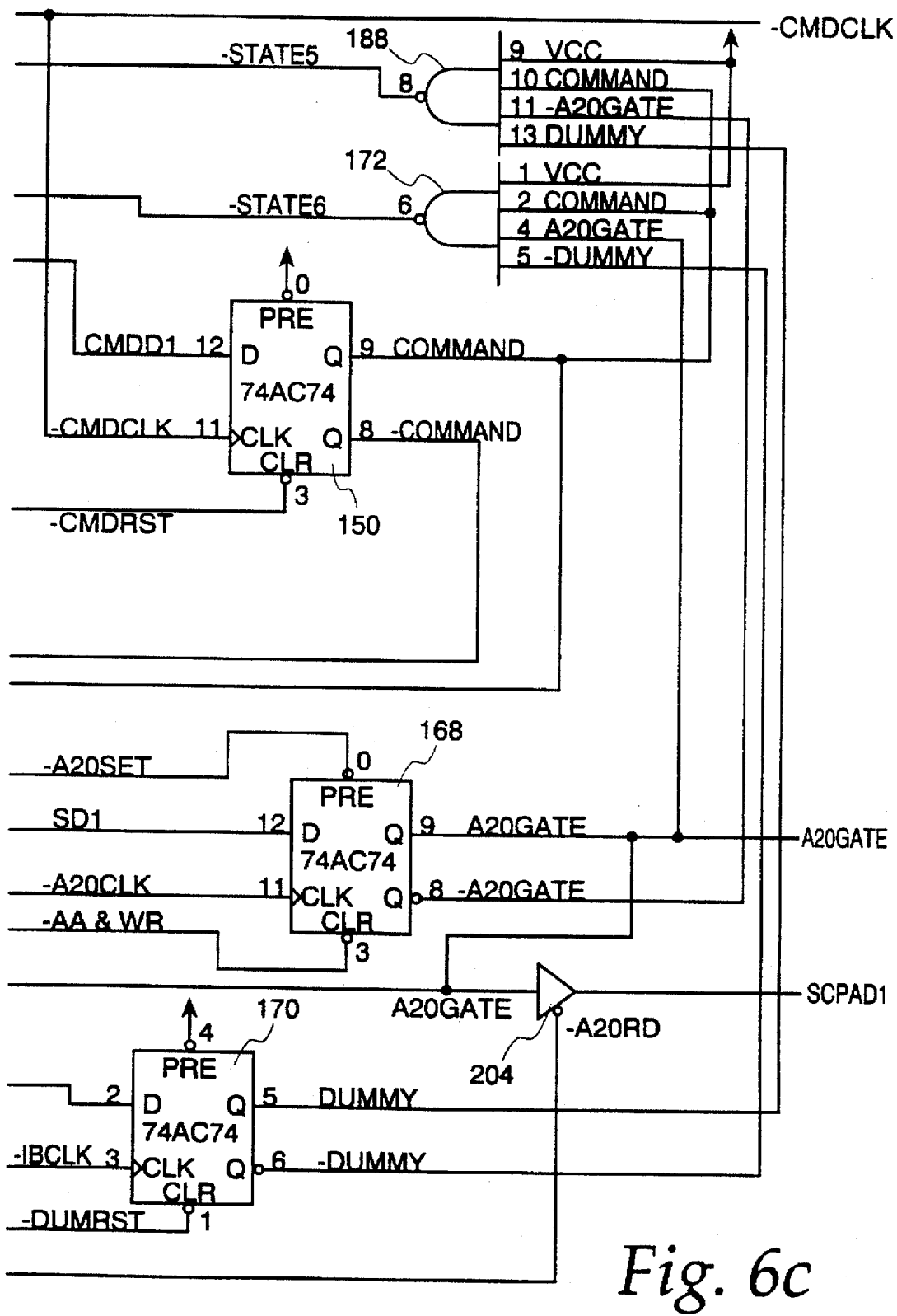
Figure 7:
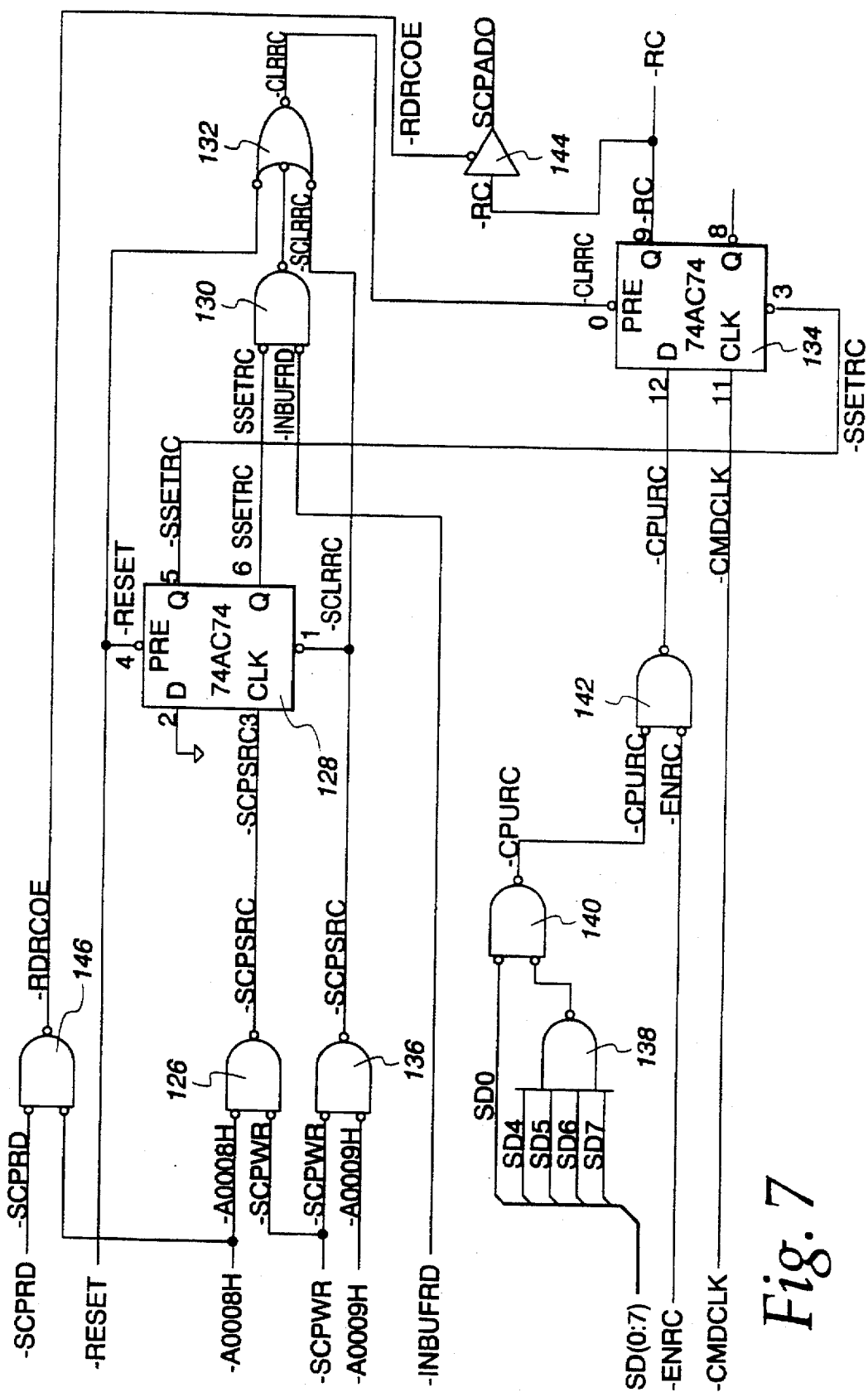
FIG. 7 is a schematic diagram of slow reset control logic in accordance with the present invention.

The CPU command signal (COMMAND) is available at a command flip-flop 150. The CPU command signal is generated when the CPU writes a byte D1H to address 64H. The command byte D1H is decoded by seven of NAND gates 152, 154, 156, 158, 160, 162 and 164 (FIG. 6). These NAND gates decode the system data bits SD0 through SD7 to provide a command data signal (CMDD1) when the CPU writes a command D1 to address 64H. More specifically, the system data bits (SD0–SD7) are applied to inverting inputs of the NAND gates 152, 154, 156 and 158 as shown in FIG. 6. The outputs of NAND gates 152 and 154 are applied to a NAND gate 160. The outputs of the NAND gates 156 and 158 are applied to the NAND gate 162 along with a signal (ENA20). The outputs of the NAND gates 160 and 162 are applied to a NAND gate 164 which generates a command signal (CMDD1) any time the byte D1H is written to address 64H.

The signal (ENA20) is generated by a flip-flop 163. This flip-flop 163 enables SCP 26 to disable the A20 signal. More specifically, a bit SCPAD1 is applied to the D input of the flip-flop 163. If bit SCPAD1 is high, the A20 signal is enabled. If bit SCPAD1 is low, the A20 signal is disabled.

The signal (CMDD1) is applied to a D input of the command flip-flop 150. Another signal, command clock (–CMDCLK), is applied to the clock input (CLK) of the command flip-flop 150. The command clock signal (–CMDCLK) is generated by a NAND gate 166 which receives signal (–IBCLK) and an input signal SA2. The IB clock signal (–IBCLK) represents that the address written to by the CPU is either 60H or 64H. The signal –SA2 identifies that the address is 64H. The output of the NAND gate 166 is the command clock signal (–CMDCLK).

Figure 8:
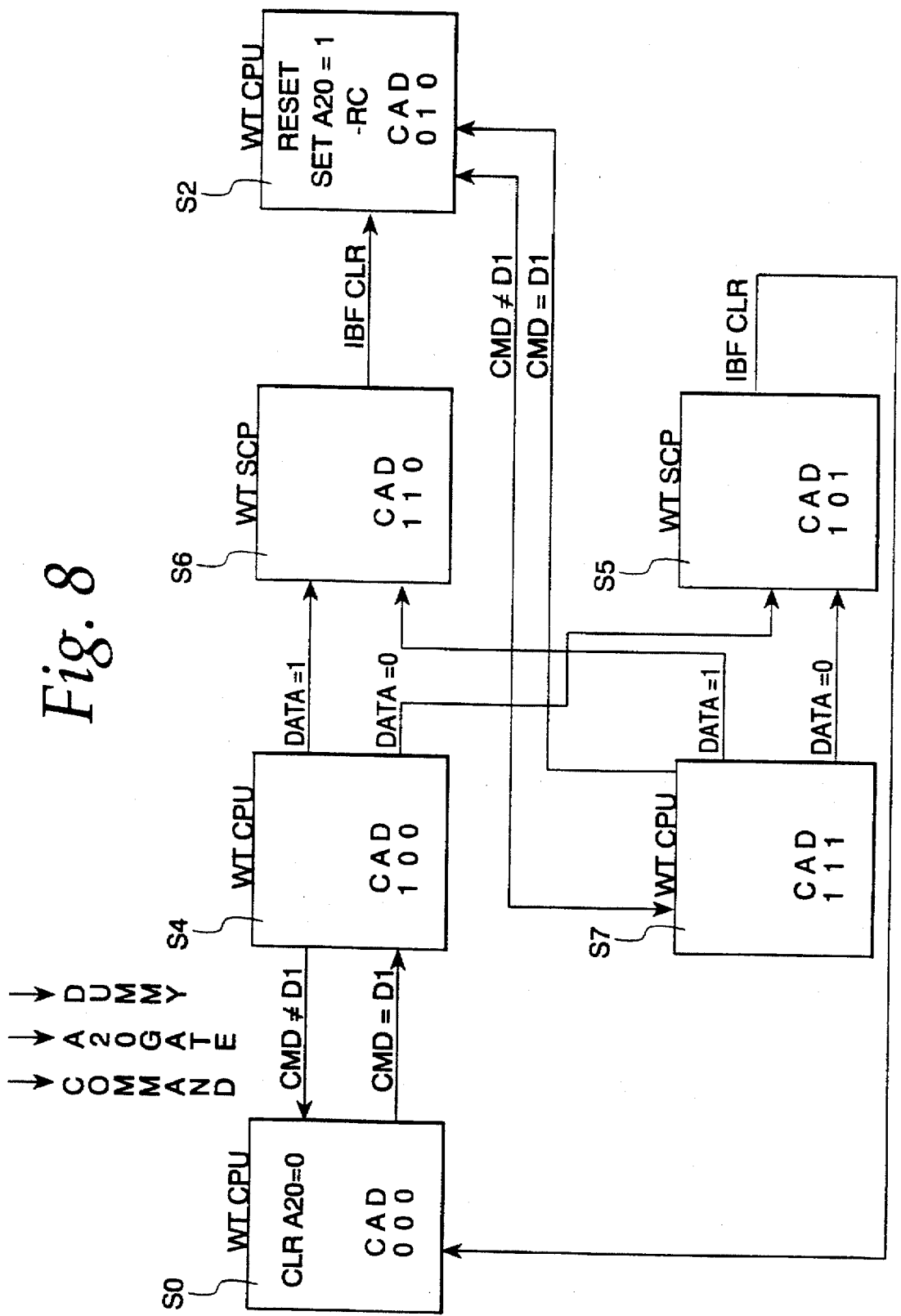
FIG. 8 is a state diagram of the A20 signal control logic in accordance with the present invention.
Figure 9:
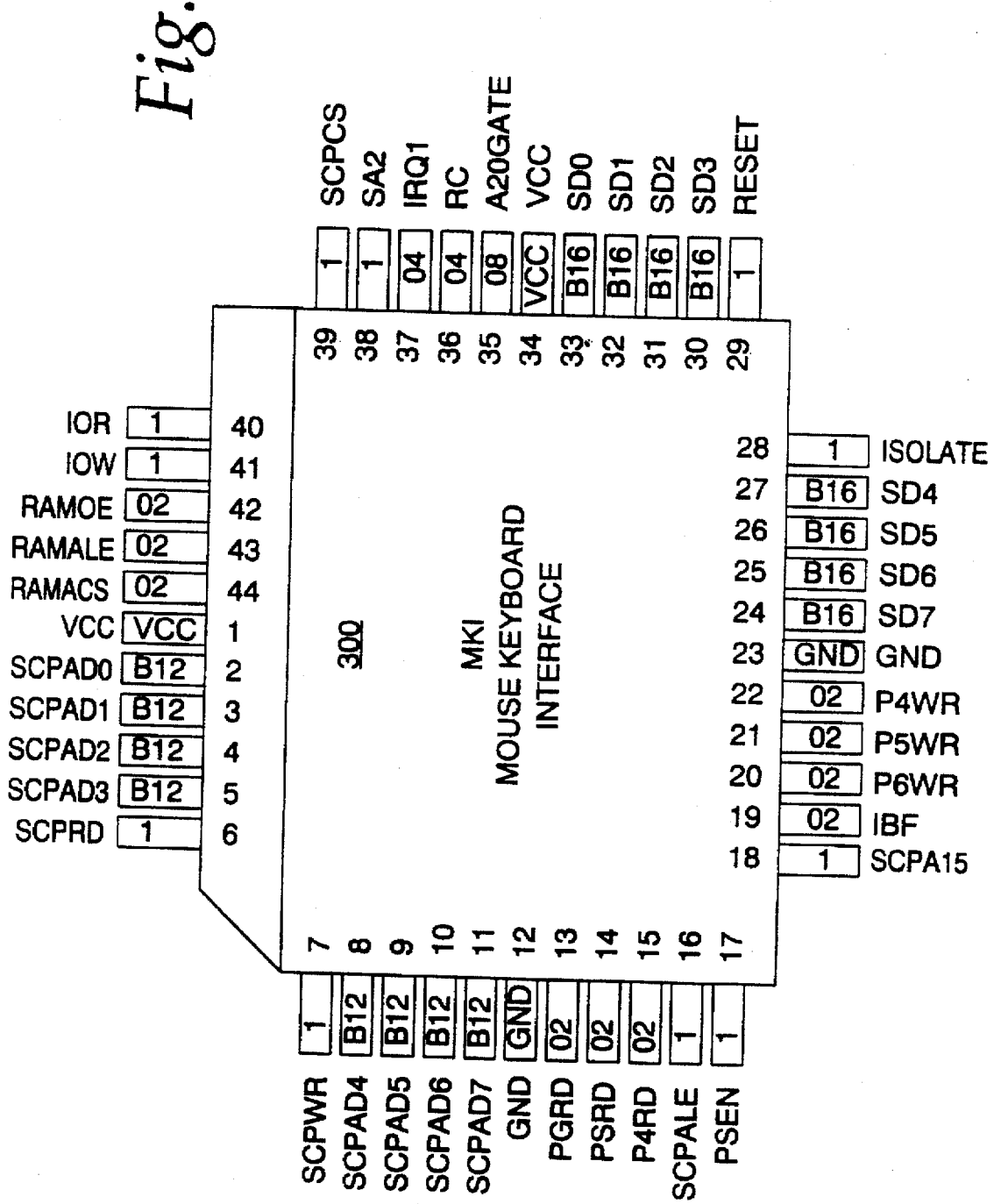
FIG. 9 is a pin-out diagram for the SCPI in accordance with the present invention.

In order to better understand the system, a state diagram for the A20 signal logic is provided in FIG. 8. The states refer to the states of the command flip-flop 150, the A20 signal flip-flop 168 and a dummy flip-flop 170, respectively. The dummy flip-flop 170 is required because of the number of states. The states in FIG. 8 are numbered for the states of these flip-flops. For example, state 7 (binary 111) represents that the flip-flops 150, 168 and 170 are all set.

The system starts in state 0 where the flip-flops 150, 168 and 178 are all clear. The system then proceeds to state 4 where the command flip-flop 150 is set as discussed above. Once the command flip-flop 166 is set, the system waits for the data byte from the CPU to either set or reset the Gate A20. When the system data byte is received and the Gate A20 is set as discussed above, the system proceeds to state 6. In this state, both the command flip-flop 150 and the Gate A20 flip-flop 162 have previously been set. An important feature of the invention relates to the fact that there was no waiting from the time of the data byte was received from the CPU to set the Gate A20. This greatly enhances the speed at which the Gate A20 is set by the CPU.

The output of a NAND gate 172 is representative of state 6. The NAND gate 172 receives a signal (COMMAND) from the command flip-flop 150 and an A20 signal from the A20 signal flip-flop 168. Also applied to the NAND gate 172 is a signal VCC and a signal from the dummy flip-flop 170, which is clear at state 6.

After state 6, the system can only proceed to state 2 wherein the command flip-flop 150 is cleared. The command flip-flop 150 is cleared once the SCP 26 reads the data out of the input buffer 30. This is accomplished by NAND gates 174 and 176 and NOR gates 178 and 180. More specifically, a signal representative of state 6 (–STATE6) is applied to an inverting input of the NAND gate 174. An input buffer read signal (–INBUFRD) is applied to another inverting input of the NAND gate 174. The output of the NAND gate 174 indicates that the SCP 26 has read the data in the input buffer 30. The output of the NAND gate 174 is applied to an inverting input of a NOR gate 178. The output of the NOR gate 178 is applied to an inverting input of the NOR gate 180. The output of the NOR gate 180 is representative of a command reset signal (–CMDRST) which is applied to the clear input (CLR) of the command flip-flop 150. This signal (–CMDRST) thus resets the command flip-flop 150 once the SCP 26 has read the data byte in the input buffer 30. Once this occurs, the system proceeds to state 2.

In state 2 the command flip-flop 166 and the dummy flip-flop 170 remain clear and the A20 signal flip-flop 168 remains set. The system sits in state 2 waiting for another command from the CPU. If another command is received, the system proceeds to state 7 where the command flip-flop 150 is set. In state 7, the system waits for a data byte from the CPU to indicate what is to be done with Gate A20. Once the data is received, the dummy flip-flop 170 is set. More specifically, a command signal (COMMAND) from the command flip-flop 150 is applied to an AND gate 182 representing that the command flip-flop 156 has been set. A signal (–SA2) is applied to another input of the AND gate 182. The (–SA2) signal represents that a CPU command was written to address 64H. A signal (–SD1) is also applied to the AND gate 182 generated by way of an inverter 184. The output of the AND gate 182 is applied to one input of the OR gate 184. The output of the OR gate 184 is applied to the D input of the dummy flip-flop 170. An (–IBCLK) signal is applied to the clock input (CLK) of the dummy flip-flop 170. The (–IBCLK) signal is a decode and indicates that the CPU has written to either address 60H or 64H. Thus, the dummy flip-flop 170 is set in state 7 after a command has been written by the CPU to the command flip-flop 150.

The dummy flip-flop 170 may also be set by an AND gate 186. More specifically, the output of the AND gate 186 is applied to another input of the OR gate 184. The AND gate 186 has three inputs. One input is from the A20 signal flip-flop 168. A second input is from the NAND gate 164 which indicates that the CPU has written a command D1.

The last input is an SA2 signal which indicates that the command was written to address 64H. Thus, the AND gate 186 will be enabled any time the Gate A20 has been set and a command has been written to address 64H by the CPU.

Once the system is in state 7, if data is received indicating that the Gate A20 flip-flop 168 is to be disabled, the system proceeds to state 5. In state 5, the command flip-flop is cleared, the dummy flip-flop remains set and the A20 signal flip-flop 168 is cleared.

A signal representative of state 5 is generated by a NAND gate 188. Signals from the dummy flip-flop 170, the A20 signal flip-flop 168 (-A20 GATE), the command flip-flop 150 (COMMAND) and VCC are applied to the input of the NAND gate 188. The output of the NAND gate 188 is a signal (-STATE5) which is applied to the NAND gate 176 to clear the command flip-flop 150 when the system is in state 5.

The A20 signal flip-flop 168 is cleared by the system data bit SD1 which is applied to the D input of the flip-flop 168. If the SD1 signal is low the A20 signal flip-flop 168 is cleared. The bit SD1 is strobed into the flip-flop 168 by a NAND gate 190. A signal (-COMMAND) is applied to an inverting input of the NAND gate 190 from the command flip-flop 150. A signal (-DATACLK) is applied to another inverting input of the NAND gate 190. The (-DATACLK) is generated by a NAND gate 192. A signal SA2 is applied to one inverting input of the NAND gate 192 while a signal (-IBCLIC) is applied to another inverting input to strobe the A20 signal flip-flop 168 any time the CPU writes data to address 60H.

After state 5, the system proceeds back to state 0 where the command flip-flop 150 and the dummy flip-flop 170 are cleared. The command flip-flop 150 is cleared automatically in state 5 when the input buffer flag IBF is cleared. More specifically, once the SCP reads the input buffer 30 an input buffer read signal (-INBUFRD) is generated. This signal (-INBUFRD) and a state 5 signal (-STATE5) are applied to inverting inputs of the NAND gate 176. The output of the NAND gate 176 is applied to an inverting input of the NOR gate 178 which clears the command flip-flop 150. The output of the NAND gate 176 is also applied to an inverting input of a NOR gate 208. The output of the NOR gate 208 is applied to the clear input (CLR) of the dummy flip-flop 170. Thus, the command flip-flop 150 and the dummy flip-flop 170 will be cleared in state 5 and the system will return to state 0 where the command flip-flop 150, the A20 gate flip-flop 168 and the dummy flip-flop 170 are all clear.

The SCP 26 can also gain control of the Gate A20 flip-flop 168 through memory map. Specifically, a write to address 000AH by the SCP 26 can clear the A20 signal flip-flop 168. More specifically, a signal representative of these addresses (-000AH) is applied to an inverting input of NAND gate 194. A SCP write signal (-SCPWR) is applied to another inverting input of the NAND gate 194. The output of the NAND gate 194 is applied to the clear input (CLR) of the A20 signal flip-flop 168 to enable the SCP 26 to clear the signal.

The SCP 26 can set the A20 signal by writing to address 000BH. Specifically, the address signal (-000BH) is applied to an inverting input of a NAND gate 196 along with an SCP write signal (-SCPWR). The output of the NAND gate 196 is applied to an inverting input of a NOR gate 198 whose output is tied to the present input (PRE) of the A20 signal flip-flop 168.

The SCP 26 can also read the status of the Gate A20 flip-flop 168 by reading address 000AH. Specifically, a signal representative of the system control processor read signal (-SCPRD) is applied to an inverting input of a NAND gate 202. A signal representative of an address signal (-000AH) is applied to another inverting input. The output of the NAND gate 202 is applied to a tristate device 204 to allow the data from the Gate A20 flip-flOp to be placed on the system control processor address data bus bit SCPAD 1 to be read by the SCP 26.

The Gate A20 can also be set active by the SCPI 28 when a command is received to set slow reset active or the SCPI is reset by the reset pin. More specifically, a reset signal and a slow reset signal (-RC) signals are applied to a NOR gate 206. The output of the NOR gate 206 is applied to an inverting input of the NOR gate 208 which clears the dummy flip-flop 170. The output of the NOR gate 206 is also applied to one input of the NOR gate 198 which sets the Gate A20 flip-flop 168. The output of the NOR gate 206 is also applied to an inverting input of the NOR gate 178 which, in turn, is connected to the NOR gate 180 which clears the command flip-flop 150.

An SCP write to either address 000AH or 000BH clears the command flip-flop 150. More specifically, the output of the NAND gates 194 and 196 are applied to inverting inputs of a NOR gate 200. The output of the NOR gate 200 is applied to an inverting input of the NOR gate 180. The output of the NOR gate 180 is applied to the clear input (CLR) of the command flip-flop 150.

RESET

A reset signal (-RESET) from the CPU is used to reset the system. Specifically, the reset signal is applied to an inverting input of the NOR gate 206 which clears the command flip-flop 150, the A20 signal flip-flop 168 and the dummy flip-flop 120. The reset signal is also applied to the clear input (CLR) of the flip-flop 86 to clear the interrupt signal IRQ1. Reset signals are also used to clear the input buffer 30, output buffer 32, the status register 34, the input buffer full flag flip-flop 98 and the output buffer full flag flip-flop 114.

ISOLATE

An isolate signal is an active low input signal to tristate certain signals on the SCPI 28 in the event that the SCP 26 and SCPI 28 are used in a manner where the rest of the system of not powered, for example, during battery charging of a portable battery powered converter. Tristating the pins identified in TABLE IV below can avoid problems to the SCP 26.

TABLE IV

The pins in the SCPI that get tristated are as follows:

| | | |
|---|---|---|
| SCPAD 0:7 | IRQ1 | P4WR |
| -IBF | A20 gate | P4RD |
| SD 0:7 | SLOWRST | P5WR |
| -RAMOE | -RAMCS | P5RD |
| | -RAMALE | P6WR |
| | | P6RD |

MOUSE KEYBOARD INTERFACE (MKI)

An important distinction between the SCPI 28 and the MKI is that the MKI does not need to interrupt the SCP 26 to allow the CPU to control the A20 signal. Consequently, the MKI allows for relatively faster switching of the A20 signal than the SCPI 28. More specifically, as described above, the CPU controls the A20 signal with a two byte sequence from the CPU to the input buffer 30. The first byte is a command byte D1 written to the address 64H. In the previous embodiment utilizing the SCPI 28, after the CPU writes the command byte, the Input Buffer Full (IBF) flag is set in the status register 34. This IBF flag is used to interrupt the SCP 26. After the SCP 26 reads the command byte D1H, the IBF full flag is cleared which allows the CPU to write the second byte to the input buffer 30 which also required processing by the SCP 26. As discussed above, the bit SD1 in the second byte determines whether the A20 signal is to be set or cleared.

With such a system there is inherently a certain amount of delay after a byte is written to the input buffer 30 until the SCP 26 can retrieve the command data bytes. The MKI allows for faster switching of the A20 signal by recognizing the command and data bytes from the CPU, thus eliminating the need to interrupt the SCP 26 which may be busy with other tasks. Since no interrupt is generated after the command byte D1H, the CPU can immediately send the data byte without waiting for the SCP 26 to read the input buffer 30. The MKI can also recognize the data byte, thus eliminating the processing time of the SCP 26.

As illustrated in FIG. 10, the MKI, generally identified with the reference numeral 300 also allows the SCP 20 (FIG. 1) to be replaced with a relatively faster SCP 26, such as an Intel 8051 or other microprocessor that emulates a type Intel 8042 microprocessor to maintain IBM compatibility with type PC/AT machines. The MKI 300 is connected between the PC/AT system bus 40 and the SCP 26.

Figures 12A, 13, 14:
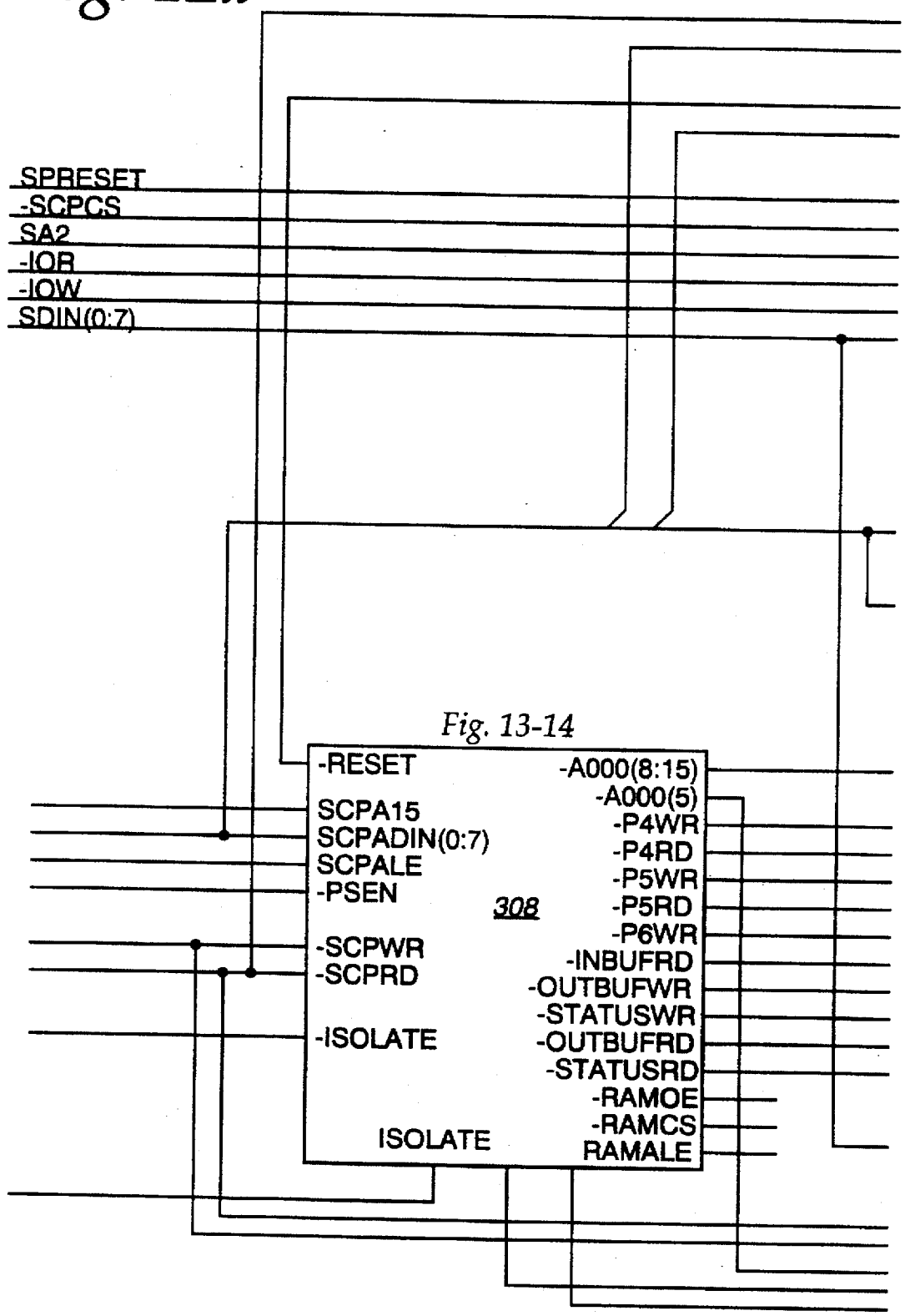
Figure 12B:
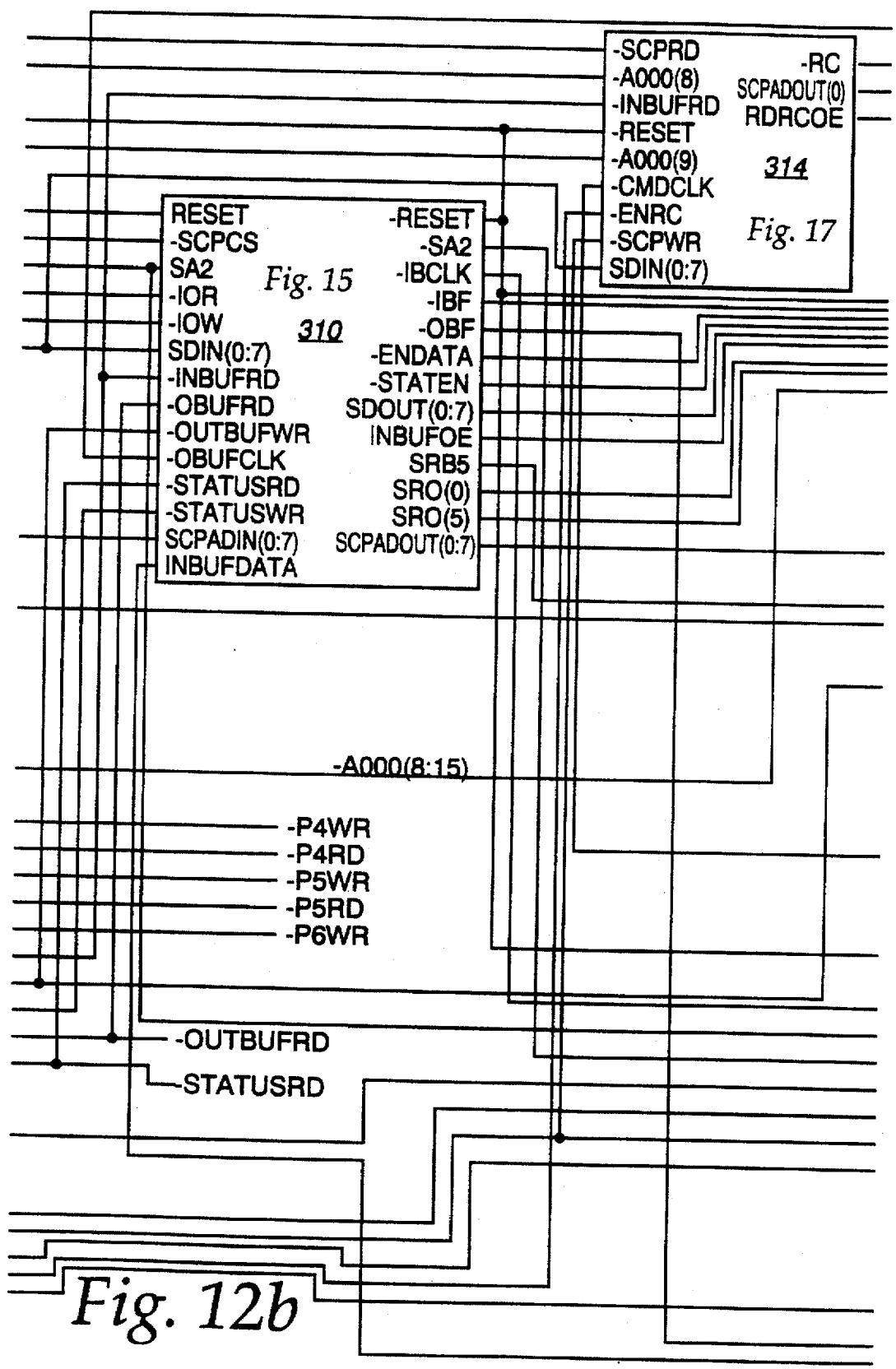
Figure 13A:
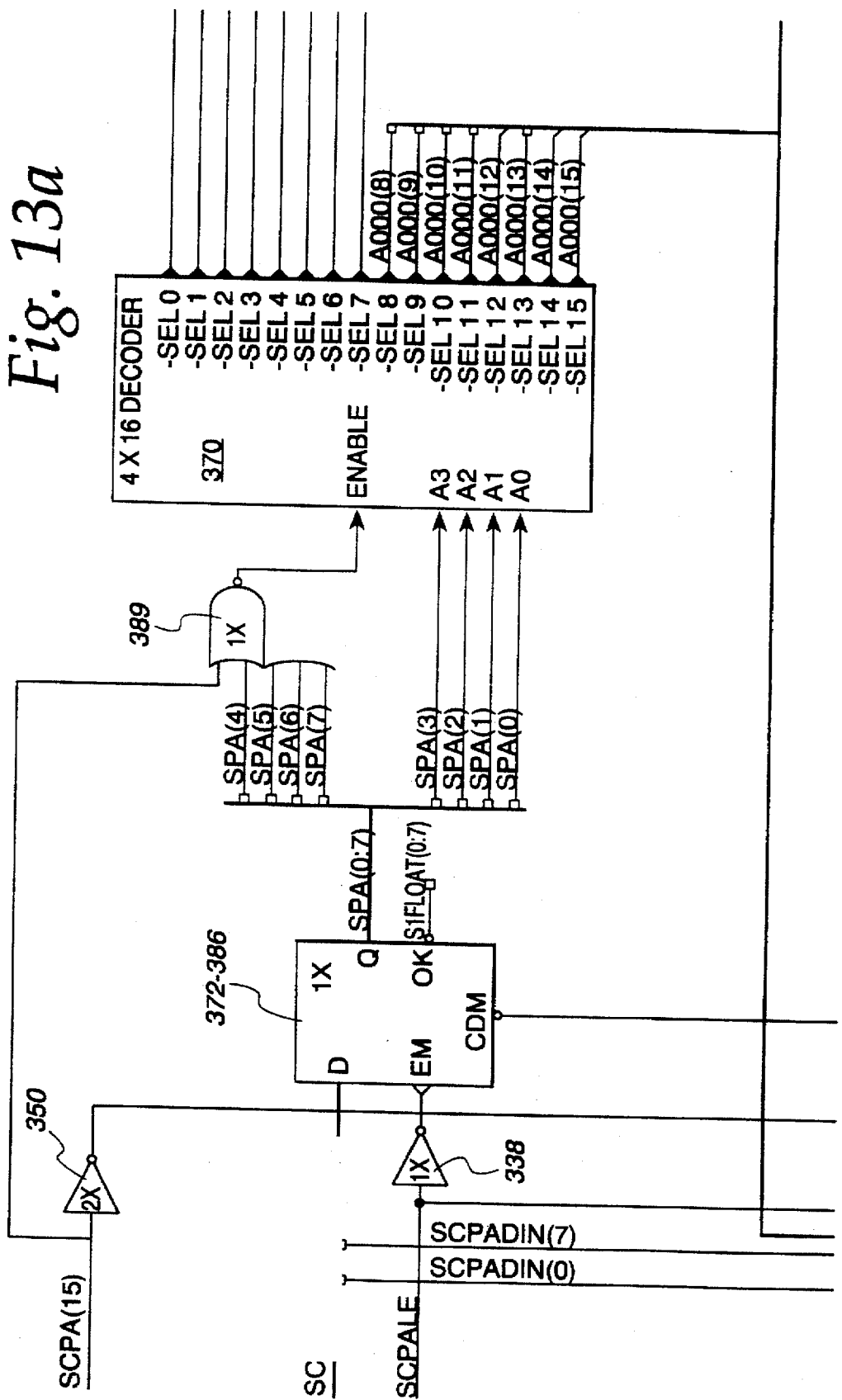
FIGS. 13A–13C are schematic diagrams of the address decode and RAM control logic in accordance with the present invention.
Figure 13B:
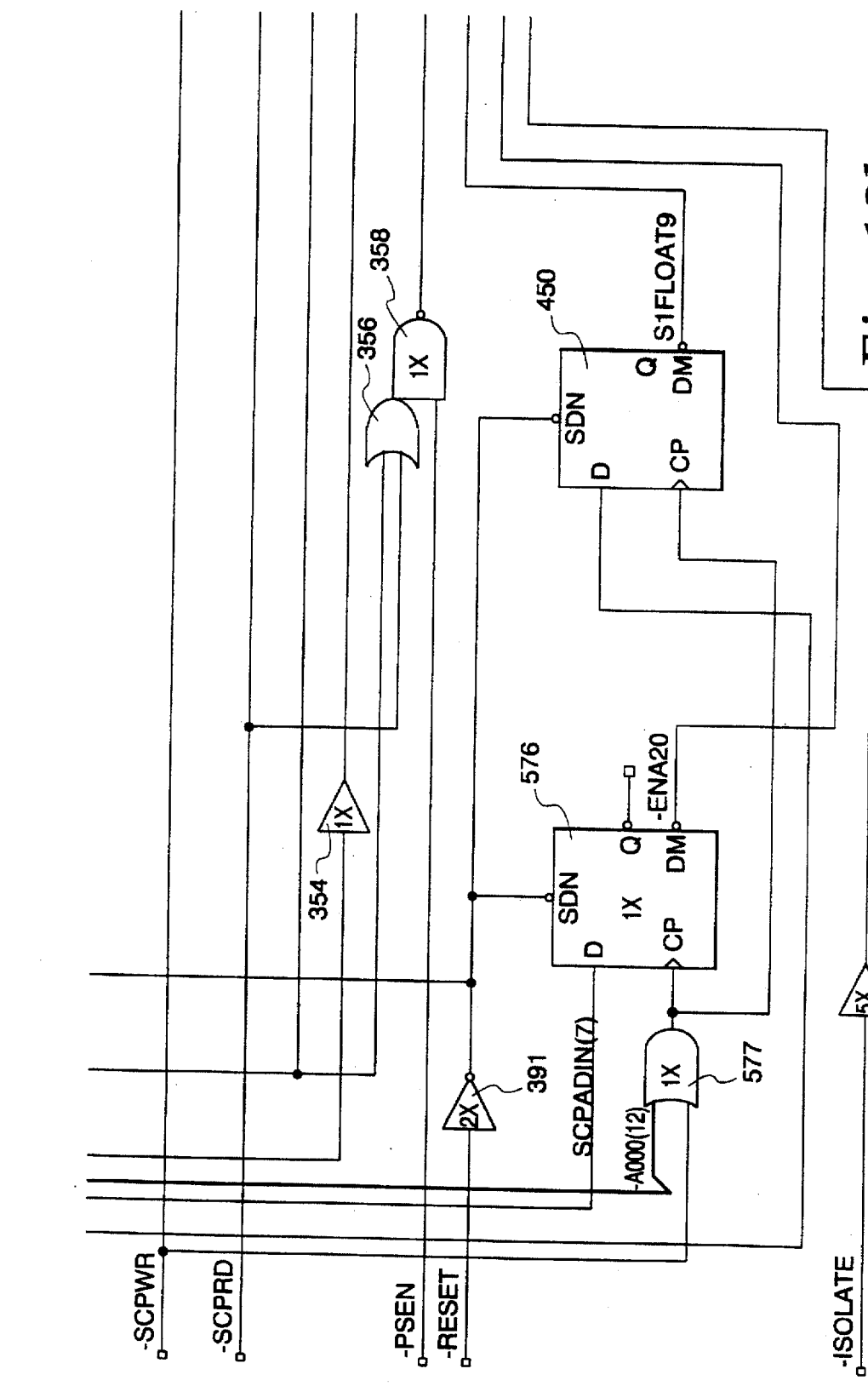
Figure 13C:
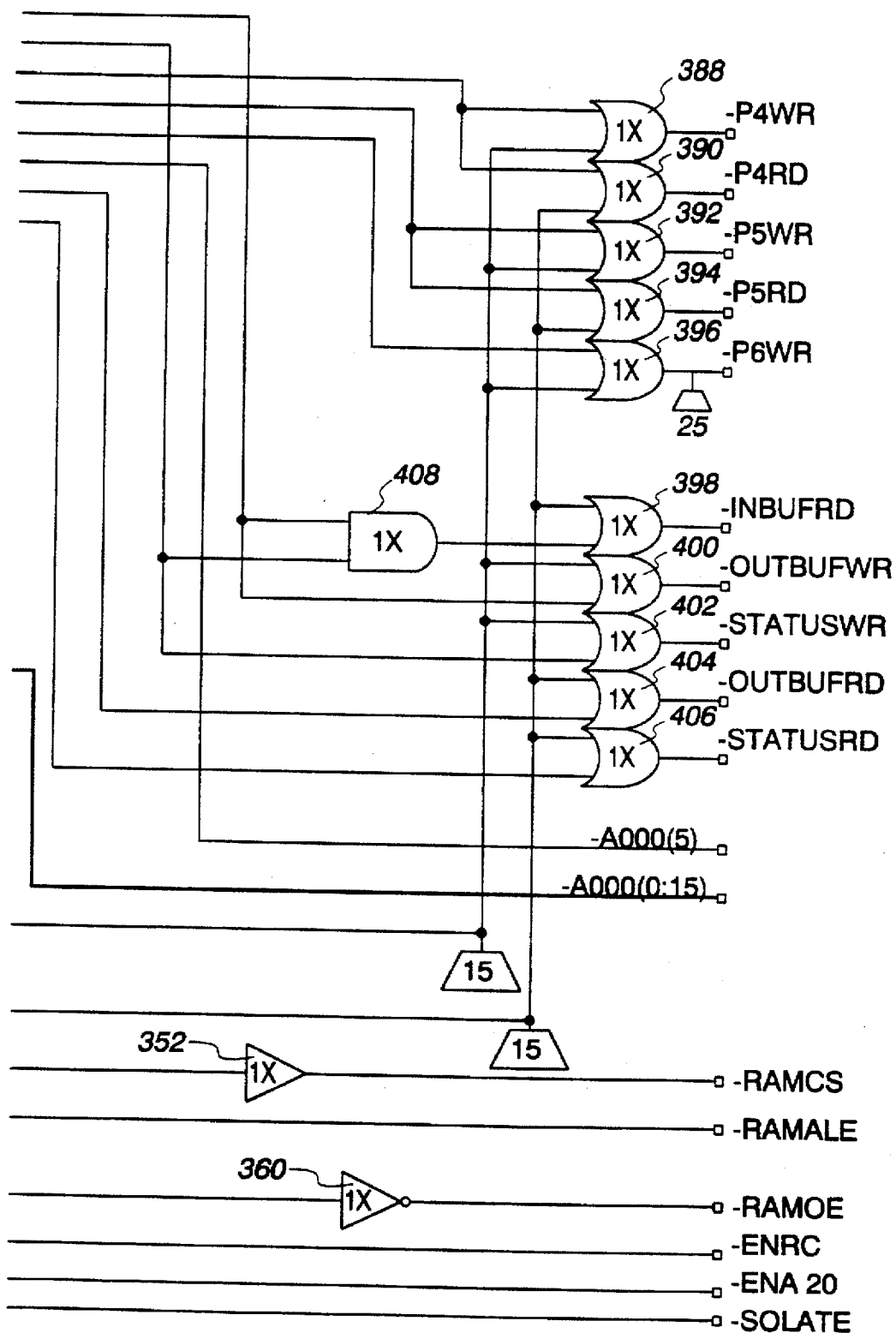
Figure 14B:
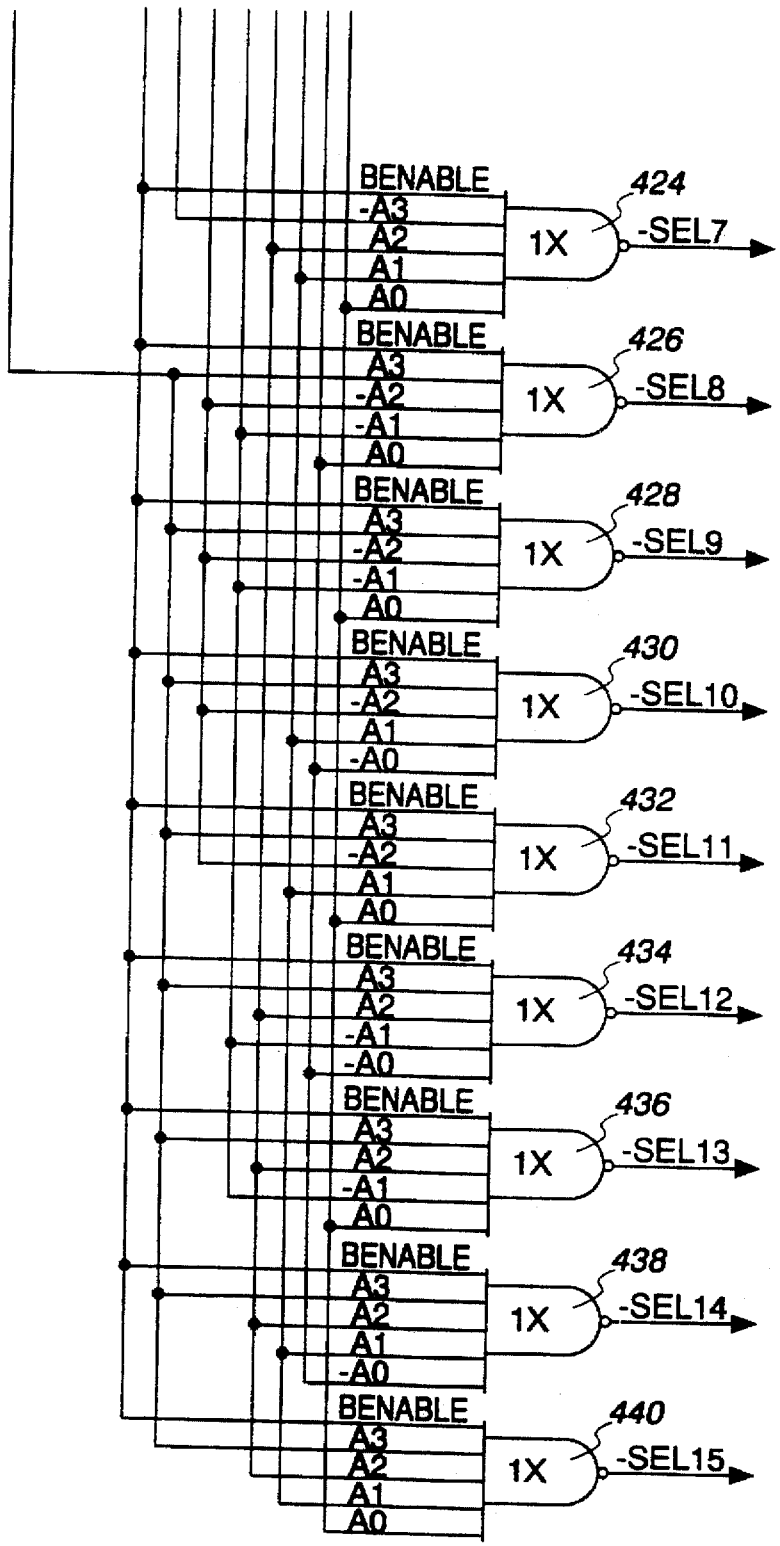
Figure 15A:
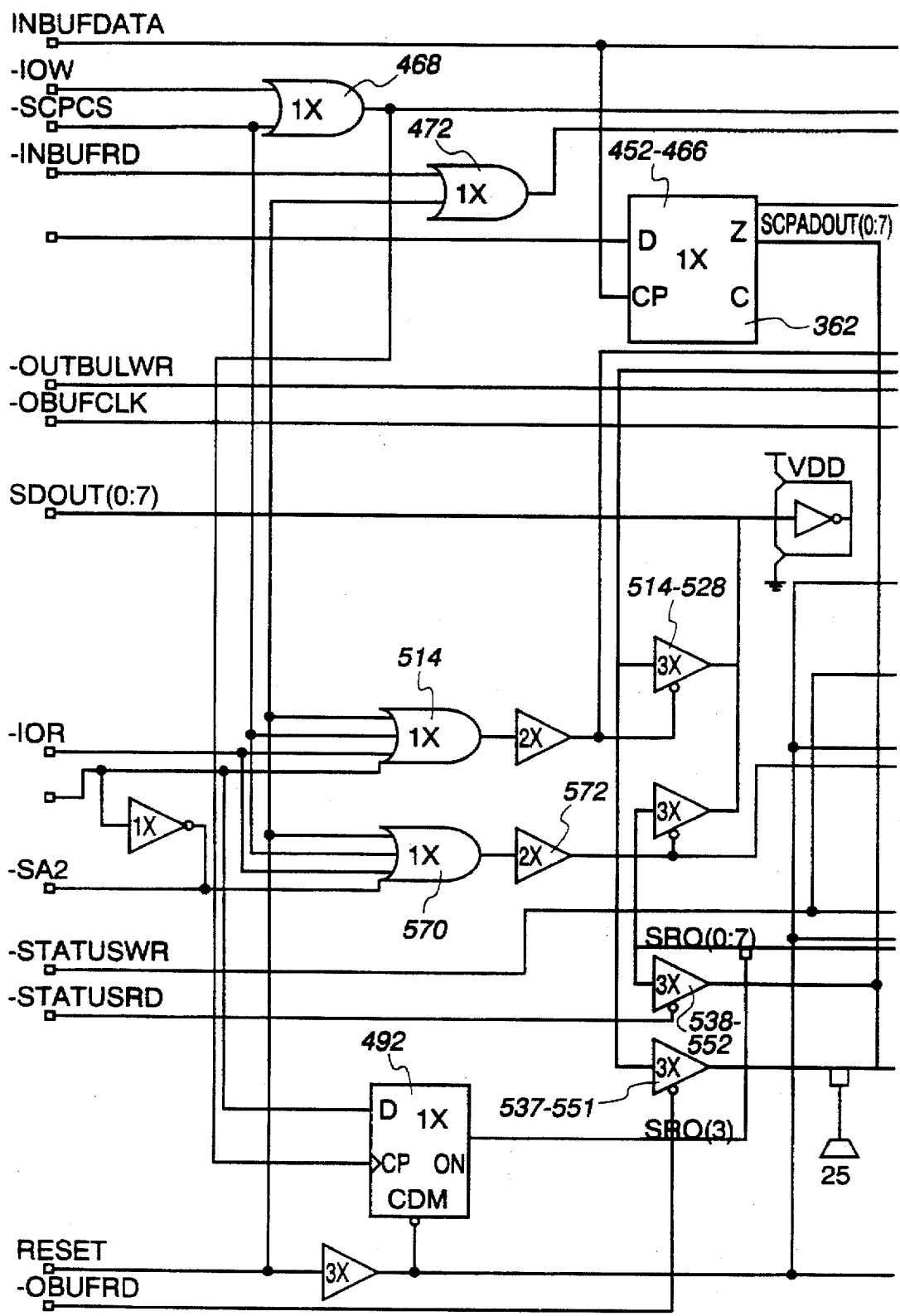
FIGS. 15A–15B are schematic diagrams of the CPU interface logic in accordance with the present invention.
Figure 15B:
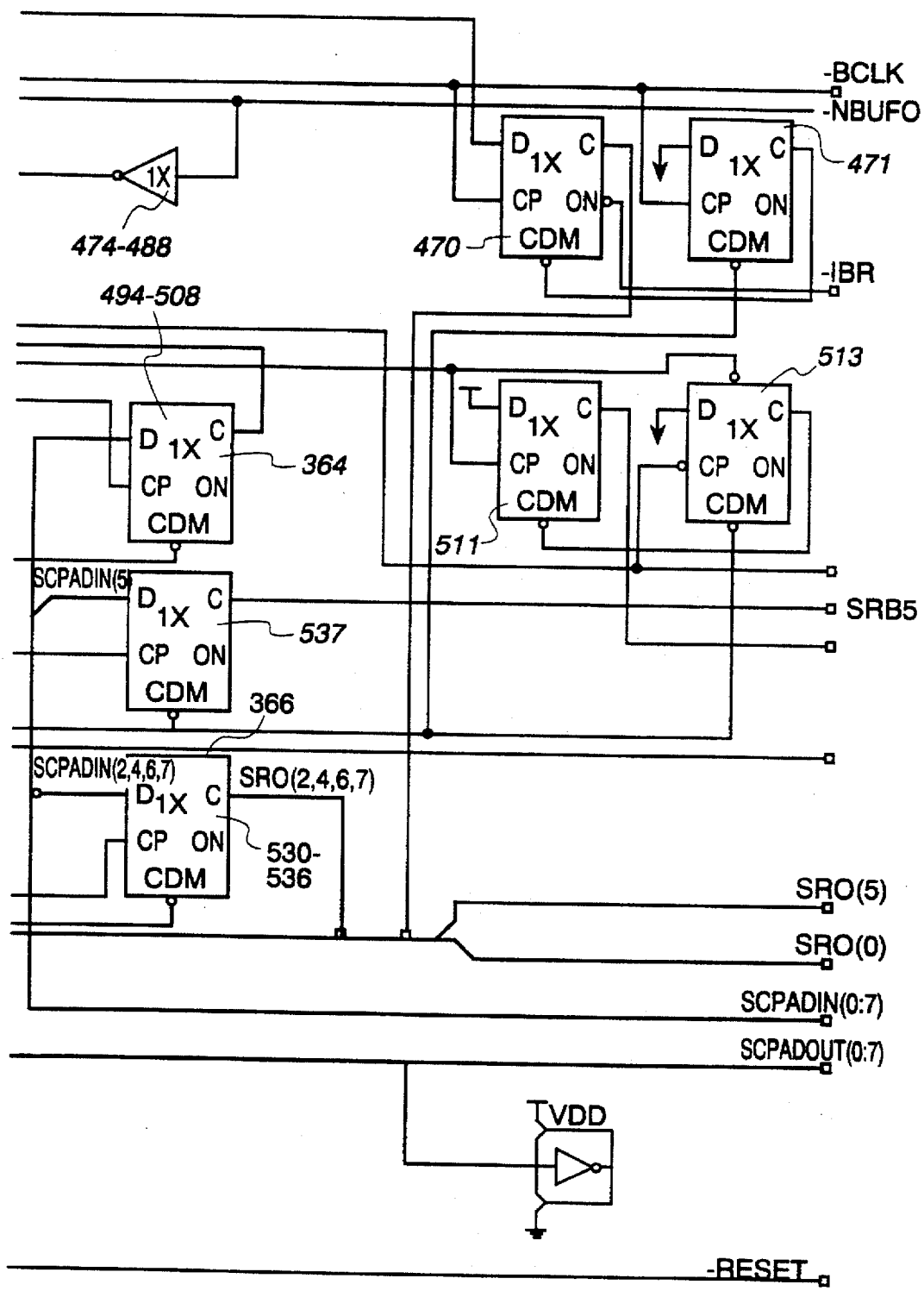

Similar to the SCPI 28, the MKI 300 allows communication between the CPU and the SCP 26 by way of three registers; an input buffer, an output buffer and a status register (FIG. 15). As shown in FIG. 12 and discussed below, the MKI 300 further includes address decode and RAM control logic 308 (FIGS. 13–14), CPU interface logic 310 (FIG. 15), Gate A20 control logic 312 (FIG. 16), Slow Reset logic 314 (FIG. 17) and IR12 control logic 316 (FIG. 18).

MKI PIN DESCRIPTION

The MKI 300 is a forty-four pin integrated circuit as illustrated in FIGS. 11–19, which may be formed as a gate array, such as by VLSI Technologies Inc. Pin descriptions are provided in TABLE V.

TABLE V

| Pin No. | Type | Name | Pin Description |
|---|---|---|---|
| | | | CPU Interface |
| 29 | I | RESET | Hardware reset of MKI |
| 41 | I | –IOW | CPU I/O Write Strobe. |
| 40 | I | –IOR | CPU I/O Read Strobe. |
| 39 | I | –SCPCS | Decode of SA<9:0>. Provide an active signal when an access to 062H–06EH (even) happens. |
| 38 | I | SA2 | System Address Buss Bit 2. |
| 4, 5, 8, 9, 26, 27, 30, 31 | B | SD0:7 | System Data Buss Bits 0–7. |
| 37 | O | IRQ1 | Keyboard Interrupt |
| 35 | O | IRQ12 | Auxilliary Keyboard Interrupt |
| 22 | O | A20GATE | Enable access to the memory above 1 Megabyte. |
| 15 | O | –SLOWRST | System processor reset. |
| | | | External RAM Control |
| 42 | O | –RAMCS | RAM Chip Select. |
| 44 | O | –RAMOE | RAM Output Enable. |
| 43 | O | RAMALE | RAM Address Latch Enable. |

TABLE V-continued

| Pin No. | Type | Name | Pin Description |
|---|---|---|---|
| | | | BCP Interface |
| 18 | I | SCPA15 | A15 from the SCP Processor. |
| 2, 3, 10, 11, 24, 25, 32, 33 | B | SCPAD0:7 | Multiplexed address data bus from the SCP |
| 16 | I | SCPALE | Address Latch Enable for SCPAD0:7 |
| 6 | I | –SCPRD | Memory Read Strobe. |
| 7 | I | –SCPWR | Memory Write Strobe. |
| 17 | I | –PSEN | Program Store Enable. Read strobe to external Program Memory. |
| 19 | O | –IBF | Input Buffer Full. Interrupt to SCP when the CPU has written to the Input Buffer. |
| | | | External Port Control |
| 14 | O | –P4WR | Port 4 Write. Used to clock SCPAD0:7 into 8 external Flip-Flops. Provides 8 extra outputs for the SCP. |
| 13 | O | –P4RD | Port 4 Read. Output enable a buffer to SCPAD<0:7> to provide 8 inputs. |
| 20 | O | –P5WR | Port 5 Write. Used to clock SCPAD0:7 into 8 external Flip-Flops. Provides 8 extra outputs for the SCP. |
| 21 | O | –P5RD | Port 5 Read. Output enable a buffer to SCPAD<0:7> to provide 8 inputs. |
| 36 | O | –P6WR | Port 6 Write. Used to clock SCPAD0:7 into 8 external Flip-Flops. Provides 8 extra outputs for the SCP. |
| | | | Power and Ground |
| 28 | I | –ISOLATE | In the event the SCP is operating while the rest of the unit is not powered, this signal will isolate the rest of the signals. |
| 1, 34 | | VCC | Power Supply. |
| 12, 23 | | GND | Ground. |

The required output current driving capabilities of the pins is listed in TABLE VI.

TABLE VI

| | |
|---|---|
| SCPAD<0:7> | 12 mA |
| SD<0:7> | 16 mA |
| IRQ1 | 4 mA |
| IRQ12 | 4 mA |
| –SLOWRST | 4 mA |
| A20GATE | 12 mA |
| –IBF | 2 mA |
| –RAMCS | 2 mA |
| –RAMOE | 2 mA |
| RAMALE | 2 mA |
| –P4WR | 8 mA |
| –P4RD | 8 mA |
| –P5WR | 8 mA |
| –P5RD | 8 mA |
| –P6WR | 8 mA |

CONTROL LOGIC

Figure 11A:
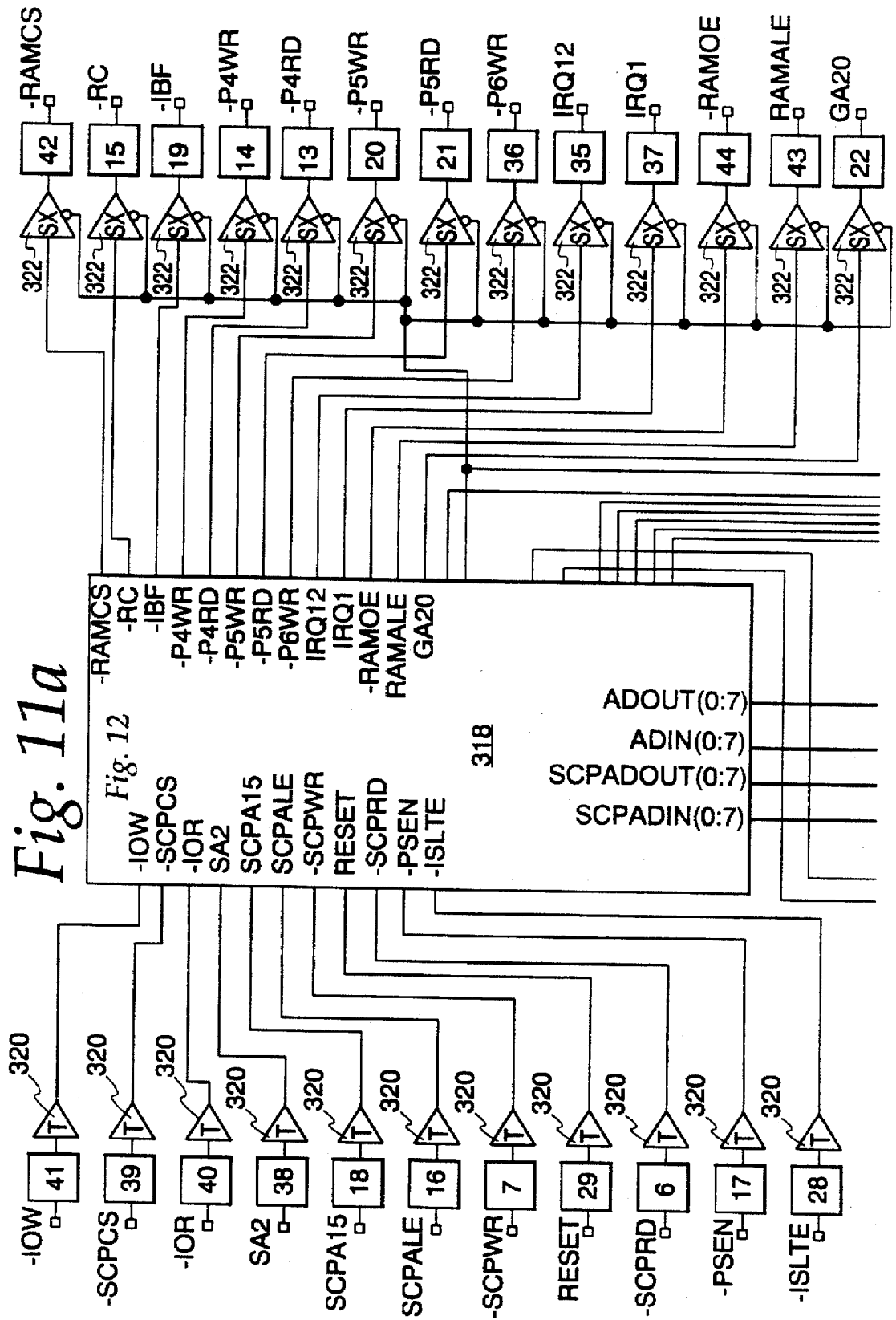
FIGS. 11A–11B are top level diagrams of a mouse keyboard interface (MKI) illustrated in FIG. 10.
Figure 11B:
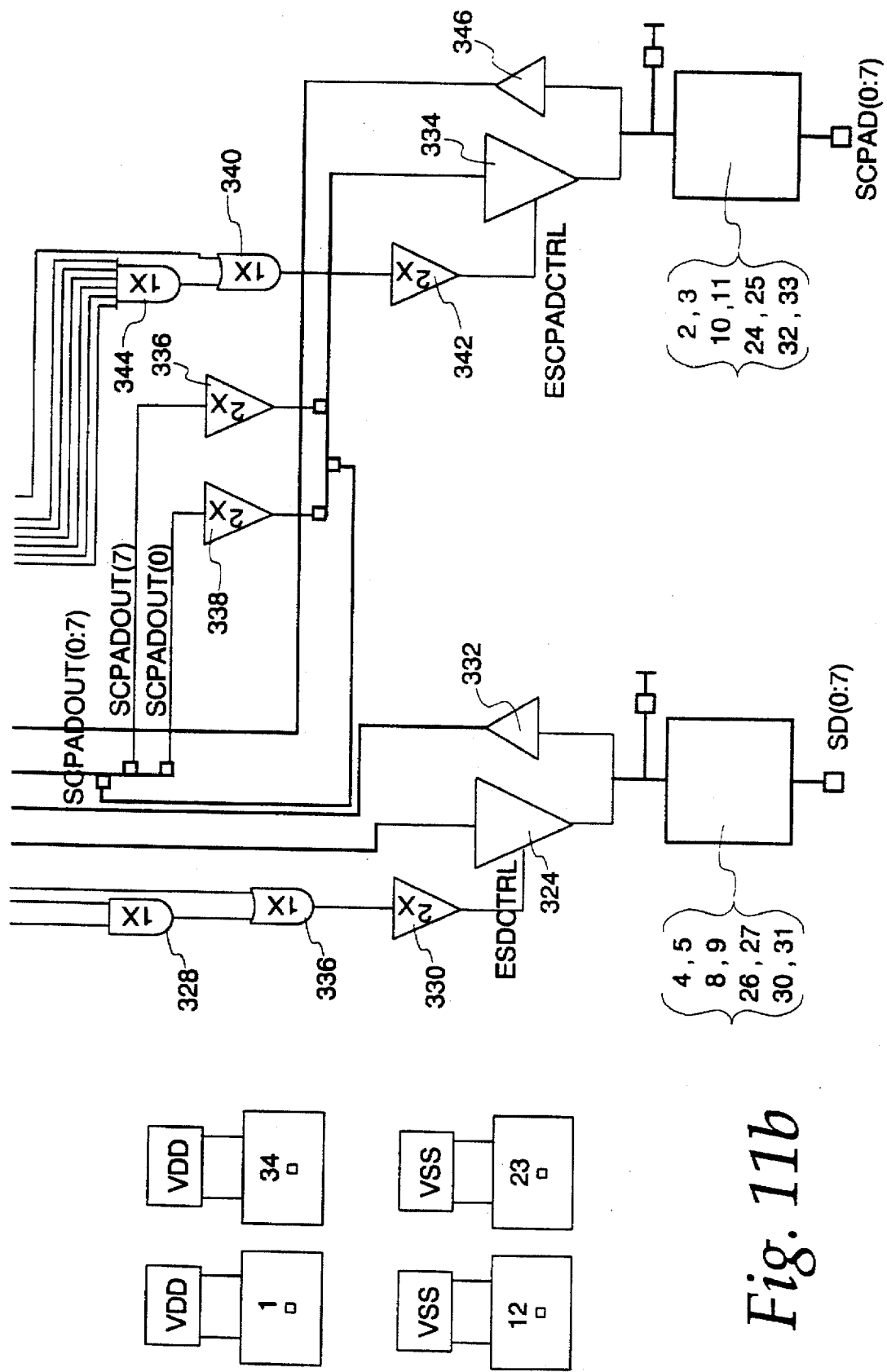

Referring to FIG. 11, a VLSI top level block diagram is shown. As shown, pins 6, 7, 16, 17, 18, 28, 29, 38, 39, 40 and 41 are unidirectional input pins connected to the control logic, generally identified with the reference numeral 318 by way of buffers 320. Pins 13, 14, 15, 19, 20, 21, 22, 35, 36, 37, 42, 43 and 44 are unidirectional output pins with tristate outputs, connected to the control logic 318 by way of tristate devices 322. The tristate devices are controlled by an ISOLATE signal which places the output pins in a high impedance state during a test mode.

Pins 1 and 34 are power supply pins while pins 12 and 23 are for ground. The remainder of the pins 2, 3, 4, 5, 8, 9, 10, 11, 24, 25, 26, 27, 30, 31, 32 and 33 are bidirectional. Pins 4, 5, 8, 9, 26, 27, 30, 31 relate to the system data bus SD[0:7] while pins 2, 3, 10, 11, 24, 25, 32 and 33 relate to the SCP address/data bus SCPAD [0:7]. Each of these buses are split into two buses internal to the MKI 300 to provide the bidirectional capability. More specifically, as shown in FIG. 11, within the MKI 300, the system data bus SD[0:7] is comprised of input bus SDIN [0:7] and an output bus SDOUT [0:7]. The internal system data output bus SDOUT [0:7] is connected to the system data bus output pins SD [0:7] (e.g., pins 4, 5, 8, 9, 26, 27, 30 and 31) by way of tristate devices 324. The tristate devices 324 are under the control of an OR gate 326 and an AND gate 328. The OR gate 326 is a two input OR gate. An ISOLATE signal is applied to one input to place the system data bus SD [0:7] in a high impedance state during a certain mode of operation. More specifically, the ISOLATE signal is an active low input signal to tristate certain signals on the MKI 300 during certain conditions, such as during battery charging in a portable. During all other modes of operation, the tristate devices 324 are under the control of the AND gate 328. Two signals $\overline{\text{ENDATA}}$ and $\overline{\text{STATEN}}$, discussed below, which are generated during read operations by the CPU, are used to enable the system data output bus SDOUT [0:7] by way of a plurality of buffers 330. The internal system data input bus SDIN [0:7] is connected to the system data bus SD [0:7] by way of buffers 332.

Similarly, the system control processor address/data bus SCPAD [0:7], available at pins 2, 3, 10, 11, 24, 25, 32 and 33, is split into two internal buses SCPADOUT [0:7] and SCPADIN [0:7]. The internal SCPADOUT [0:7] bus is connected to the pins 2, 3, 10, 11, 24, 25, 32 and 33 by way of tristate devices 334. More specifically, bits SCPADOUT [2:7] are applied directly to the tristate devices 334 while bits SCPADOUT [0] and SCPADOUT [1] are tied to the tristate devices 334 by way of buffers 336 and 338, respectively. The tristate devices 334 are under the control of an OR gate 340 whose output is tied to the tristate devices 334 by way of a plurality of buffers 342. One input to the OR gate 340 is the ISOLATE signal to tristate the SCPADOUT [0:7] bus during certain modes of operation as discussed above. In all other modes of operation, the tristate devices 334 are under the control of an AND gate 344 whose output is applied to the input of the OR gate 340. The AND gate 344 is a six input AND gate 344. The signals $\overline{\text{RDRCOE}}$ (FIG. 17), and $\overline{\text{A20RD}}$ (FIG. 16), $\overline{\text{STATUSRD}}$ (FIG. 13), $\overline{\text{OUTBUFRD}}$ (FIG. 13), $\overline{\text{INBUFOE}}$ (FIG. 15) and $\overline{\text{ENFFSTS}}$ (FIG. 18) are applied to the AND gate 344 to control the tristate devices 342 during read operations of the SCPADOUT [0:7] bus as will be discussed below. The SCPADIN [0:7] bus is tied to the output pins by way of the buffers 346.

SCP INTERFACE

The SCP 26 interface to the MKI 300 is accomplished through a memory mapping scheme using the Intel 8051 microprocessor external address/data bus SCPAD [0:7]. The MKI 300 allows the SCP 26 to communicate with the CPU as well as external ports through memory mapping. Additionally, the SCP 26 is adapted to control the Gate A20 signal as well as the slow reset and interrupt signals IRQ1 and IRQ12. An SCP memory map is illustrated in TABLE VIII. A description of the SCP memory map is provided in TABLE VII.

TABLE VII

SCP Memory Map Description

0000H:
  SCP to CPU Interface: Output Buffer/Input Buffer
  Write: The SCP can write a byte to the Output Buffer at this location. The Output Buffer Full signal (OBF) is pulled active at the end of the write cycle.
  Read: The SCP can read the contents of the Input Buffer at this location. The Input Buffer Full signal (IBF) is cleared at the end of the read cycle.

0001H:
  SCP to CPU Interface: Output Buffer/Input Buffer
  Write: The SCP can write a byte to the Status Register at this location. Bits 0 (OBF), 1 (IBF), and 3 (CMD/DATA) are not written by the SCP, but are generated internal to the MKI.
  Read: The SCP can read the contents of the Input Buffer at this location. The Input Buffer Full signal (IBF) is cleared at the end of the read cycle. This is the same as a read to 0000H.

0002H:
  SCP to External Port Interface: (P4.0–4.7)
  Write: A byte can be written to external Flip-Flops at this location to provide eight more output pins for the SCP.
  Read: A byte can be read from an external buffer at this location to provide eight more input pins to the SCP.

0003H:
  SCP to External Port Interface: (P5.0–5.7)
  Write: A byte can be written to external Flip-Flops at this location to provide eight more output pins for the SCP.
  Read: A byte can be read from an external buffer at this location to provide eight more input pins to the SCP.

0004H:
  SCP to External Port Interface: (P6.0–6.7)
  Write: A byte can be written to external Flip-Flops at this location to provide eight more output pins for the SCP.
  Read: Not used.

0005H:
  SCP to CPU Interface: IRQ1
  Write: IRQ1 can be enabled or disabled with a write to this location using the SCP data bit 0.
  SCPAD0=1=>Enable IRQ1
  SCPAD0=0=>Disable IRQ1
  Read: Not used.

0006H:
  SCP to SCP Interface: Output Buffer
  Write: Not used.
  Read: The value that the SCP wrote into the Output Buffer can be read back here.

0007H:
  SCP to SCP Interface: Status Register
  Write: Not used.
  Read: The value that the SOP wrote into the Status Register can be read back here. Bits 0,1 and 3 are the signals OBF, IBF, and CMD/DATA respectively; they were not written by the SCP but are generated internally.

0008H:
  SCP to CPU Interface: Slow Reset
  Write: A write to this location forces the Slow Reset signal low (active).
  Read: The Slow Reset signal can be read back at this location in the SCP data bit 0 (SCPAD0).

0009H:
SCP to CPU Interface: Slow Reset
Write: A write to this location forces the Slow Reset signal high (inactive).
Read: Not used.
000AH:
SCP to CPU Interface: Gate A20
Write: A write to this location forces the Gate A20 signal low (inactive).
Read: The Gate A20 signal can be read back at this location in the SCP data bit 1 (SCPAD1).
000BH:
SCP to CPU Interface: Gate A20
Write: A write to this location forces the Gate A20 signal high (active).
Read: Not used.
000CH:
SCP to CPU Interface: Gate A20 & Slow Reset
Write: The automatic MKI generation of Gate A20 and Slow Reset can be enabled or disabled at this location. The default on Reset is both enabled.
SCPAD1=1=>Enable Gate A20
SCPAD1=0=>Disable Gate A20
SCPAD0=1=>Enable Slow Reset
SCPAD0=0=>Disable Slow Reset
Read: Not used.
000DH:
SCP to CPU Interface: Auxilliary Output Buffer write
Write: When the SCP writes to this address the data will be written into the Output Buffer and the Auxilliary Output Buffer Full (AOBF) bit (bit 5) and the OBF bit (bit 0) of the Status Register will be set. The OBF is cleared when the CPU reads the Output Buffer, and the AOBF stays set until the SCP writes to the Output Buffer through the address 0000H.
Read: The SCP can read back some of the flip-flops in the MKI here. This support is added to help with any Suspend/Resume function that is active in the computer. The byte reads back as:
SCPAD7=>Command D1 received.
SCPAD6=>IRQ1 Enable.
SCPAD5=>IRQ12 Enable.
SCPAD4=>Mouse Output Buffer Full.
SCPAD3=>Auxilliary OUtput Buffer Full.
SCPAD2=>MKI Function Enabled.
SCPAD1=>Not used.
SCPAD0=>Not used.
000EH:
SCP tO CPU Interface: IRQ12
Write: IRQ12 can be enabled or disabled with a write to this location using the SCP data bit 0.
SCPAD0=1=>Enable IRQ12
SCPAD0=0=>Disable IRQ12
Read: Not used.
000FH:
SCP to CPU Interface: MKI Enable
Write: This address is used to enable or disable the MKI features. When enabled the MKI SCPI will not generate an IBF on a CPU write of the command 'DI' or the following data. When disabled the chip will function the same as the SCPI, with an IBF generated on all CPU writes of the Input Buffer. The default on Reset is disabled.
SCPAD0=1=>Enable MKI feature.
SCPAD0=0=>Disable MKI feature.
Read: Not used.
8000H
FFFFH: SCP to External RAM Interface.
Write: Write external RAM (program &/or data).
Read: Read from external Program/Data memory.

TABLE VIII

| CP Memory Map | 10000H |
| --- | --- |
| External RAM for Program/Data Storage. 32k bytes max. | 8000H |
| MKI Feature: Enable/Disable generation of IBF for a CPU write of command 'D1' and the data.<br>SCPAD0 = 1 => Enable<br>SCPAD0 = 0 =>Disable | 000FH |
| Enable/Disable IRQ12 SCPAD0 = 1 => Enable<br>SCPAD0 = 0 => Disable | 000EH |
| Auxilliary Output Buffer: Write a byte to the Output Buffer and set the Auxilliary Output Buffer Full, and CBF bits of the Status Register. Read back information from the chip Flip-flops. | 000DH |
| Gate A20 & Slow Reset: Enable/Disable automatic generation of the Gate A20 and Slow reset signals. | 000CH |
| Gate A20: A Write to this location forces the A20 signal High (active). | 000BH |
| Gate A20: A Write tc this location forces the A20 signal Low (inactive). A Read at this location returns the value of A20 in SCPAD1. | 000AH |
| Slow Reset: A Write to this location forces the -RC signal High (inactive). | 0009H |
| Slow Reset: A Write to this location forces the -RC signal Low (active). A Read at this location returns the value of -RC in SCPAD0. | 0008H |
| Status Register: The Status Register can be read back at this location. SCPAD<0:7>. | 0007H |
| Output Buffer: The Output Buffer can be read back at this location. SCPAD<0:7>. | 0006H |
| IRQ1: Enable/Disable IRQ1. SCPAD0 = 1 => Enable<br>SCPAD0 = 0 => Disable | 0005H |
| Port 6: Write External Port #6 (6.0–6.7) | 0004H |
| Port 5: Read/Write External Port #5 (5.0–5.7) | 0003H |
| Port 4: Read/Write External Port #4 (4.0–4.7) | 0002H |
| Status Register: Write a byte to the Status Register<br>Input Buffer: Read the byte out of the Input Buffer. | 0001H |
| Output Buffer: Write a byte to the Output Buffer.<br>Input Buffer: Read the byte out of the Input Buffer. | 0000H |

Thirty-two kilobytes of external RAM 348 (FIG. 10) can be accessed by the SCP 26 between addresses 8000H–FFFFH. Since the SCP address bit SCPA 15 will only be high or a logical 1 for addresses 80000H and above, this bit SCPA 15 is used to determine whether the SCP 26 access is a MKI 300 access or a RAM 348 access. If external RAM 348 is not used, the bit SCPA [15] can be tied low thus allowing all external memory accesses by the SCP 26 to be to the MKI 300.

ADDRESS DECODE AND RAM CONTROL LOGIC

The address decode and RAM control logic 308 is illustrated in FIGS. 13 and 14. As previously mentioned, thirty-two kilobytes of external RAM 348 can be addressed by the SCP 26 at addresses 8000H-FFFFH for program storage. More particularly, the MKI 300 generates a RAM chip select signal (–RAMCS), a RAM output enable signal (–RAMOE) and a RAM address latch enable signal (RAMALE) for external RAM control. These signals along with SCP read and write signals (SCPRD, SCPWR) allow the SCP 26 to read and write to the RAM 348. Thus, as discussed above, the SCP address bit SCPA 15 determines whether the access is a RAM 348 access or a MKI 300 access. More particularly, the bit SCPA 15 is inverted by way of an inverter 350 and applied to a buffer 352 to generate the RAM chip select signal (-RAMCS) during a RAM 348 access. The RAM chip select signal (-RAMCS) is active low and will be active any time the address lines 8000H-FFFH are placed on the SCP 26 address data bus SCPAD [0:7]. The address on the SCP address data bus SCPAD [0:7] is latched by a RAM address latch enable signal (RAMALE). The RAM address latch enable signal (RAMALE) is generated by the MKI 300 and is derived from the SCP address latch enable signal (SCPALE) available from the SCP 26. More specifically, the SCP address latch enable signal (SCPALE) is applied to a buffer 354. The RAM address latch enable signal (RAMALE) is available at the output of the buffer 354. In order for the SCP 26 to write a byte to the external RAM 348, an SCP write signal (SCPWR) is brought low. The SCP 26 can read a byte from the RAM 348 by way of the RAM output enable signal (-RAMOE). More specifically, the RAM output enable signal (-RAMOE) is generated by the MKI 300 by ORing an SCP read signal (-SCPRD) with the RAM access control signal SCPA 15 by way of an OR gate 356. The output of the OR gate 356, which indicates a read by the SCP 26 of the RAM 348, is NANDed with a control signal (-PSEN) by way of a NAND gate 358. The signal PSEN relates to a program store enable and provides a strobe for accessing external memory stored in the RAM 348. Since the RAM output enable signal (-RAMOE) is active low, the output of the NAND gate 358 is applied to an inverter 360. The RAM output enable signal (-RAMOE) is available at the output of the inverter 360.

In addition to accessing the RAM 348, the SCP 26 can also access various external input/output ports (port P4, port P5 and port P6) as well as communicate with the CPU by way of an input buffer 362, an output buffer 364, a status buffer 366 and an auxiliary output buffer 368 through memory mapping. The SCP 26 can both read and write to ports P4 and P5 while port P6 is a write only port relative to the SCP 26. The output ports (P4, P5 and P6) as well as the input buffer 362, output buffer 364, status register 366 and an auxiliary output buffer 368 are located at addresses 0000H through 000FH as delineated in TABLE VIII. As previously mentioned, the SCP 26 address bit SCPA [15] is low for addresses in this range and is active high only for addresses 8000H and above, indicative of a PAM access. Thus, the bit SCPA 15 may be applied to a decoder 370 (FIG. 13) for decoding addresses between 0000H and 0000FH. More specifically, the lower eight bits of an SCP address are applied to latches 372 through 386 by way of the SCP internal address data bus SCPADIN [0:7]. The latches 372 to 386 are enabled by an SCP address latch enable signal (-SCPALE), which is active below and available at the output of an inverter 388. The signal (-SCPALE) applied to an enable input (EN) of the latches 372-386. The latches 372-386 are reset by a signal (-RESET), available at the output of a buffer 391.

The outputs of the address latches 372 to 386 are applied to the 4×16 address decoder 370 by way of an internal address bus SPA [0:7]. More specifically, the upper nibble (e.g., SPA [7:4]) is NORed with the SCPA 15 by way of a NOR gate 389 signal to enable the address decoder 370 any time the SCP 26 is not accessing the RAM 348. For addresses 0000H through 000FH, the bits SPA [7:4] in the upper nibble will all be low. These bits, SPA [7:4] are applied to the NOR gate 389, which is used to enable the decoder 370. The lower nibble (e.g., SPA [3:0]) is applied to the address inputs A3, A2, A1, A0, respectively, of the address decoder 370. The output of the address decoder 370 is then used to generate read and write signals for the various input output ports (P4, P5 and P6) and as well as for the input buffer 362, output buffer 364 and status register 366 buffers. Additionally, the address decoder 370 generates address control signals a000 [15:8] and a000 [5] as will be discussed below. More specifically, the address decoder 370 provides sixteen outputs SEL0-SEL15, which are all active low. The decoder 370 output signals are ORed with SCP write (-SCPWR) and SCP read (-SCPRD) read signals to generate read and write signals for the various input output ports as well as the input buffer 362, output buffer 364 and status register 366 by way of the OR gates 388 to 406. Moreover, since the input buffer 362 can be read at either address 0000H or address 0001H, the select outputs (-SEL0) and (-SEL1) are ANDed by way of an AND gate 408 and applied to the OR gate 398 to generate the input buffer read signal (-INBUFRD).

The address decoder 370 is illustrated in FIG. 14. The 4×16 decoder 370 includes four address inputs A3, A2, A1, A0 as well as an enable input (available at the output of the NOR gate 389) to provide sixteen outputs SEL0-SEL15. As previously discussed, the lower nibble of the internal address bus SPA [3:0] is applied to the address inputs A3, A2, A1, A0. The enable input is connected to the output of the NOR gate 389 which indicates an address range between 0000H and 000FH. Sixteen select outputs are provided SEL0-SEL15 which are active low. The select outputs, (-SEL0) to (-SEL15), are available at the output of NAND gates 410 through 440.

The four by sixteen address decoder 370 also includes a buffer 442 and four inverters 444, 446, 448 and 450. The enable signal is applied to the input of the buffer 442. A buffer enable signal (BENABLE), available at the output of the buffer 442, is applied to the inputs of each of the NAND gates 410 through 440. The address inputs A3, A2, A1 and A0 are applied to various of the NAND gates 410 through 440 as well as to inverters 444, 446, 448 and 450 as shown in FIG. 14. The outputs of the NAND gates 410 through 440 are select inputs (-SEL0) to (-SEL15) which are used to form various read and write signals as well as address control signals as previously discussed.

CPU TO SCP INTERFACE

Communication between the CPU and the SCP 26 is by way of an input buffer 362, the output buffer 364, a status register 366 and an auxiliary output buffer as illustrated in FIG. 15 and discussed below. The input buffer 362 is an eight bit register comprised of flip-flops 452, 454, 456, 458, 460, 462, 464 and 466. This eight bit register 362 is write only to the CPU and address 60H or 64H and is read only to the SCP 26. More specifically, the CPU system data bus (SD [7:0]), which is connected to the internal system data in bus SDIN [0:7] by way of pins 4, 5, 8, 9, 26, 27, 30 and 31, is applied to D inputs of the flip-flops 452, 454, 456, 458, 460, 462, 464 and 466 in order to enable the CPU to write to the input buffer 362. Data is clocked into the flip-flops 452, 454, 456, 458, 460, 462, 464 and 466 by an input buffer clock signal (-IBCLK). More specifically, the input buffer clock signal (-IBCLK) signal is applied to the clock (CP) inputs of the flip-flops 452, 454, 456, 458, 460, 462, 464 and 466. The input buffer clock signal (-IBCLK) is generated by ORing a CPU write signal (-IOW) with a system control processor chip select signal (-SCPCS), both active low, by way of an OR gate 468. These signals IO write (-IOW) and system control processor chip select (-SCPCS) are generated by the CPU whenever the CPU writes to the MKI 300. These signals are applied to pins 39 and 42 of the MKI 300.

An important aspect of the invention as will be discussed below, relates to the availability of the MKI 300 to recognize a two byte sequence from the CPU for control of the Gate A20 signal without interrupting the SCP 26. This feature is available whenever the MKI 300 is placed in an MKI mode. When the MKI 300 is not in the MKI mode, the control of the Gate A20 signal will be similar to the SCPI 28 which requires the SCP 26 to read the input buffer 362 and clear the input buffer full flag (IBF) for each of the bytes in the two byte sequence to control the Gate A20 signal. Except for control of the Gate A20 signal when the MKI feature is enabled as discussed above, any time the CPU writes to the input buffer, an input buffer full flag (IBF) is set and a command/data flag is set. The input buffer full flag (IBF) is provided by a pair of flip-flops 470 and 471. The input buffer clock signal (-IBCLK) is applied to the clock input (CP) of the flip-flop 470. An input buffer data signal INBUFDATA (FIG. 16) is applied to a D input of the flip-flop 470. As will be discussed below, the input buffer data signal (INBUFDATA) is under the control of an MKI enable signal (MKIEN), which only generates an input buffer data signal (INBUFDATA) when the MKI feature is disabled. The signal INBUFDATA indicates that the input buffer contains a byte which is either command or data. The input buffer data signal (INBUFDATA) is clocked into the input buffer full flag flip-flop 470 by the input buffer clock signal (-IBCLK). The output of the flip-flop 470 is applied to bit 1 of a status register output bus SRO [1] to indicate to the SCP 26 that a byte is contained in the input buffer 362. Once the system SCP 26 initiates a read of the input buffer 362 an input buffer output enable signal (-INBUFOE) is generated at the output of an OR gate 472. An input buffer read signal (-INBUFRD) is ORed with a reset signal by way of the OR gate 472 to generate the input buffer output enable signal (-INBUFOE). The input buffer output enable signal (-INBUFOE) is applied to an output enable input (OE) of the flip-flops 452–456 by way of inverters 474, 476, 478, 480, 482, 484, 486 and 488 to enable the outputs of the flip-flops 452 to 466 to be connected to the internal SCP address data output bus SCPADOUT [0:7], which, in turn, is applied to the SCP system data output bus SCPAD [0:7].

When the MKI feature is disabled, once the SCP 26 reads the data from the input register 362, the input buffer full flag (IBF) is cleared automatically by the MKI 300. More specifically, the input buffer output enable signal (-INBUFOE) is applied to a clock input of the flip-flop 471 whose D input is tied low. Thus, the input buffer output enable signal (-INBUFOE) clears the flip-flop 471 once the SCP 26 reads the byte from the status register 362. The Q output of the flip-flop 471 is applied to a clear input (CDN) of the flip-flop 470 to clear the input buffer full flag (IBF). In order to prevent the input buffer full flag (IBF) from being cleared prior to the SCP 26 reading the byte from the input buffer 362, the flip-flop 471 is preset by an input buffer clock signal (-IBCLK) which is applied to a preset (SDN) input of the flip-flop 490. This sets the flip-flop 471 to prevent the input buffer full flag (IBF) from being cleared until the SCP 26 reads the byte from the input register 362.

In addition to setting the input buffer flag (IBF), a command data flag (CMDATA) is also set whenever the CPU writes a byte to the input buffer 362. The command data flag (CMDATA) is used to set bit 3 of the status register 366 to indicate to the SCP 26 that the input register 362 contains either command or data. More specifically, an address bit SA2 from the CPU bus is used to decode whether the CPU wrote to address 60H or 64H. A write to 64H indicates a command while a write to 60H indicates data.

The address bit SA2 will be high for 64H and low for 60H. This bit SA2 is applied to a D input of a flip-flop 492 which is used as a command data flag. This signal SA2 is clocked into the flip-flop 492 by the input buffer clock signal (-IBCLK) which is applied to the clock input (CP) of the flip-flop 492. The output of the flip-flop 492 indicates whether command or data was written by the CPU to the input buffer 362. This output is used to set bit 3 of the status register 366.

The output buffer 364 is an 8 bit register which includes the flip-flops 494 through 508. The output buffer 364 is read only to the CPU at address 60H and is written to by the SCP 26. The SCP 26 can also read the output buffer 364. The SCP internal address data bus SCPADIN [0:7] is applied to the D inputs of the flip-flops 494–508. The data on the bus SCPADIN [0:7] is clocked into the flip-flops 494, 508 by an output buffer clock signal (-OBUFCLK) which is applied to the clock inputs (CP) of the flip-flops 494 to 508. The output buffer clock signal (-OBUFCLK) is active low to enable the SCP26 to write a byte to the output buffer 364 at address 0000H.

The flip-flops 494–508 also act as the Auxiliary Output Buffer when the SCP addresses 000DH. More specifically an address decode signal (-00013) from the address decoder 370 is ORed with an SCP write signal (-SCPWR) by way of an OR gate 510 (FIG. 18). The output of the OR gate 510 indicates that the SCP 26 initiated a write to the address 000DH.

The flip-flops 494–508 are clocked by an output buffer clock signal (-OBUFCLK). More specifically, the output of the OR gate 510 is ANDed with an output buffer write signal (-OBUFWR) by way of an AND gate 512 which is active low any time the SCP writes to address 0000H. The output of the AND gate 512 is the signal output buffer clock signal (-OBUFCLK), which represents that the SCP 26 address either 0000H or 000DH.

Any time the SCP 26 writes to the output buffer 364, an output buffer full flag (OBF) is set in the status register 366. A pair of flip-flops 511 and 513 are used to set the output buffer full flag; bit 0 of the status register 366. The output buffer full flag (OBF) is set by the flip-flop 511. More particularly, an output buffer write signal (-OUTBUFWR) is applied to a clock input of the flip-flop 511. The D input of the flip-flop 511 is tied high. Thus, whenever the SCP 26 writes to the output buffer 364 the flip-flop 511 will be set indicating an output buffer full flag (OBF); which is tied to an internal status register bus bit SRO [0].

The MKI 300 also resets the output buffer full flag (OBF) whenever the CPU reads the byte in the output buffer 364. This is accomplished by the flip-flop 513. More specifically, the flip-flop 513 is set by the output buffer write signal (-OUTBUFWR) which is applied to the set input (SDN). The Q output of the flip-flop 513 is applied to a clear input (CDN) of the flip-flop 511. The D input of the flip-flop 513 is tied low. An enable data signal (-ENDATA) is applied to the clock input (CP) of the flip-flop 513. The enable data signal (-ENDATA) represents that the CPU has read the byte in the output buffer 364 at address 60H. More specifically an IO read signal (IOR) which indicates that the CPU has initiated a read operation, is ORed with a CPU address signal A2 which is low for address 60H. These signals along with an SCPCS signal, which indicates that the CPU addressed either address 60H or 64H, are applied to an OR gate 514 along with a reset signal. The output of the OR gate 514 is applied to a buffer 516. The output of the buffer 516 is the enable data signal (-ENDATA) which indicates that the CPU has initiated a read to address 60H. This enable data signal (-ENDATA) is applied to the clock input (CP) of the flip-flop 513, whose D input is tied low in order to clear the flip-flop 513. Since the Q output of the flip-flop 513 is connected to the clear input (CDN) of the flip-flop 511, the flip-flop 511 can thus be cleared any time the CPU reads the byte from the output buffer 364.

The enable data signal (-ENDATA) is also used to control tristate devices 514 to 528, used to connect an internal output buffer bus OBO [0:7] to the Q output of the flip-flops 484 through 508 to the system data output bus SDOUT [0:7].

The SCP 26 can read the output of the output buffer 364 by way of tristate devices 537-551. More particularly, the Q outputs of the flip-flops 494-508 are tied to the internal SPADOUT [0:7] by way of the tristate devices 537-551. The tristate devices 537-551 are under the control of an output buffer read signal (-OUTBUFRD), a decode signal, available at the output of the OR gate 404 (FIG. 13), which indicates the SCP read address 0001H.

The status register 366 is an 8 bit register and includes the flip-flops 530, 532, 534 and 536. The status register 366 is read only to the CPU at address 64H and written to by the SCP 26. The SCP 26 can also read the status register 366 in order to determine the status of the output buffer full flag (OBF) and the command data flag (CMDATA). Five of the bits of the status register are written by the SCP 26 while three are generated by the MKI 300 (IBF, OBF) command data. The status register bit definition is provided in TABLE IX.

TABLE IX

STATUS REGISTER BIT DEFINITION

Status Register Bit Definition:

Bit 7 Parity Error—Written by the SCP.

Bit 6 Receive Time-Out—Written by the SCP.

Bit 5 Transmit Time-Out—Written by the SCP when MKI features are disabled.

Auxiliary Output Buffer Full—Generated by the MKI when the MKI features are enabled and the SCP writes to the Auxilliary Output Buffer.

Bit 4 Inhibit Switch—Written by the SCP.

Bit 3 Command/Data—Generated by the MKI

This signal indicates whether the last byte written by the CPU was a Command (written to address 64H) or Data (written to address 60H).

Bit 2 System Flag—Written by the SCP.

Bit 1 Input Buffer Full—Generated by the MKI

This signal indicates when the CPU has written a byte to the Input Buffer but the SCP has not yet read the byte out of the latch. It can be used by the CPU as a flag to indicate that the SCP is ready to receive a byte.

Bit 0 Output Buffer Full—Generated by the MKI

This signal indicates when the SCP has written a byte to the Output Buffer but the CPU has not yet read the byte out of the latch. It can be used by the SCP as a flag to indicate that the CPU is ready to receive a byte.

As noted in TABLE IX, the SCP 26 writes bits 2, 4, 6 and 7 to the status register 366 while bits 0, 1 and 3 are generated by the MKI 300. Bit 5 can either be written by the SCP or generated by the MKI depending on whether the MKI 300 is enabled. Accordingly, bits 2, 4, 6 and 7 of the system control processor address data input bus SCPADIN [2, 4, 6, 7] are applied to the D input of the flip-flops 530, 532, 534 and 536. These bits are clocked into the flip-flops 530 through 536 by a status write signal (-STATUSWR). The status write signal (-STATUSWR) is a decoded signal from the address decoder 370 (FIG. 13) which indicates that the SCP is writing to the status register 366 at address 0001H. The Q output of the flip-flops 530, 532, 534 and 536 are applied to an internal status register output bus SRO [0:7]. As previously discussed, the input buffer full flag (IBF) from flip-flop 470 and the output buffer full flag (OBF) from the flip-flop 511 are applied to the status register output bus bits 0 and 1, respectively.

As indicated in TABLE IX, bit 5 is a dual function bit and is either written by the SCP 26 or generated by the MKI 300 depending upon whether the MKI feature is enabled. More specifically, when the MKI feature is disabled, the SCP 26 can write bit SRO[5] by way of bit SCPADIN [5], applied to D input of a flip-flop 537 (FIG. 15). This bit SCPADIN [5] is clocked into the flip-flop 537 by a status write signal (-STATUSWR). The status write signal (-STATUSWR) is a decode signal from the address decoder 370 and is active low whenever the SCP 26 writes to address 0001H. The output of the flip-flop 537 is a status register bit 5 signal (SRB5), which is applied to an OR gate 539 (FIG. 18) to generate a status register output bit SRO [5], which, in turn, is applied to the internal status register bus SRO [0:7] (FIG. 15).

When the MKI feature is enabled the status register bit SRO [5] is generated by the MKI 300. More specifically, during such a condition, the status register bit SRO [5] is generated by a flip-flop 541 (FIG. 18), whose output is applied to the OR gate 539 to generate the bit SRO [5] as discussed above. A D input of the flip-flop 541 is tied high. The flip-flop 541 is clocked by the output of the OR gate 510 which indicates that the SCP 26 addressed the auxiliary output buffer by writing to address 000DH.

Since the status register 366 may be read by either the SCP 26 or the CPU, the status register output bus SRO [0:7] is connected to the system control processor address data output bus SCPADOUT [0:7] by way of tristate devices 538-552 and to the system data output bus SDOUT [0:7] by way of tristate devices 554-568. More particularly, the Q outputs of the flip-flops 530, 532, 534 and 536 are applied to bits SRO [2, 4, 6, 7] respectively. The bits SRO [2, 4, 6, 7] are written by the SCP 26 as discussed above. The remainder of the bits (e.g., SRO [0, 1, 3, 5]) are generated by the MKI 300 as illustrated in TABLE IX. These bits SRO [0, 1, 3, 5] are available as discussed below. More specifically, bit SRO [0] which indicates that the output buffer 364 is full, is available at the output of an OR gate 553 (FIG. 18). The OR gate 553 is a two input OR gate. One input is an output buffer full signal (OBF), available at the flip-flop 511 (FIG. 15). The output of the flip-flop 668 is applied to the other input, which indicates that SCP wrote a byte to the output buffer 364. Bit SRO [5] is written by the SCP 26 when the MKI feature is disabled and generated by the MKI 300 when the MKI features are enabled. This bit SRO [5] is available at the output of an OR gate 555 (FIG. 15). The OR gate 555 is a two input OR gate. One input is a status register bit 5 signal (SRB 5), available at the output of the flip-flop 368 (FIG. 15) which indicates that the auxiliary output buffer full flag is set. This signal (SRB 5) is ORed with the output of a flip-flop 557 (FIG. 18) whose D input is tied high. The flip-flop 557 is clocked by the output of the OR gate 510 which indicates the SCP 26 addressed the auxiliary output buffer 368. The flip-flop 557 is cleared by an AND gate 557 which resets SRO [5] on system reset by an output buffer write signal (-OBUFWR), available at the output of an OR gate 400 (FIG. 13) which indicates that the SCP 26 initiated a write to the output buffer 364 at addressed 0000H. Bit SRO [3] is available at the output of the flip-flop 492, which indicates that a command/data byte was written by the CPU.

The tristate devices 538 to 552 are under the control of a status read signal (−STATUSRD) which is a decoded signal from the address decoder 370 which allows the SCP 26 to read the contents of the status register 366 at address 0007H. The tristate devices 554 to 568 are under the control of a status enable signal (STATEN). The status enable signal (STATEN) allows the CPU to read the contents of the status register 366 at address 64H. The status enable signal (−STATEN) is generated at the output of an OR gate 570. An SCP chip select signal (−SCPCS), which indicates that the CPU addressed either 60H or 64H, is applied to one input. An IO read signal (−IOR) is applied to another input along with an address decode signal which indicates that the address 64H was addressed. The output of the OR gate 570 as applied to a buffer 572. The output of the buffer 572 is the enable data signal (−ENDATA).

The output buffer 364, status register 366, as well as the input buffer flag (IBF), output buffer flag (OBF), auxiliary output buffer flag (AOBF) and the command data flag (CMDATA) may all be reset by the CPU. More specifically, a reset signal (−RESET) available at the output of an inverter 74 is applied to the clear inputs (CDN) of the flip-flops 490, 512, 368 and 492 to reset the input buffer flag (IBF), output buffer flag (OBF), auxiliary output buffer flag (AOBF) and the command data flag (CMDATA), respectively. The reset signal (−RESET) is also applied to the clear input (CDN) of the flip-flops 494 through 508 to reset the output buffer 364 as well as to the clear input (CDN) of the flip-flops 530 through 536 to reset the status register (366) bits which are written by the SCP.

GATE A20 CONTROL

The Gate A20 signal is an active high output signal from the MKI 300 to allow the system to access memory above the 1 megabyte boundary. It can be set or cleared by both the CPU and the SCP 26. An important aspect of the invention relates to eliminating the need for an SCP interrupt for processing of the two byte sequence from the CPU to control the Gate A20 signal when the MKI 300 is enabled. Rather than interrupt the SCP 26 for the command byte D1 and the data byte, these bytes are decoded by the MKI 300 thus eliminating the need for processing by the SCP 26. By eliminating the need to interrupt the SCP 26 for the two byte sequence, the switching of the Gate A20 signal is relatively faster with the SCPI 28.

The CPU can control the Gate A20 with a two byte sequence. The first byte is a command D1H written to the address 64H. The second byte is a data byte written to the address 60H. The MKI 300 will automatically set or clear the Gate A20 for the CPU unless this feature is disabled by the SCP 26. More specifically, the SCP 26 can disable the generation of the Gate A20 signal by the MKI 300 by writing to address A000CH. More specifically, bit SCPAD1, which is applied to the internal SCP address data bus SCPADIN [0:7], is used to control whether the automatic generation of the A20 signal is enabled or disabled. A "1" enables the feature while a "0" disables the feature. The bit SCPADIN [1] is applied to a D input of a latch 576 (FIG. 13). A decoded address signal (−A000[12]), which indicates that the SCP has addressed 0000CH, is applied to one input of the OR gate 577. An SCP write signal (−SCPWR) is applied to the other input of the OR gate 577. The output of the OR gate 577 indicates that the SCP has written to address A000CH. If the bit SCPADIN [1] is a "1", an enable 20 signal (−ENA20) which is active low, will be available at the output of the latch 576. If the bit SCPADIN [1] is low the automatic generation of the Gate A20 signal will be disabled.

Figure 16A:
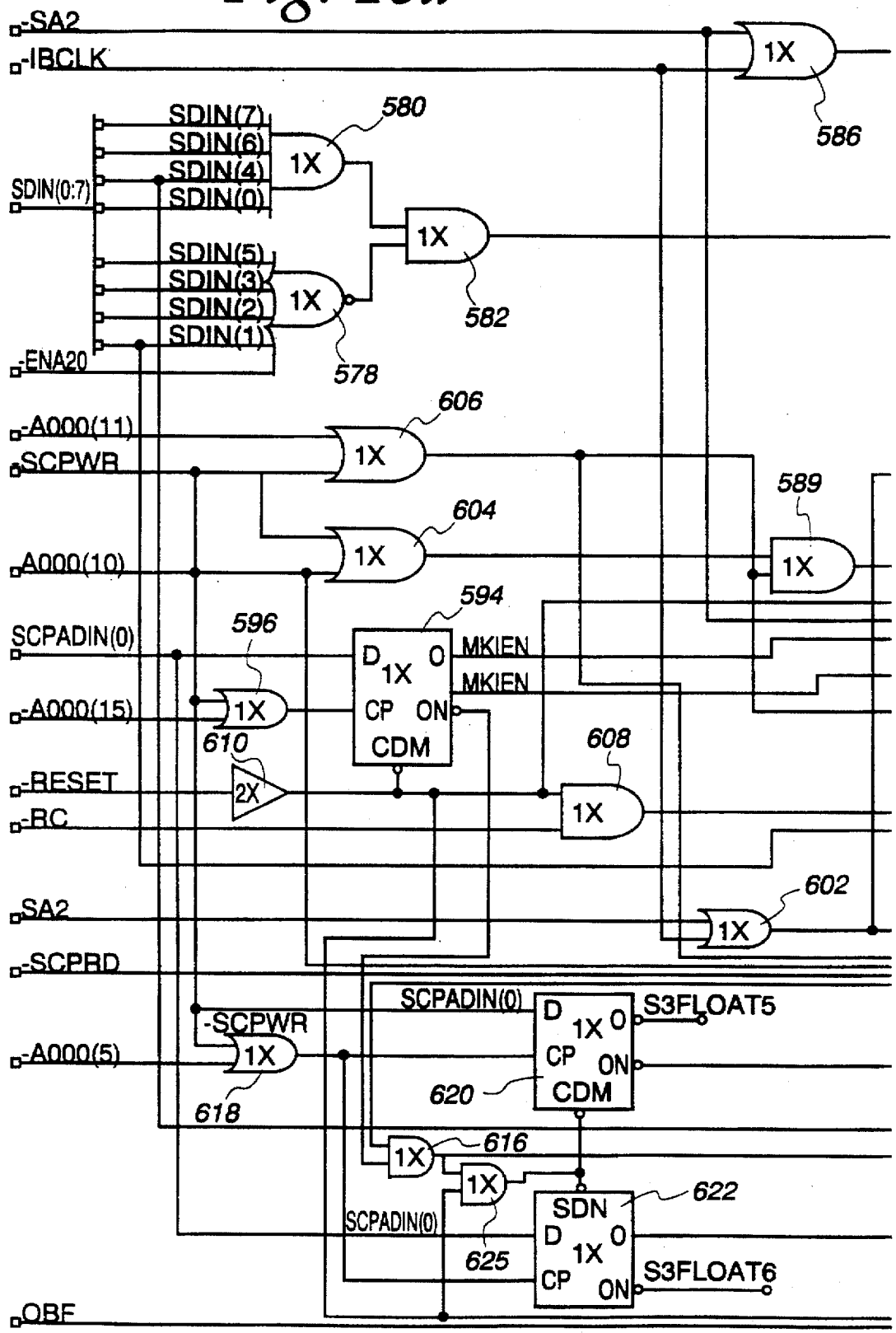
FIGS. 16A–16B are schematic diagrams of the Gate A20 control logic in accordance with the present invention.
Figure 16B:
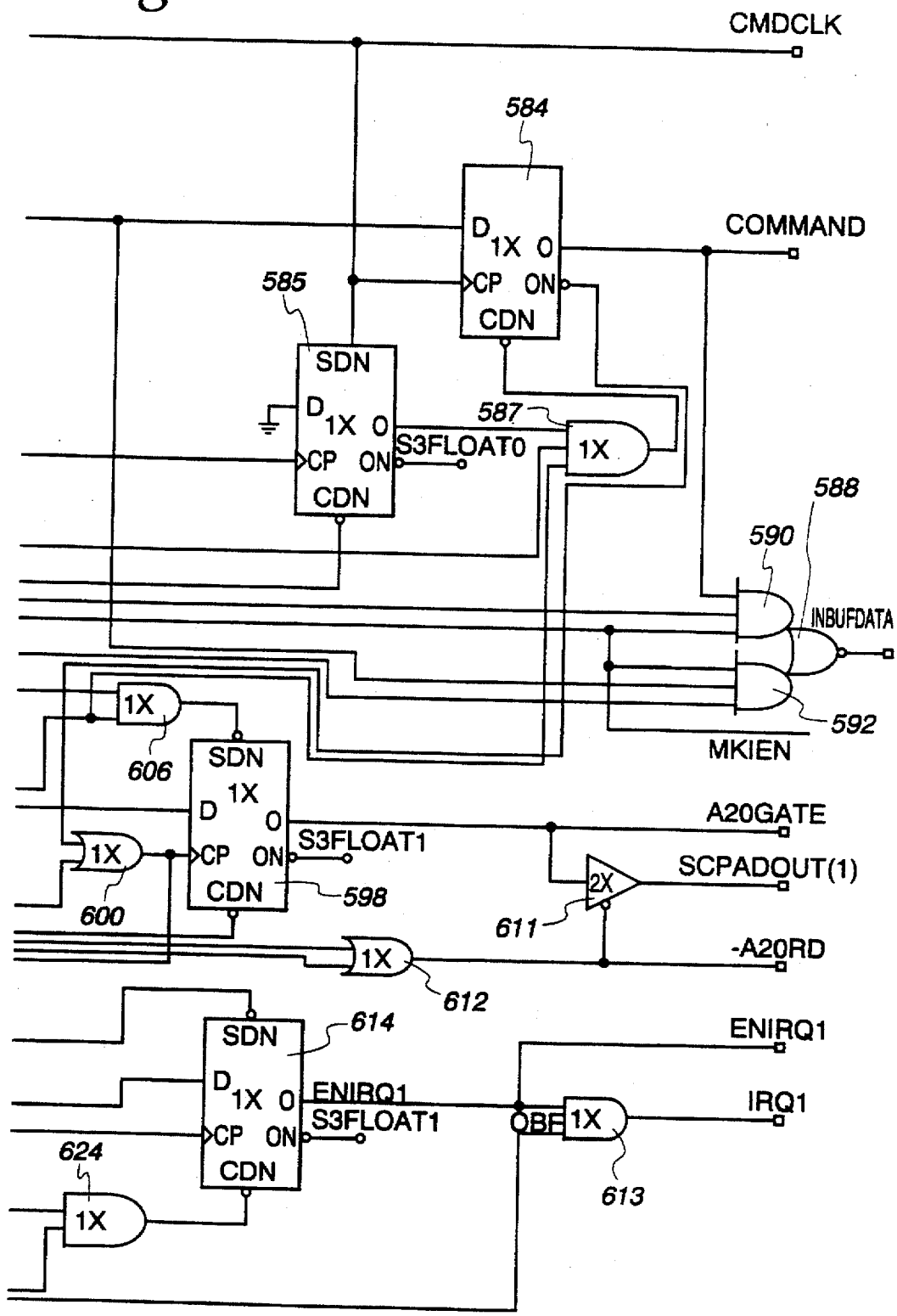

The command D1 is decoded by circuitry which includes a NOR gate 578, and two AND gates 580 and 582. The enable signal (−ENA20) is applied to the NOR gate 578 (FIG. 16). The system data bus SD [7:0] SD [7, 6, 4, 0] bits are applied to the AND gate 580 while the bits SD [5, 3, 2, 1] are applied to the NOR gate 578 along with the enable signal (−ENA20). The output of the NOR gate 578 as well as the output of the AND gate 580 is applied to a two input AND gate 582. The output of the AND gate 582 is a decode of the command D1.

The decoded D1 command signal from the AND gate 582 is applied to a command latch 584. This signal is clocked into the latch 584 by a command clock signal (−CMDCLK). The command clock signal (−CMDCLK) is available at the output of the OR gate 586. An SA2 signal is applied to one input of the OR gate 586. The SA2 signal indicates whether the CPU wrote to address 60H or 64H. The IB clock signal (−IBCLK) is applied to the other input of the OR gate 586. The IB clock signal (−IBCLK) indicates that CPU initiated a write to the address 60H or 64H. The SA2 signal (−SA2) is available at the output of an inverter 586 (FIG. 15) which indicates that the CPU addressed 64H. The command clock signal (−CMDCLK) is applied to the clock input (CP) of the flip-flop 584 to latch the command signal D1 on the output. Circuitry which includes a flip-flop 585 and AND gates 587 and 589 is used to reset the command latch 584. More specifically, the output of the AND gate 587, is applied to the clear input (CDN) of the command latch 584. The AND gate 587 is a three input AND gate. One input to the AND gate 587 is a signal, available at an output of an AND gate 608 which, as discussed below, is active low during a reset and slow reset condition to reset the command latch during these conditions. The other input to the AND gate 587 is an output of an AND gate 589, which as will be discussed, indicates that the SCP 26 has taken control of the Gate A20 signal by writing to either address 000AH or 000BH. Lastly, a Q output of the flip-flop 585 is applied to the AND gate 587. The D input of the flip-flop 585 is tied low. The output of an OR gate 602 (discussed below) is applied to the clock input (CP) of the flip-flop 585 to clear the command latch 584 when a data byte is written by the CPU.

Bit 1 of the data byte, the second byte in the two byte sequence, determines the state of the Gate A20. The Gate A20 signal is set active if bit SDIN [1] is set and will be disabled if this bit is low. The MKI 300 will automatically set or clear the Gate A20 signal unless this feature is disabled by the SCP 26 at address 000CH. More specifically, the A20 gate signal is available at the output of a latch 598. Bit 1 from the system data bus is applied by way of the system data internal bus SDIN [1] to the D input of the latch 598. Bit 1 is clocked into the latch by an A20 clock signal which is applied into the clock input (CP) of the latch 598. The A20 clock signal is available at the output of an OR gate 600. One input to the OR gate 600 is the output of an OR gate 602 which indicates that the CPU has written to either address 60H or 64H. More particularly an SA2 signal is applied to one input of the OR gate 602. An IB clock signal (−IBCLK) is applied to the other input of the OR gate 602. The IB clock signal (−IBCLK) further indicates that the CPU has written to either 64H or 60H. The SA2 signal indicates that a command was written to 64H. The other input signal to the OR gate 600 is a (−COMMAND) signal from the latch 584

QN output. This allows the Gate A20 latch 598 to be set when the second data byte is written by the CPU.

The input buffer data signal (INBUFDATA) controls whether the input buffer full flag (IBF) is set when the CPU writes to the input buffer 364. As discussed below, the input buffer data signal (INBUFDATA) is under the control of a MKI enable signal (MKIEN). More specifically, when the MKI feature has been enabled, the input buffer data signal (INBUFDATA) will be inhibited such that the MKI 300 can process the two byte sequence from the CPU for the Gate A20 control without interrupting the SCP 26. When the MKI feature is disabled and the system processes the bytes, similar to SCPI 28, by setting an input buffer full flag (IBF) each time the CPU writes to the input buffer 364.

The input buffer data signal (INBUFDATA) is generated at the output of a NOR gate 588. The NOR gate 588 is a two input NOR gate. The output of an AND gate 590 is applied to one input while the output of another AND gate 592 is applied to the other input. When the MKI feature is disabled (e.g., MKIEN low) the outputs of the AND gates 590 and 592 will be low which, in turn, will enable the input buffer data signal (INBUFDATA). Thus, the input buffer flag (IBF) will be set each time the CPU writes to the MKI 300. When the MKI feature is enabled (MKIEN is set) one or the other of the AND gates 590, 592 will be high while the other is low causing the NOR gate 588 to be low. More specifically, a command byte D1 written by the CPU to address 64H will cause the output of the AND gate 592 to be high since the D1 input (from the AND gate 582), the SA2 input (indicating a CPU write to address 644) and the MKI enable signal (MKIEN) to the AND gate 592 will all be high during this condition. However, the (–SA2) input to the AND gate 590 will cause the output of the AND gate 590 to be low and thus the output of the NOR gate 588 to be low, which, in turn, disables the input buffer flag (IBF). Similarly, when the data byte is written by the CPU, the AND gate 590 will be high and the AND gate 592 will be low, disabling the input buffer data signal (INBUFDATA).

The MKI enable signal is available at the output of a latch 594. This signal MKIEN is active high and is applied to the inputs of the AND gates 590 and 592. When the MKI enable signal is low this will disable the AND gates 590 and 592 such that the input buffer data signal will be active during the command/data two byte sequence.

The MKI enable signal MKIEN is controlled by the SCP 26. More specifically, the SCP 26 can write to address 000FH to either enable or disable the MKI enable latch 594. Bit SCPAD [0] of the SCP address data bus, which is applied to the internal SCP address data bus SCPADIN [0], controls whether the MKI 300 is enabled or disabled. If SCPADIN [0] is 1, the MKI enable (MKIEN) is set. When the SCP 26 writes a 0 to SCPADIN [0] the MKI feature is disabled. The SCPADIN [0] is applied to the D input of the latch 594. A decode signal, available at the output of an OR gate 596 is applied to the clock inputs (CP) of the address latch 594. A decode signal (–a00015) from the address decoder 370 applied to one input of the OR gate 596 along with an SCP write signal (–SCPWR). The output of the OR gate 596 will indicate any time the SCP 26 initiates a write to the address 000FH.

The SCP 26 can also control the Gate A20 signal by writing to either address 000AH or 000BH. More particularly, an address decode signal (–A00010) from the address decoder 370 indicating that the SCP address address A00AH is applied to one input of a two input OR gate 604 along with an SCP write signal (–SCPWR). The output of the OR gate 604 is applied to a clear input (CDN) of the A20 latch 598 to force the Gate A20 signal low or inactive. The SCP can also force the Gate A20 signal high by writing to address A00BH. More specifically, a decoded address signal A000 [11] which indicates that the SCP 26 wrote to the address A00BH is applied to an OR gate 606 along with an SCP write signal (–SCPWR). The output of the OR gate 606 is applied to a preset input of the A20 latch 598 by way of an AND gate 606.

In order to initialize the MKI 300 during a reset or slow reset condition a reset (–RESET) is applied to one input of the AND gate 608 by way of a buffer 610. A slow reset signal (–RC), discussed below, is applied to the other input. The output of the OR gate 608 sets the Gate A20 signal (a20gate) high on reset and slow reset.

The SCP 26 can also read the status of the Gate A20 latch 548 by reading address A000AH. More particularly, the output of the Gate A20 latch 598 is applied to the system control processor address data output bus SCPADOUT [1] by way of a tristate device 611 to enable the SCP 26 to read the status of the Gate A20 signal. The tristate device 611 is under the control of an A20 read signal (–A20RD) which is available at the output of an OR gate 612. The OR gate 612 is a two input OR gate. One input is from the SCP read signal (–SCPRD). The other input is a decoded address signal (–A00010) from the address decoder 370 which indicates that the SCP wrote to address A000AH.

IRQ1

IRQ1 is an active high output signal that informs a CPU that the output buffer is full. It can be enabled by either the SCP or the CPU. The default on reset is disabled. When the MKI feature is enabled, the CPU can enable/disable the IRQ1 with a write output port command. More specifically, the write output port command is the two byte sequence by the CPU when the CPU writes a command D1 to the input buffer 362 at address 64H followed by a byte of data to the input buffer at address 60H. The data byte is used to control the CPU interrupt IRQ1 when the output buffer is full as well as control setting of the Gate A20 signal. TABLE X indicates the bit definitions for the data byte.

TABLE X

| WRITE OUTPUT COMMAND DATA BIT DEFINITIONS |  |
|---|---|
| Bit 7 | Keyboard data (output) |
| Bit 6 | Keyboard clock (output) |
| Bit 5 | Input Buffer Empty |
| Bit 4 | Output Buffer Full |
| Bit 3 | Reserved |
| Bit 2 | Reserved |
| Bit 1 | Gate A20 |
| Bit 0 | System Reset |

The CPU interrupt IRQ1 is available at the output of an AND gate 613. One input to the AND gate 613 is an output buffer flag (OBF) available from the flip-flop 510 (FIG. 15). The other input to the AND gate 613 is an enable IRQ1 signal (ENIRQ1). The enable signal (ENIRQ1) is available at the output of the latch 614. As indicated in TABLE X, bit SDIN [4], which indicates that the output buffer is full, is used to control the enablement of the interrupt signal (IRQ1). This bit SDIN4 is applied to the D input of the latch 614 and is clocked into latch 614 by the output of an OR gate 616, applied to the clock (CP) input. One input to the OR gate 616 is from the QN output of the latch 594 which indicates that the MKI feature is disabled. This signal (–MKIEN) enables the interrupt IRQ1 when the MKI feature is disabled. The other input to the OR gate 616 is the output of the OR gate 600 which is used to clock the A20 signal.

The interrupt IRQ1 can also be controlled by the SCP 26. More specifically, the SCP can write to address 0005H to enable or disable IRQ interrupt. More particularly, a decode signal A0005 is applied to an OR gate 618 along with an SCP write signal (–SCPWR). The output of the OR gate 618 indicates that the SCP has written to address A005H. The output of the OR gate 618 is applied to the clock input of latches 620 and 622. The latch 620 is used to enable the IRQ1 interrupt while the latch 622 is used to disable it. More particularly, a QN output of the latch 620 is applied to a preset input of the latch 614 while the Q output of the latch 620 is applied to the clear (CDN) input of the latch 614 by way of an AND gate 624 wherein the output of the latch 614 is ANDed with a reset signal which causes the latch 614 to be reset during a system reset by the CPU. An AND gate 625 is used to preset the latch 622 and clear the latch 620. The AND gate 625 is a two input AND gate. A reset signal (–RESET) is applied to one input to clear the interrupt IRQ1 during a reset condition. The other input to the AND gate 625 is the output of the OR gate 616 which clears the latch 620 when the command byte is written, as long as the MKI feature is enabled.

Bit SCPAD [0] is used to enable or disable the IRQ1 interrupt. This bit SCPAD [0] is applied to the D input of the latches 620 and 622 by way of the internal SCPA address data bus SCPADIN [0]. If SCPAD [0] equals 0 then the interrupt IRQ1 is enabled. Otherwise the interrupt is disabled.

SLOW RESET

Figure 17:
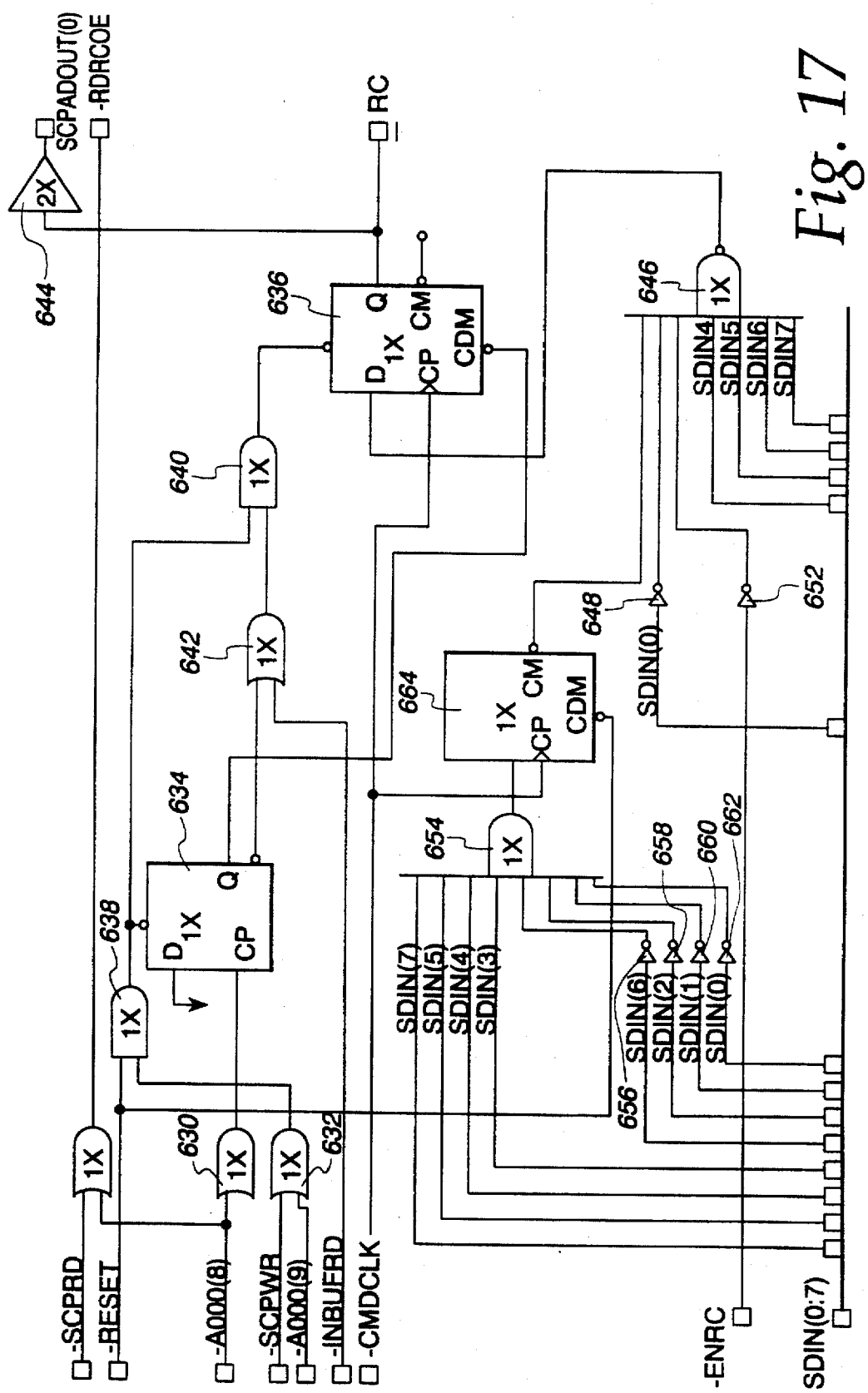
FIG. 17 is a schematic diagram of the slow reset logic in accordance with the present invention.
Figure 18:
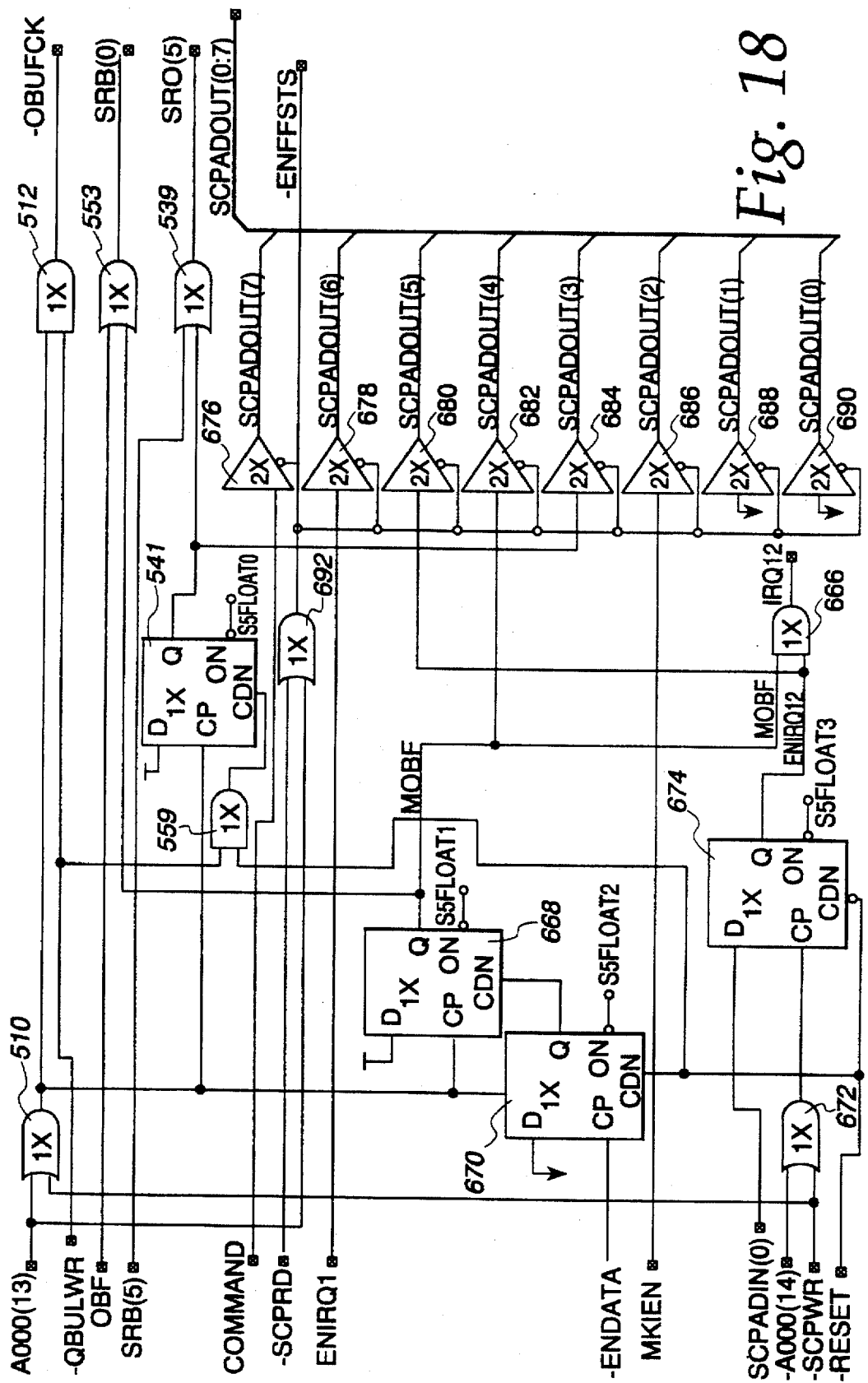
FIG. 18 is a schematic diagram of the IRQ12 mouse interrupt logic in accordance with the present invention.

The slow reset signal (–RC), illustrated in FIG. 17 is an active low output signal to reset the CPU. It can be set by the CPU or set and cleared by the SCP 26. It is cleared when the MKI 300 is reset by the reset pin.

The SCP 26 can gain control of slow reset through the memory map. A write to location 0008H forces the slow reset signal active while a write to address 0009H forces the slow reset signal inactive. More specifically, the decoded address signals A0008H and A0009H from the address decoder 370 are applied to OR gates 630 and 632 and ORed with an SCP write signal (–SCPWR). The output of the OR gate 630 is applied to a clock input of a flip-flop 634 whose D input is grounded. The Q output of the flip-flop 634 is applied to a clear input (CDN) of a flip-flop 636. The output of the flip-flop 636 is a slow reset signal (–RC). Thus, any time the SCP 26 writes to address A008H, the output of the flip-flop 634 will go low which in turn clears the flip-flop 636 to generate the active low slow reset signal (–RC).

An SCP 26 write to address 0009H forces the slow reset signal to go inactive. More specifically, the output of the OR gate 632 is ANDed with a system reset signal (–RESET) by way of the AND gate 638 which allows the SCP to clear the system reset signal and additionally allows the slow reset signal to be cleared on system reset. The output of the AND gate 638 is applied to a preset input (SDN) of the flip-flop 634 as well as to an AND gate 640. Thus, any time the SCP 26 writes to address 0009H or there is a reset signal from the CPU the flip-flop 634 will be preset. This causes the QN output from the flip-flop 634 to be low which is ORed with an input buffer read signal in an OR gate 642. The output of the OR gate 642 is applied to the other input of the AND gate 640 whose output is applied to a preset input of the flip-flop 636.

The SCP 26 can also read the status of the slow reset signal by initiating a read to address 0008H. More particularly, an SCP read signal (–SCPRD) is ORed with a decoded address signal (–A0008) by way of the OR gate 642. The output of the OR gate forms a read RC operate enable signal 642. This control signal (–RDRCOE) is used to control a tristate device 644 which is connected to the Q output of the flip-flop 636 on one end and to the system control processor address data output bus bit SCPADOUT [0].

The CPU can also set the slow reset signal active with a signal command write. More particularly, reset is set active by the CPU when an even byte between F0 and FE is written to address 64H. The circuitry which includes the NAND gate 646 and the inverter 648 decodes even bytes between F0H and FEH. More particularly, the internal system data bus internal bits SDIN [7:4] are applied to inputs of the NAND gate 646. These bits will all be high for the addresses F0H through FEH. Bit SDIN [0], which is low for even byte between F0 and FE as applied to the inverter 648 whose output in turn is applied to the NAND gate 646.

Two interlock signals are also applied to the NAND gate 646 to disable the slow reset (–RC) during certain situations. First, the SCP can disable the slow reset feature by writing to address 000CH. More particularly, the decoded address signal A00012, available at the output of an OR gate 576 (FIG. 13) which indicates an SCP write to address 000CH, is applied to a clock input of a latch 650 (FIG. 13). Bit 0 of the SCP internal address data bus is used to either enable or disable the slow reset. Thus, bit SPADIN0 is applied to the D input of the latch 650. If bit SCPADIN [0] equal 1, the slow reset will be enabled while a 0 will disable the slow reset. The QN output of the latch 650 is an enable RC signal (–ENRC) which is applied to one input of the AND gate 646 (FIG. 17) by way of an inverter 652 to either enable or disable the slow reset signal.

To accommodate an established firmware unlocking scheme to enable the slush, the automatic setting of the slow reset signal by the CPU write of a command F even is disabled for one command write after the command B8 is written by the CPU. The slush enable consists of a four byte sequence, the first two bytes being B8 and F8. The MKI 300 will thus disable the automatic generation of the slow reset signal for one command byte after it receives a command byte B8. The circuitry for decoding the command byte B8 includes the AND gate 654, the inverters 656, 658, 660, 662 and the latch 664. For the command byte B8 bits SDIn [6, 2, 1, 0] will be low. These bits are applied to the inverter 656, 658, 660 and 662. The output of the inverters 656, 658, 660 and 662 are applied to the AND gate 654. The bits SDIN [7, 5, 4, 3], which are high for the command signal B8, are also applied to the inputs of the AND gate 654. The output of the AND gate 654, represents a decoded B8 command signal which is applied to a D input of the latch 664. The command clock signal (CMDCLK) is used to clock the flip-flop 664. As previously discussed, this signal indicates that the CPU wrote to address 64H. Thus, the QN output of the latch 664 will indicate that the byte B8 was written to the address 64H by the CPU. This output is applied as a permissive to the NAND gate 646. The output of the NAND gate 646 is applied to a D input of a latch 636 while the command clock signal (–CMDCLK) is applied to the clock input CP to enable the CPU to control the slow reset signal unless this feature has been disabled by the SCP or the command byte B8 has been received by the system. After the SCP reads the byte from the input buffer the slow reset signal is cleared. The flip-flop 664 is also reset on system reset.

IRQ12

The MKI 300 allows a type PS/2 mouse to be interfaced with the SCP 26 by way of an auxiliary device connector (e.g., a 6 pin mini DIN connector). Data from the mouse is sent by the SCP 26 to the CPU by way of the output buffer 364. This data sets the output buffer full bit of the status register 366 just like normal data from the SCP 26 and additionally sets the auxiliary output buffer full flag (e.g., bit 5 of the status register 366). When enabled, an IRQ12 interrupt is set by an auxiliary output full flag (MOBF). When the output buffer 364 is read by the CPU, output buffer full signal is cleared; however, the auxiliary output buffer full signal (MOBF) is left active until the SCP 26 writes a non-mouse byte to the output buffer 364.

The interrupt IRQ12, an interrupt to the CPU for type PS/2 mouse, is available at the output of an AND gate 666 (FIG. 18). This interrupt IRQ12 will be enabled unless it is disabled by the SCP or the MKI is disabled. More particularly, a mouse output buffer full flag (MOBF) is applied to one input of the AND gate 666. The mouse output buffer full flag (MOBF) is generated by circuitry which includes the flip-flop 668 and 670. Any time the SCP 26 writes to the auxiliary output buffer at address 000DH the flip-flop 670 will be set by way of the output of the OR gate 510. This signal is also applied to a clock input of the flip-flop 668, whose D input is tied high to generate the mouse output buffer full flag at the Q output of the flip-flop 668. After the CPU reads the status register 366, an enable data signal (–ENDATA) clears the mouse output buffer full flag (MOBF). More particularly the enable data signal (–ENDATA) is applied to the clock input (CP) of the flip-flops 670. The D input is tied low. The Q output of the flip-flop 670 is applied to the clear input (CDN) of the flip-flop 668. Thus, as the CPU reads the status register 366, the output of the flip-flop 670 will go low and, in turn, clear the mouse output buffer full flag which is tied to one input of the AND gate 666.

The SCP 26 can disable the interrupt IRQ12 by writing to address 000EH. Thus, a decoded output signal A000 [14], which indicates an SCP write to the address A000EH, is ORed with an SCP write signal by way of an OR gate 672. The output of the OR gate 672 is applied to a clock input (CP) of an enable latch 674. Bit 1 of the SCP address data bus is used to control whether the interrupt IRQ12 is enabled or disabled. More specifically, SCPAD [0] equal "1" will enable the interrupt, while SCPAD [0] equal "0" will disable the interrupt. Thus, the SCAPDIN [0] is applied to the D input of the flip-flop 674. The Q output of this flip-flop 674 is applied to the AND gate 666 to either enable or disable the interrupt IRQ12 depending on the status of the bit SCPAD0. The flip-flop 674 is reset by system reset.

The circuitry also supports a suspend resume feature whereby certain data may be read back by the SCP 26 should the processing be suspended. The signals command, ENIRQ1, ENIRQ12, MOBF, AOBF, and MKIEN are applied to tristate devices 676 through 686. Two unused tristate devices 688 to 690 are tied to ground. The output of these tristate devices 676–690 are applied to the system control processor address data output bus SCAPOUT [0:7].

The tristate devices 676–690 are under the control of the signal enable flip-flop status (–ENFFSTS). This signal (–ENFFSTS) is available at the output of an OR gate 692. An SCP read signal (–SCPRD) is ORed with a decoded address signal A000 [13] to enable these bits to be read any time the SCP reads to address 000DH.

Obviously, many modifications and variations of the present invention are possible in light of the above teachings. Thus it is to be understood that within the scope of the appended claims, the invention may be practiced otherwise than as specifically designated above.

We claim:

1. A computer system comprising:
   a central processing unit (CPU) for processing data;
   a memory for storing data;
   means including a predetermined input device for transferring data to said memory;
   means including a system control processor (SCP adapted to be electrically connected to said transferring means for monitoring said transferring means, said SCP being incompatible with a predetermined SCP interface; and
   means for interfacing said SCP to said CPU, said interfacing means being disposed between said CPU and said SCP, said interfacing means including a first means for enabling said CPU to communicate with said SCP, said first means writable by said CPU and readable by said SCP, second means for enabling said SCP to communicate with said CPU, said second means readable by said CPU and readable and writable by said SCP, and means for controlling communications with said first and said second enabling means, said communications controlling means providing status information to be read by said SCP before said SCP writes to said second enabling means, said interfacing means further including means for hardware emulation of said predetermined SCP interface.

2. A computer system as recited in claim 1 wherein said interfacing means includes means for generating a predetermined signal to enable the CPU to access memory above one megabyte.

3. A computer system as recited in claim 2, wherein said generating means includes first allowing means for allowing said CPU to initiate the generation of said predetermined signal.

4. A computer system as recited in claim 2, wherein said generating means includes second allowing means for allowing said SCP to initiate generation of said predetermined signal.

5. A computer system as recited in claim 5 wherein said SCP is an Intel type 8051 processor.

6. A computer system as recited in claim 1, wherein said first enabling means is an input buffer, said second enabling means is an output buffer, and said communications controlling means is a status register.

7. A computer system as recited in claim 1, wherein said predetermined system control processor interface is compatible with an Intel type 8042 processor.

* * * * *

UNITED STATES PATENT AND TRADEMARK OFFICE
CERTIFICATE OF CORRECTION

PATENT NO. : 5,696,987
DATED : December 9, 1997
INVENTOR(S) : DeLisle, et al.

It is certified that error appears in the above-indentified patent and that said Letters Patent is hereby corrected as shown below:

Column 36, line 18, change "(SCP" to --(SCP)--.

Column 36, line 50, change "5" to --1--.

Signed and Sealed this

Twenty-fourth Day of March, 1998

Attest:

BRUCE LEHMAN

Attesting Officer          Commissioner of Patents and Trademarks